US012627379B2

(12) United States Patent
Mirhosseini et al.

(10) Patent No.: US 12,627,379 B2
(45) Date of Patent: May 12, 2026

(54) METHODS AND SYSTEMS FOR QUANTUM TRANSDUCERS

(71) Applicant: California Institute of Technology, Pasadena, CA (US)

(72) Inventors: Mohammad Mirhosseini, Pasadena, CA (US); Alkim Bozkurt, Pasadena, CA (US); Han Zhao, Pasadena, CA (US); Chaitali Joshi, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 424 days.

(21) Appl. No.: 18/211,057

(22) Filed: Jun. 16, 2023

(65) Prior Publication Data

US 2025/0015900 A1 Jan. 9, 2025

Related U.S. Application Data

(60) Provisional application No. 63/394,238, filed on Aug. 1, 2022, provisional application No. 63/353,475, filed on Jun. 17, 2022.

(51) Int. Cl.
| | |
|---|---|
| *H04B 10/00* | (2013.01) |
| *G06N 10/40* | (2022.01) |
| *H04B 10/516* | (2013.01) |
| *H04B 10/70* | (2013.01) |
| *H04J 14/00* | (2006.01) |

(52) U.S. Cl.
CPC ............. *H04B 10/70* (2013.01); *G06N 10/40* (2022.01); *H04B 10/516* (2013.01)

(58) Field of Classification Search
CPC ...... G06N 10/00; G06N 10/40; B81B 3/0021; B81B 3/0029; B82Y 10/00; B82Y 20/00; G11C 13/04; G11C 13/048; H04B 10/70
See application file for complete search history.

(56) References Cited

U.S. PATENT DOCUMENTS

| | | | | |
|---|---|---|---|---|
| 7,176,770 B2 * | 2/2007 | Ayazi | ................... | H03H 3/0077 |
| | | | | 333/186 |
| 2020/0062583 A1 * | 2/2020 | Painter | ................... | B82Y 20/00 |
| 2024/0403677 A1 * | 12/2024 | Eichenfield | ............ | H10N 30/20 |

* cited by examiner

*Primary Examiner* — Daniel G Dobson
(74) *Attorney, Agent, or Firm* — Kilpatrick Townsend & Stockton LLP

(57) ABSTRACT

Systems and methods for transducing and storing qubit signals are provided. The system includes a voltage source, a substrate, and a membrane suspended over the substrate. A phononic crystal oscillator is disposed in a first region of the membrane. The phononic crystal oscillator includes a capacitor having a moving electrode including an array of multiple phononic crystal unit cells. The moving electrode is connected to the voltage source. A superconducting circuit disposed in a second region of the membrane. A plurality of phonon shields and an optical resonator may also be disposed on the membrane.

17 Claims, 37 Drawing Sheets

100

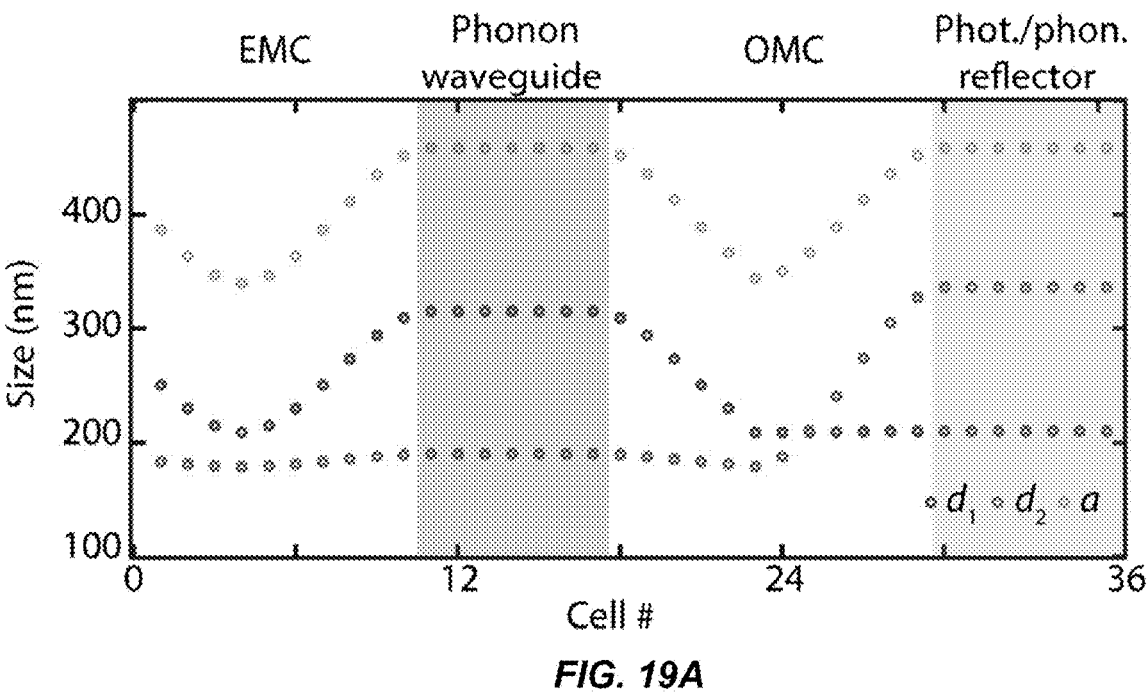
FIG. 19A
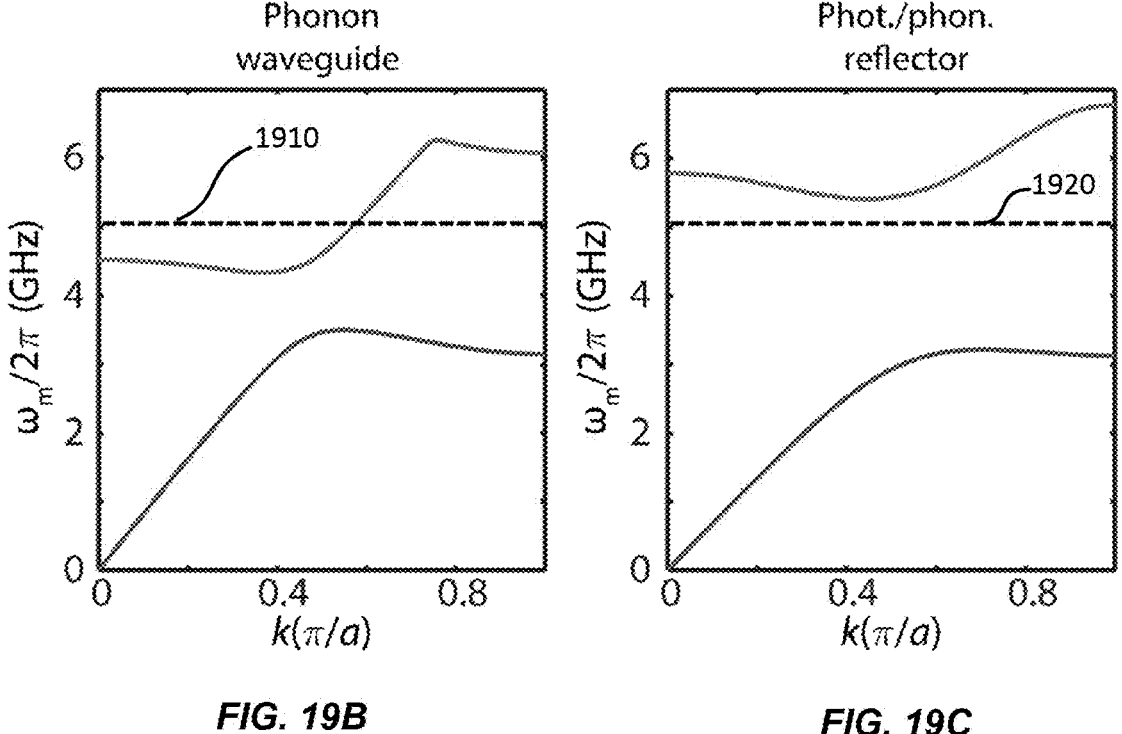
FIG. 19B                                FIG. 19C

$\xi = 0.88$ $\xi = 1.06$

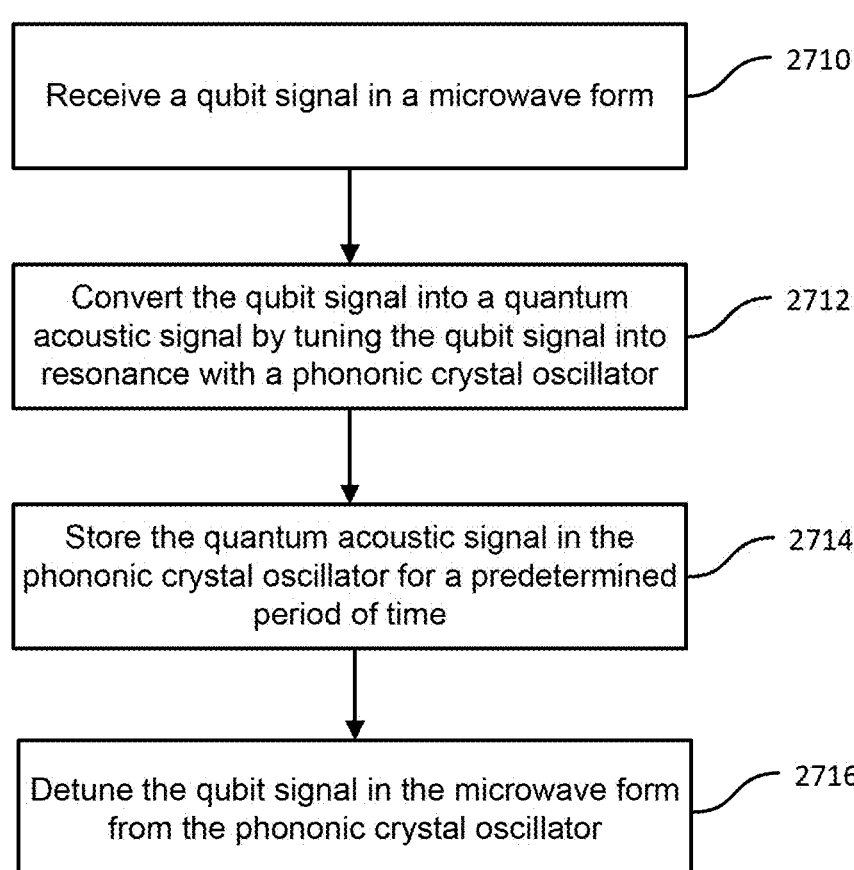

2700

Receive a qubit signal in a microwave form — 2710

Convert the qubit signal into a quantum acoustic signal by tuning the qubit signal into resonance with a phononic crystal oscillator — 2712

Store the quantum acoustic signal in the phononic crystal oscillator for a predetermined period of time — 2714

Detune the qubit signal in the microwave form from the phononic crystal oscillator — 2716

*FIG. 27*

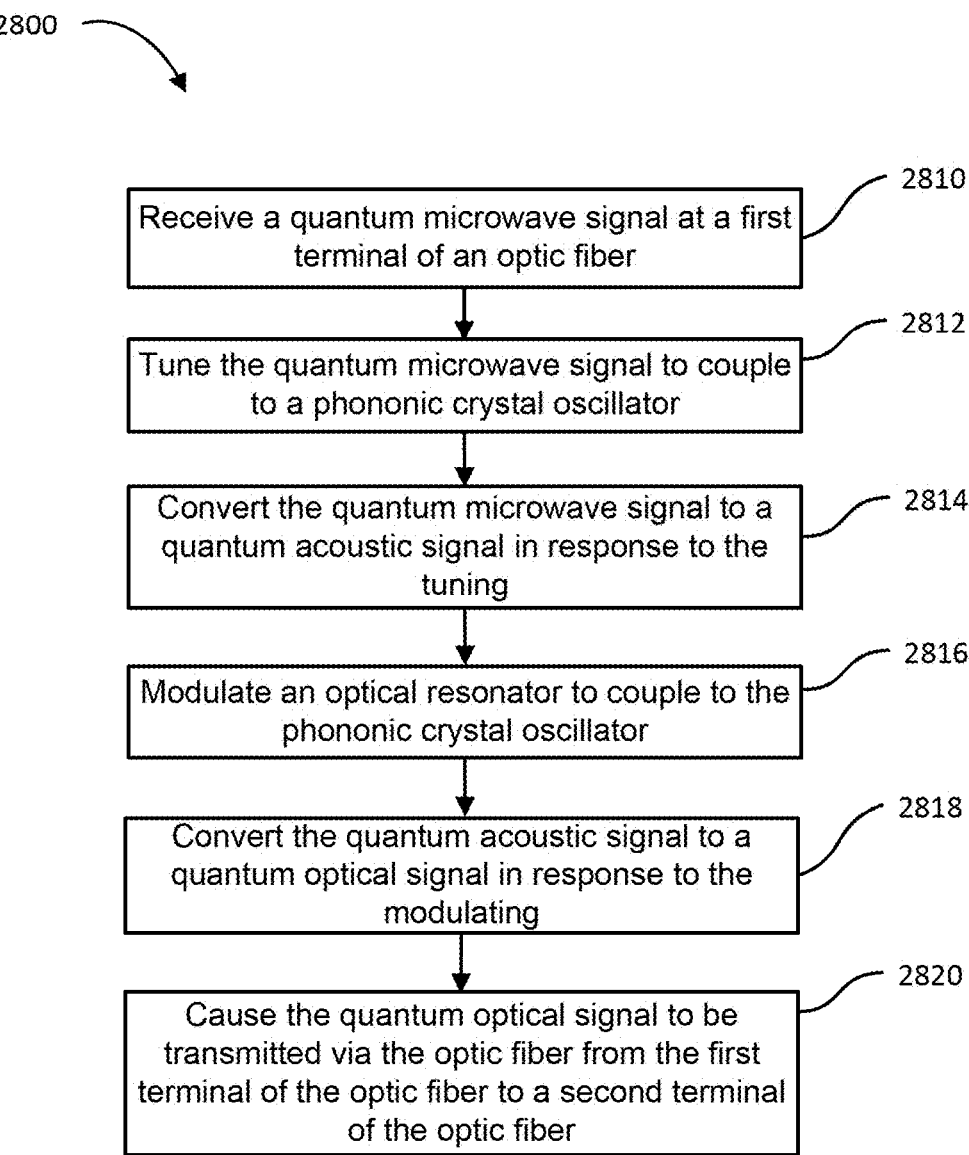

2800

Receive a quantum microwave signal at a first terminal of an optic fiber — 2810

Tune the quantum microwave signal to couple to a phononic crystal oscillator — 2812

Convert the quantum microwave signal to a quantum acoustic signal in response to the tuning — 2814

Modulate an optical resonator to couple to the phononic crystal oscillator — 2816

Convert the quantum acoustic signal to a quantum optical signal in response to the modulating — 2818

Cause the quantum optical signal to be transmitted via the optic fiber from the first terminal of the optic fiber to a second terminal of the optic fiber — 2820

*FIG. 28*

METHODS AND SYSTEMS FOR QUANTUM TRANSDUCERS

CROSS-REFERENCES TO RELATED APPLICATIONS

This application claims benefit under 35 USC § 119(e) to U.S. Provisional Patent Application No. 63/353,475 filed Jun. 17, 2022, entitled "Phononic Crystal Electrostatic Transducers for Quantum Memories," and to U.S. Provisional Patent Application No. 63/394,238 filed Aug. 1, 2022, entitled "Electrostatic Electro-Optomechanical Crystal Transducer," the disclosures of which are hereby incorporated by reference in their entirety for all purposes.

STATEMENT AS TO RIGHTS TO INVENTIONS MADE UNDER FEDERALLY SPONSORED RESEARCH OR DEVELOPMENT

This invention was made with government support under Grant No(s). PHY1733907 & OMA2137776 & OMA2137645 awarded by the National Science Foundation. The government has certain rights in the invention.

BACKGROUND OF THE INVENTION

Phonons, the quanta of energy stored in vibrations in solids, promise unique opportunities for storing and communicating quantum information. The intrinsic mechanisms for phonon dissipation get suppressed at low temperatures, leading to extremely low acoustic loss in single crystalline materials. Additionally, the inability of sound waves to propagate in a vacuum makes it possible to trap phonons in wavelength-scale dimensions via geometric structuring, leading to near-complete suppression of environment-induced decay. Finally, phonons interact with solid-state qubits and the electromagnetic waves across a broad spectrum, making them near-universal intermediaries for cross-platform information transfer. Motivated by these properties, pioneering work in the past two decades has enabled sensitive measurement and control of mechanical oscillators in the quantum regime via optical and electrical interfaces, making them viable candidates for quantum sensors, memories, and transducers.

While optomechanical experiments have been successful in measuring phonons with millisecond-to-second lifetimes, accessing long-lived mechanical resonances with electrical circuits has been more challenging. In the gigahertz frequency range, where the spectral proximity to superconducting qubits holds the most promise for quantum technologies, piezoelectricity is the predominant mechanism for converting microwave photons to phonons. Piezoelectric devices have been used with remarkable success in coupling mechanical modes to superconducting qubits. However, their need for hybrid material integration, sophisticated fabrication process, and reliance on lossy poly-crystalline materials has limited the state-of-the-art experiments to sub-microseconds mechanical lifetimes in devices with compact geometries. This evidently large gap between the mechanical lifetimes accessible to optical and electrical interfaces motivates pursuing less invasive forms of electromechanical interaction. Creating better electrical interfaces for long-lived phonons holds the potential for revolutionizing the current quantum toolbox by pairing the superior coherence of acoustics with the massive nonlinearity of Josephson junction circuits.

Bi-directional conversion of electrical and optical signals is an integral part of telecommunications and is anticipated to play a crucial role in long-distance quantum information transfer. Direct electro-optic frequency conversion can be realized via the Pockels effect in nonlinear crystals. More recently, progress in controlling mechanical waves in nanostructures has led to a new form of effective electro-optic interaction, which is mediated via resonant mechanical vibrations. In this approach, the electrical actuation of mechanical waves in piezoelectric materials is combined with the acousto-optic effect in cavity optomechanical systems to modulate the phase of an optical field. Piezo-optomechanical systems based on this concept have been used for microwave-optics frequency conversion as well as optical modulation, gating, and non-reciprocal routing.

A variety of materials such as lithium niobate, gallium arsenide, gallium phosphide, and aluminum nitride have been previously used in piezo-optomechanical devices. However, relying on a single material platform for simultaneously achieving strong piezoelectric and acousto-optic responses is challenging. Alternatively, heterogeneous integration has been used to combine piezoelectric materials with silicon optomechanical crystals. These devices benefit from the large optomechanical coupling rates facilitated by the large refractive index and photoelastic coefficient of silicon. However, they utilize sophisticated fabrication processes, which hinder mass integration with the existing technologies. Additionally, heterogeneous integration often results in poly-crystalline films and degraded surface properties, which lead to increased microwave, acoustic, and optical loss when operating in the quantum regime.

In addition, connecting microwave electronics with optical fiber networks paves the foundation for high-speed communication infrastructures and future distributed quantum computation systems. On-chip mechanical structures are usually exploited as an efficient interface between microwaves and optics on integrated platforms. Various applications such as acousto-optic modulators, isolators and beam steering have been established in the classical regime. More recently, the electro-optomechanical quantum transducers that connect superconducting qubit excitations and optical photons using gigahertz nanomechanical resonators are under significant progress. Standard approaches of these acousto-optic devices rely on intrinsic piezoelectric materials for conversion from microwave drive to mechanical energy. However, such materials not only require unconventional fabrications that are difficult to be integrated with existing silicon electronics and photonics, but are generally associated with low optical refractive indices leading to inferior optomechanical interactions. Moreover, at millikelvin temperatures, these piezoelectric materials tend to be the major source of mechanical loss, impeding the promise of quantum processing and storage using mechanical hybrid quantum systems. Single-crystal dielectrics such as silicon have been the backbone of electronic and photonic integrated circuits, while being the ideal low-loss materials for quantum acoustics. These prospects motivate a great interest in developing acousto-optic devices with pure dielectrics. While electrically driven acousto-optic modulations at low-frequency have been demonstrated in the framework of microelectromechanics, efficient electro-optomechanical transduction with gigahertz mechanical resonators that are more pertinent to superconducting quantum applications remain unexplored.

SUMMARY OF THE INVENTION

The present disclosure relates generally to methods and systems for quantum transduction and storage. More specifically, the present disclosure relates to systems and methods for transducing qubit signals from microwave form to acoustic or optical form.

According to an embodiment of the present disclosure, a system is provided. The system includes a substrate, a membrane suspended over the substrate, a phononic crystal oscillator disposed in a first region of the membrane, and a superconducting circuit disposed in a second region of the membrane. The phononic crystal oscillator includes a capacitor having a moving electrode including an array of multiple phononic crystal unit cells. The moving electrode is connected to a voltage source. The system can also include an optical resonator connected to the phononic crystal oscillator.

According to another embodiment of the present disclosure, a method of storing a quit signal is provided. The method includes receiving a qubit signal in a microwave form; converting the qubit signal into a quantum acoustic signal by tuning the qubit signal into resonance with a phononic crystal oscillator; storing the quantum acoustic signal in the phononic crystal oscillator for a predetermined period of time; and detuning the qubit signal in the microwave form from the phononic crystal oscillator.

According to an embodiment of the present disclosure, a method of transducing a qubit for fiber optic transmission is provided. The method includes receiving a quantum microwave signal at a first terminal of an optic fiber; tuning the quantum microwave signal to couple to a phononic crystal oscillator; in response to the tuning, converting the quantum microwave signal to a quantum acoustic signal; modulating an optical resonator to couple to the phononic crystal oscillator; in response to the modulating, converting the quantum acoustic signal to a quantum optical signal; and causing the quantum optical signal to be transmitted via the optic fiber from the first terminal of the optic fiber to a second terminal of the optic fiber.

Numerous benefits are achieved by way of the present disclosure over conventional techniques. For example, embodiments of the present disclosure provide systems and methods able to control long-lived mechanical oscillators in the quantum regime for quantum information processing. An electromechanical system capable of operating in the GHz-frequency band in a silicon-on-insulator platform includes a novel driving scheme based on an electrostatic field and high-impedance microwave cavities based on Titanium Nitride (TiN) superconductors. The electromechanical system demonstrates a parametrically enhanced electromechanical coupling strength sufficient to enter the strong-coupling regime with a high cooperativity. The phononic crystals patterned periodically on a silicon membrane can achieve very low acoustic loss by suppressing energy loss to the environment via phonon shields. The superconducting circuit made from thin metal layers (e.g., 15 nm Titanium Nitride) on crystalline silicon membrane can achieve long memory times with low loss. The electromechanical systems in the present disclosure can achieve a quality factor two orders of magnitude higher than state of the art piezoelectric devices. Additionally, the absence of piezoelectric materials in some embodiments leads to long mechanical lifetimes. These and other embodiments of the disclosure, along with many of its advantages and features, are described in more detail in conjunction with the text below and corresponding figures.

BRIEF DESCRIPTION OF THE DRAWINGS

FIG. 19A illustrates geometric parameters of an air hole illustrated in FIG. 18 according to one embodiment of the present disclosure.

FIG. 19B illustrates a mechanical band structure of the phonon waveguide according to one embodiment of the present disclosure.

FIG. 19C illustrates a mechanical band structure of the photon/phonon reflector used to terminate the optomechanical crystal (OMC) section according to one embodiment of the present disclosure.

FIG. 27 is a simplified flowchart illustrating a method of storing a qubit signal according to one embodiment of the present disclosure.

FIG. 28 is a simplified flowchart illustrating a method of transducing quantum signals for fiber optic transmission according to one embodiment of the present disclosure.

DETAILED DESCRIPTION OF SPECIFIC EMBODIMENTS

Figure 1A:
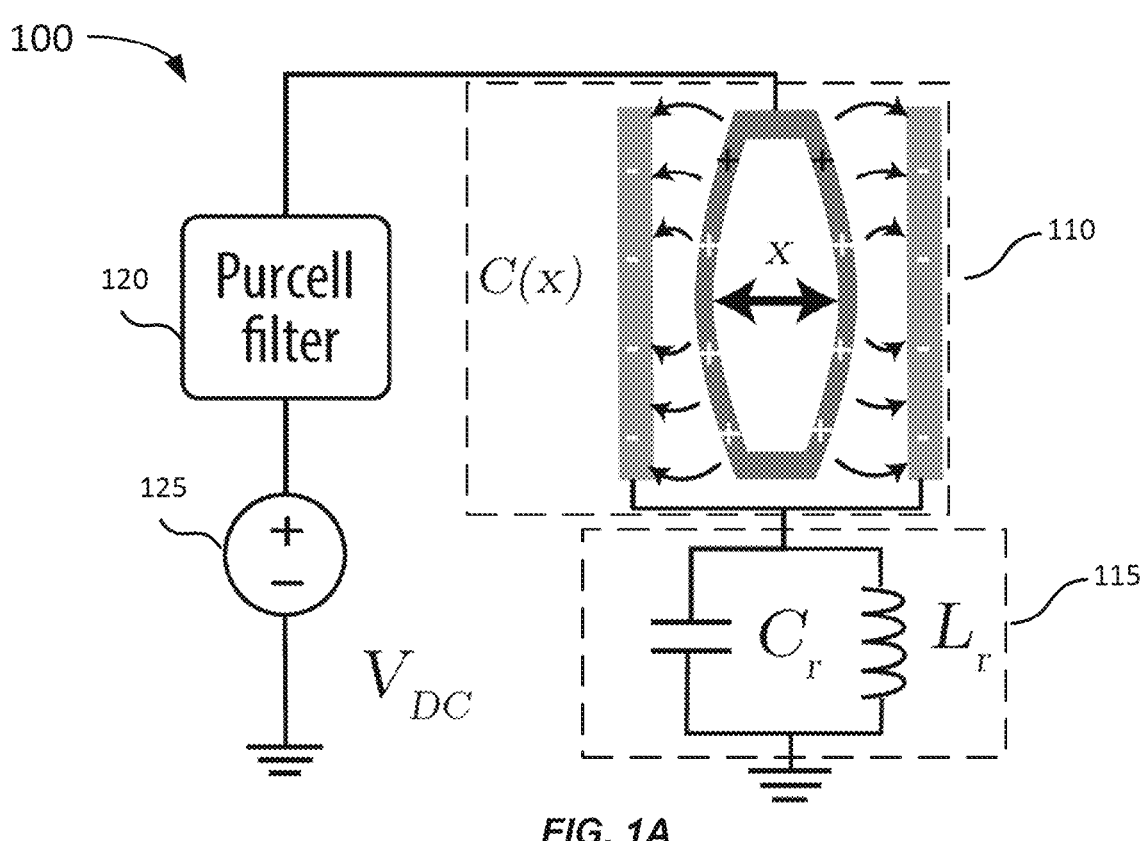
FIG. 1A is a circuit diagram of an electrostatic transducer coupled to a microwave cavity according to one embodiment of the present disclosure.

The present disclosure relates generally to methods and systems for quantum transduction and storage. More specifically, the present disclosure relates to systems and methods for transducing qubit signals from microwave form to acoustic or optical form. Merely by way of example, a system for transducing microwave photons to acoustic phonons is described herein.

The system includes a capacitor with moving electrodes. The capacitor may be referred to as a motion-dependent capacitor hereafter. The motion-dependent capacitor can be used to create electromechanical coupling between microwave photons in a superconducting circuit and long-lived phonons in a GHz range (e.g., 5 GHZ) crystalline silicon oscillator. The electromechanical coupling can operate in a high-frequency regime and demonstrate record low mechanical loss. A static electric field (e.g., a direct current (DC) voltage), as opposed to conventionally used radio-frequency drives, can be used to realize a parametrically enhanced interaction in a microwave cavity with the motion-dependent capacitor. The absence of alternating currents from the driving field in the embodiments described herein eliminates conductive loss, allowing large parametrically enhanced coupling rates without causing heating in the system.

The motion-dependent capacitor can be made from silicon membranes patterned into periodic structures known as phononic crystals. Making mechanical resonances based on this structure allows for achieving very low acoustic loss, by suppressing energy loss to the environment via "phonon shields." The system also includes a frequency-tunable high-impedance microwave resonator, which can be connected to the motion-dependent capacitor to further enhance electromechanical interactions. The microwave resonator can be made from TiN superinductors.

The motion-dependent capacitor and the microwave resonator can be disposed in a crystalline silicon membrane of about 220 nm thickness, with extremely thin metal layers, for example 15 nm TiN. This combination enables most of the mechanical energy to be stored in silicon elements, thereby limiting the amount of mechanical energy stored in the metal elements of the system. This is beneficial to achieving long memory times, as metals are known to be a source of acoustic loss in the quantum regime, while crystalline silicon has extremely low acoustic loss. Using the above mentioned phononic crystal patterns and material composition, the system can achieve a quality factor of $1\times10^6$-$8\times10^6$, which is two orders of magnitude higher than that achieved by state of the art piezoelectric devices.

The use of these devices for increasing electromechanical coupling is established but integrating them into the full device in a way that does not degrade mechanical coherence by using high-quality thin films is a unique aspect in the present disclosure. The high-impedance resonators are made via a process called "kinetic inductance," which uses special types of metals (e.g., TiN). The high-impedance superconducting circuit can allow the system to achieve the "strong coupling regime" of cavity quantum electrodynamics (QED). This is a technical criterion associated with the ability to use a mechanical resonator as a memory for an electrical circuit. Embodiments of the present invention provide a microwave-mechanics system which is able to achieve this simultaneously with low loss.

The motion-dependent capacitor and the microwave resonator described herein demonstrate an electromechanical interaction in the strong coupling regime, enabling the coherent exchange of microwave photons and phonons at a cooperativity of $\mathcal{C} \approx 1200$. Mechanical lifetimes measured in the few-phonon regime can demonstrate quality factors in excess of 8 million (at 5 GHZ). In addition, no parasitic heating for a large range of electrostatic biasing fields in the system is observed, allowing operation in the quantum ground state as verified by calibrated sideband thermometry measurements in a dilution refrigerator.

The electromechanical system can demonstrate a parametrically enhanced electromechanical coupling of $g/2\pi=1.1$ MHz, sufficient to enter the strong-coupling regime with a cooperativity of $\mathcal{C}=1200$. The absence of piezoelectric materials leads to long mechanical lifetimes, finding intrinsic values up to $\tau_d=265$ µs ($Q=8.4\times10^6$ at $\omega_m/2\pi=5$ GHz) measured at low-phonon numbers and millikelvin (mK) temperatures. Despite the strong parametric drives, the cavity-mechanics system can be found in the quantum ground state by sideband thermometry measurements. Simultaneously achieving ground-state operation, long mechanical lifetimes, strong coupling, and compact geometry enables silicon electromechanical resonators as memory elements and transducers in hybrid quantum systems, and as a tool for probing the origins of acoustic loss in the quantum regime. Such quantum memories can perform a variety of tasks in quantum computation, including creation of "error-protected bosonic qubits." In addition, the electromechanical resonator can also be used in microwave-to-optical quantum transduction.

Microwave-Mechanics System with Phononic Crystal Electrostatic Transducer

FIG. 1A is a circuit diagram 100 of an electrostatic transducer coupled to a microwave cavity according to one embodiment of the present disclosure. The electrostatic transducer 110 consists of a phononic crystal oscillator (a mechanical resonator), which includes a capacitor Cx with mechanically moving electrodes connected to an external DC voltage source 125. In this setting, the mechanical vibrations of the capacitor electrodes create a time-dependent dipole oscillating at mechanical resonance frequency. The moving capacitor Cx in FIG. 1A shows one phononic crystal unit cell for illustration purposes. However, the moving capacitor Cx can include multiple such phononic crystal unit cells, which will be described in FIG. 1B below. Connecting this charged moving capacitor (e.g., the transducer) to an electromagnetic cavity 115 (e.g., a microwave cavity including an LC resonator) leads to an interaction between the voltage operator of the photons in the cavity ($\hat{V}/V_{zpf}$=i($\hat{a}$−$\hat{a}^\dagger$)) and the quantized mechanical displacement operator ($\hat{x}/x_{zpf}$=($\hat{b}$+$\hat{b}^\dagger$)). A Purcell filter 120 can be used to deliver the static biasing voltage $V_{DC}$ to the transducer without incurring radiative loss to the microwave cavity.

This interaction between the moving capacitor and the microwave resonator can be described by the Hamiltonian as shown in Equation (1), which can be derived by Equations (2)-(5)

$$\hat{H}_{int} = i(x_{zpf}\partial_x C)V_{zpf}V_{DC}\left(\hat{a}\hat{b}^\dagger - \hat{a}^\dagger\hat{b}\right) = i\hbar g_{em}\left(\hat{a}\hat{b}^\dagger - \hat{a}^\dagger\hat{b}\right) \tag{1}$$

Here, $x_{zpf}$ represents the zero-point motion and $V_{zpf}$ represents the voltage of the phonon and photon fields. The coupling rate is a function of the geometry (through $\partial_x C$) and the applied bias voltage $V_{DC}$, and arises as a result of the change in the stored electrostatic energy as a function of mechanical motion. The DC voltage in this process can be understood as a 'pump' in a parametric process. Unlike the conventional parametric electromechanics, however, the pump is solely comprised of electric fields at zero frequency and is not accompanied by alternating currents. The inventors have determined that this distinction is important because it increases the net coupling rate at large voltages without being limited by the dissipation in the superconducting cavity.

The interaction term in the Hamiltonian for a capacitor with mechanically moving electrodes ($C_m$) is given as in Equation (2).

$$H_{int} = \frac{\hat{q}^2}{2C_m}\left(\frac{1}{C_m}\frac{\partial C_m}{\partial x}\hat{x}\right) \tag{2}$$

The displacement operator can be written as $\hat{x}$=$x_{zpf}$($\hat{b}$+$\hat{b}^\dagger$). Both electrostatic charge due to external voltage source and radio frequency (RF) charge associated with the microwave resonance on top of the capacitor exist. This leads to a charge operator which can be written as $\hat{q}$=i$Q_{zpf}$($\hat{a}$−$\hat{a}^\dagger$)+$Q_{DC}$. Inserting these operators into the Hamiltonian, Equation (3) can be obtained.

$$H_{int} = \frac{1}{2}\frac{\partial C_m}{\partial x}x_{zpf}\left[i\frac{Q_{zpf}}{C_m}\left(\hat{a}-\hat{a}^\dagger\right) + \frac{Q_{DC}}{C_m}\right]^2\left(\hat{b}+\hat{b}^\dagger\right) \tag{3}$$

Noting that $Q_{zpf}/C_m$=$V_{zpf}$ and $Q_{DC}/C_m$=$V_{DC}$, Equation (3) can be expanded as shown in Equation (4).

$$H_{int} = \frac{1}{2}\frac{\partial C_m}{\partial x}x_{zpf}\left(\hat{b}+\hat{b}^\dagger\right)\times\left[-V_{zpf}^2\left(\hat{a}-\hat{a}^\dagger\right)^2 + V_{DC}^2 + 2iV_{zpf}V_{DC}\left(\hat{a}-\hat{a}^\dagger\right)\right] \tag{4}$$

Equation (5) can be obtained from Equation (4) by keeping only the interaction terms between the DC voltage and the RF fields and carrying out the rotating wave approximation for mechanics in resonance with microwave in the present disclosure.

$$H_{int} = i\frac{\partial C_m}{\partial x}x_{zpf}V_{zpf}V_{DC}\left(\hat{a}\hat{b}^\dagger - \hat{a}^\dagger\hat{b}\right) = i\hbar g_{em}\left(\hat{a}\hat{b}^\dagger - \hat{a}^\dagger\hat{b}\right) \tag{5}$$

The Hamiltonian as shown in Equation (5) has the form of an artificial piezoelectric response with an interaction strength as shown in Equation (6). Equation (6) constitutes a parametric interaction where the interaction strength scales linearly with the applied external voltage.

$$\hbar g_{em} = \frac{\partial c_m}{\partial x}x_{zpf}V_{zpf}V_{DC} \tag{6}$$

Upon obtaining the interaction term, the full Hamiltonian of the system can be written as shown in Equation (7), wherein the subscript from $g_{em}$ is omitted for brevity.

$$H/\hbar = \omega_r\hat{a}^\dagger\hat{a} + \omega_m\hat{b}^\dagger\hat{b} + ig\left(\hat{a}\hat{b}^\dagger - \hat{a}^\dagger\hat{b}\right) \tag{7}$$

A microwave tone at frequency $\omega_d$ can be used in probing microwave-mechanics system in the present disclosure. The Langevin equations for the Hamiltonian as shown in Equation (1) can be written as shown in Equations (8) and (9).

$$\dot{\hat{a}} = -\left(i\omega_r + \kappa/2\right)\hat{a} - g\hat{b} - \sqrt{\kappa_e}\,\hat{a}_{in} \tag{8}$$

$$\dot{\hat{b}} = -\left(i\omega_m + \gamma/2\right)\hat{b} + g\hat{a}. \tag{9}$$

The thermal fluctuations entering the microwave and mechanics has been ignored from Equations (8) and (9).

Taking the Fourier transform of the Langevin equations, Equations (10) and (11) can be obtained as shown below, where $\Delta$=$\omega_r$−$\omega$ and $\delta$=$\omega_m$−$\omega$.

$$\left(i\Delta + \kappa/2\right)\hat{a}(\omega) = -g\hat{b}(\omega) - \sqrt{\kappa_e}\,\hat{a}_{in}(\omega) \tag{10}$$

$$\left(i\delta + \gamma/2\right)\hat{b}(\omega) = g\hat{a}(\omega) \tag{11}$$

Substituting Equation (11) into Equation (10), the microwave cavity operator can be expressed as in Equation (12)

$$\hat{a}(\omega) = -\frac{\sqrt{\kappa_e}\,\hat{a}_{in}(\omega)}{i\Delta + \kappa/2 + \dfrac{g^2}{i\delta + \gamma/2}} \tag{12}$$

Using input-output theory, the output operator can be defined $\hat{a}_{out}(\omega)$=$\hat{a}_{in}(\omega)$+$\sqrt{\kappa_e}\hat{a}(\omega)$. Using Equation (12), the electromechanically induced transparency (EIT) expression can be obtained as shown in Equation (13). The EIT expression can be used to fit the reflection traces obtained from the cavity-mechanics system.

$$\frac{\hat{a}_{out}(\omega)}{\hat{a}_{in}(\omega)} = 1 - \frac{\kappa_e}{i\Delta + \kappa/2 + \dfrac{g^2}{i\delta + \gamma/2}} \tag{13}$$

Within the framework of cavity electromechanics, the electromechanical interaction can be considered to be caused by radiation pressure. More precisely, the stored electrical energy in the microwave-mechanics system changes with the mechanical displacement via the modulation of the capacitance. Based on the term in the Hamiltonian that leads to electrostatic interaction in Equation (1), the change in the cross electrical energy can be seen as the origin of this interaction and thus can be used to capture the change in the capacitance. It is possible to express this change in the energy via a perturbative integral, similar to the moving boundary integrals for electromechanical systems. In this perturbative approach, it is assumed that the displacement of the material boundaries does not change the electric field but alters the local permittivity due to leading to an electromechanical coupling rate. The interaction strength can be expressed as in Equation (14).

$$\hbar g_{em} = x_{zpf} \oint dA(Q(r) \cdot \hat{n})\left(\Delta\epsilon E^{\parallel}(r)_{DC} E^{\parallel}(r)_{RF} - \Delta\epsilon^{-1}D^{\perp}(r)_{DC}D^{\perp}(r)_{RF}\right) \quad (14)$$

Here, $x_{zpf} = \sqrt{\hbar/2m_{eff}\omega_m}$ is the zero point fluctuations of displacement, $m_{eff}$ is the effective mass of the acoustic resonator, $Q(r)$ is the normalized displacement where max $[Q(r)]=1$, $\Delta\epsilon = \epsilon_1 - \epsilon_2$ and $\Delta\epsilon^{-1} = 1/\epsilon_1 - 1/\epsilon_2$ are the electrical permittivity contrasts between the two materials that are on the boundary covered by the surface integral, and $E^{\parallel}(r)_{DC}$ ($E^{\parallel}(r)_{RF}$) is the parallel electric field component obtained from electrostatic simulations of the capacitor with $V_{DC}$ ($V_{zpf}$) applied to the capacitors. Likewise, $D^{\perp}(r)_{DC}$ ($D^{\perp}(r)_{RF}$) is the perpendicular displacement field obtained from the same simulation. In this expression the voltage dependence of the coupling is directly embedded in the capacitor voltages used in the simulations. One can alternatively solve for a given voltage (e.g., 1V) and then scale the fields appropriately based on $V_{DC}$ and $V_{zpf}$. For instance, $g_0$ can be simply obtained by setting $V_{DC}=1V$.

It has been previously observed that the electrical responses of the capacitor at DC and RF frequencies may differ from one another. Generally, the charge carriers freeze off at cryogenic temperatures, giving rise to massive resistivity values for silicon. However, in capacitor structures under DC voltages, band bending can lead to the formation of a narrow space charge region that effectively screens out the field at the bulk of the silicon. This can lead to a DC response which can approximately be modelled by modelling silicon as a perfect conductor. On the other hand, the microwave field which oscillates at a frequency above the RC cutoff cannot be screened and silicon behaves like a perfect insulator for these fields.

Taking this into account, only fields perpendicular to the boundaries may exist for the DC field and the integral for the electromechanical coupling can be simplified as shown in Equation (15).

$$\hbar g_{em} \approx x_{zpf} \oint dA(Q(r) \cdot \hat{n})\left(\epsilon_0^{-1}D^{\perp}(r)_{DC}D^{\perp}(r)_{RF}\right). \quad (15)$$

For the devices with $$\frac{g_0}{2\pi} = 45.4\frac{\text{kHz}}{\text{V}},$$

this approach shows a very accurate simulation result of 46 kHz/V. Assuming that silicon is an insulator at all frequencies and the field distributions are identical, the coupling strength may be underestimated and obtained at 32 kHz/V.

Despite its conceptual simplicity, electrostatic transduction is challenging to realize at GHz frequencies. Getting substantial coupling is associated with increasing the motion-dependent capacitance and the zero-point displacement. This combination has been previously achieved in low-mass, narrow-gap suspended capacitors, which support MHz-frequency mechanical resonances. However, the frequency scaling of acoustic loss in metals (speculated to be caused at grain boundaries) makes these structures unsuitable for GHz frequencies. Additionally, the short wavelength of GHz-frequency phonons can lead to increased acoustic radiative loss to the surrounding environment, making it challenging to localize high-Q resonances. Planar nanostructured devices made from crystalline silicon membranes can be used to solve the problem. Adding a thin layer of metal on top of the membrane can form a capacitor in this platform while relying on phononic crystals to engineer localized resonances.

Figure 1B:
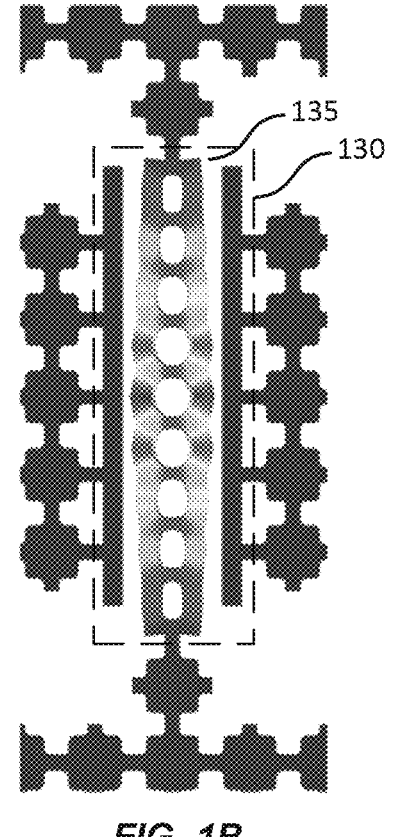
FIG. 1B is a simulated displacement profile of the confined mechanical resonance with the largest electromechanical coupling according to one embodiment of the present disclosure.

FIG. 1B is a simulated displacement profile of the confined mechanical resonance with the largest electromechanical coupling according to one embodiment of the present disclosure. The phononic crystal oscillator 130 consists of a periodic array of multiple unit cells 135, patterned on the inner electrode of a vacuum-gap capacitor. The in-plane movement of the 'breathing' mechanical mode in this structure leads to the modulation of the capacitance. The rate of change of this motion-dependent capacitance can be maximized by fabricating capacitors with narrow gaps in the range of 65-70 nm. Additionally, the capacitance can be maximized by increasing the number of phononic crystal unit cells to the limit set by the onset of disorder effects, which lead to mode breakup as can be observed in finite-element simulations. A key benefit of this planar geometry is the possibility of creating phononic crystals with a wide band gap for all phonon polarizations. Phonon shields can be used for clamping the transducer to its surrounding membrane.

Figures 1C, 1D, 1E, 1F:
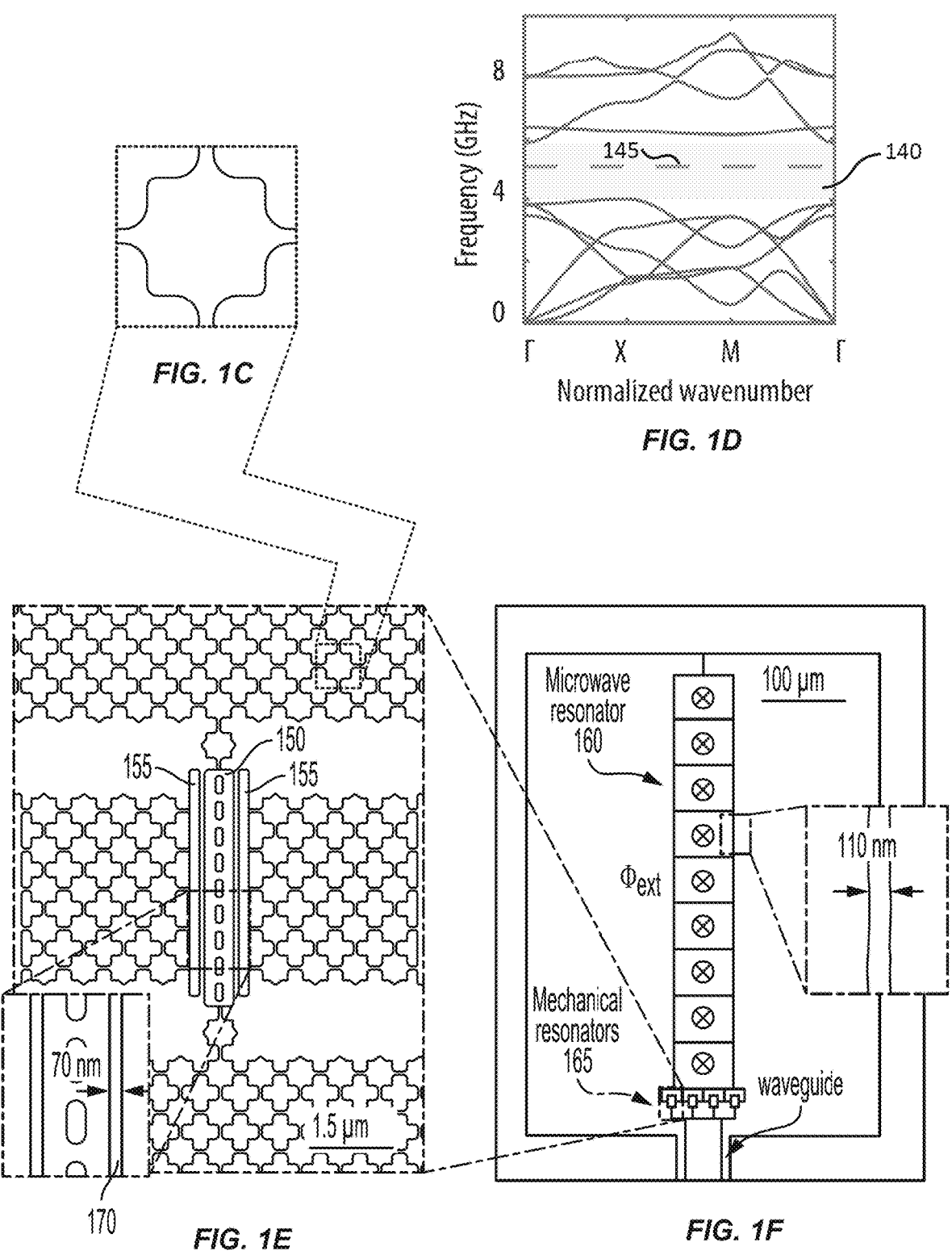
FIG. 1C illustrates a geometry of a unit-cell phonon shield according to one embodiment of the present disclosure.
FIG. 1D illustrates a band diagram of the unit-cell phonon shield according to one embodiment of the present disclosure.
FIG. 1E is a scanning electron microscope (SEM) image of the fabricated phononic crystal oscillator clamped by the phonon shields according to one embodiment of the present disclosure.
FIG. 1F is an optical microscope image of the fabricated microwave resonator and mechanical resonators according to one embodiment of the present disclosure.

FIG. 1C illustrates a geometry of a unit-cell phonon shield according to one embodiment of the present disclosure. FIG. 1D illustrates a band diagram of the unit-cell phonon shield according to one embodiment of the present disclosure. The complete band gap is highlighted by the shaded zone 140. The phonon shield has a mechanical band structure with a complete band gap from 4.3 GHz to 6 GHz, which terminates the hybridized mechanical modes at 5 GHz denoted by the dashed line 145. This design can help the confinement of the mechanical modes within the microwave-mechanics system by preventing radiative leakage into the surrounding membrane.

The size mismatch is a central challenge in coupling the presented phononic crystal transducer to a microwave circuit. Set by the small wavelength of phonons (e.g., ~1 μm at the target frequency of 5 GHz), the small size of the transducer translates to a motion-dependent capacitance that is much smaller than the typical capacitance of a microwave cavity. This mismatch can lead to a poor electric energy density overlap, which can dilute the electromechanical interaction. Formally, this effect is captured by a linear dependence of the electromechanical coupling to the zero-point voltage of microwave photons $V_{zpf}$ (e.g., as shown in Equation 1). Recent progress in developing circuits for error-protected superconducting qubits has led to established techniques for magnifying zero-point voltage of microwave photons in high-impedance resonators.

FIG. 1E is a scanning electron microscope (SEM) image of the fabricated phononic crystal oscillator clamped by the phonon shields according to one embodiment of the present disclosure. The inner electrode 150 and outer electrodes 155 are shown in false color. In this example, the vacuum gap 170 between the inner electrode and the outer electrode is 70 nm as shown in the inset in FIG. 1E.

FIG. 1F is an optical microscope image of the fabricated microwave resonator and mechanical resonators according to one embodiment of the present disclosure. An electrostatic transducer may include multiple mechanical resonators 165. In this example, the mechanical resonators 165 are galvanically connected to a microwave resonator 160. The microwave resonator 160 consists of a 110 nm wide nanowire formed from thin-film titanium nitride (e.g., with thickness ~15 nm). The inset in FIG. 1F shows the TiN nanowires. The inertia of charge carriers in this disordered superconductor leads to a large inductance, which is enhanced by patterning structures with small cross sections. Beyond magnifying the electromechanical interactions, kinetic inductance is tunable via external magnetic fields, which enables controlling the resonance frequency of the microwave cavity in-situ.

Mechanics Design

Figure 2A:
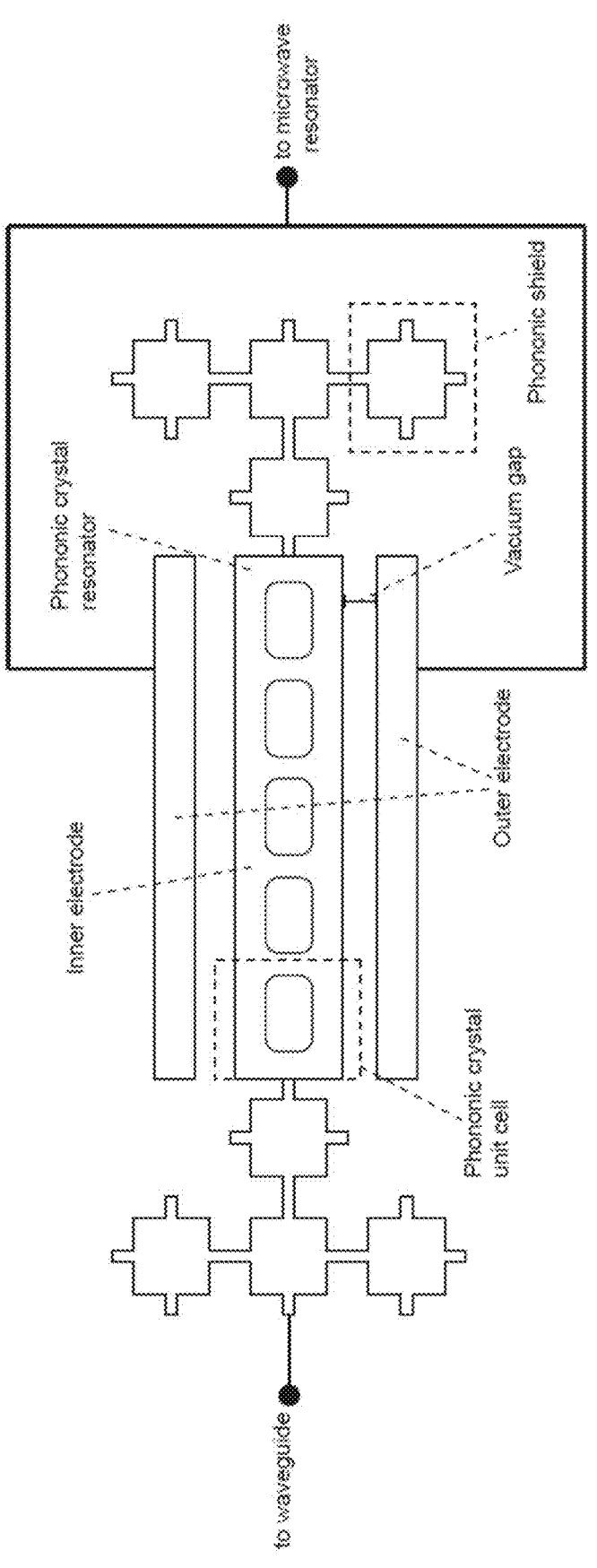
FIG. 2A is a schematic diagram of a mechanical resonator according to one embodiment of the present disclosure.
Figure 2B:
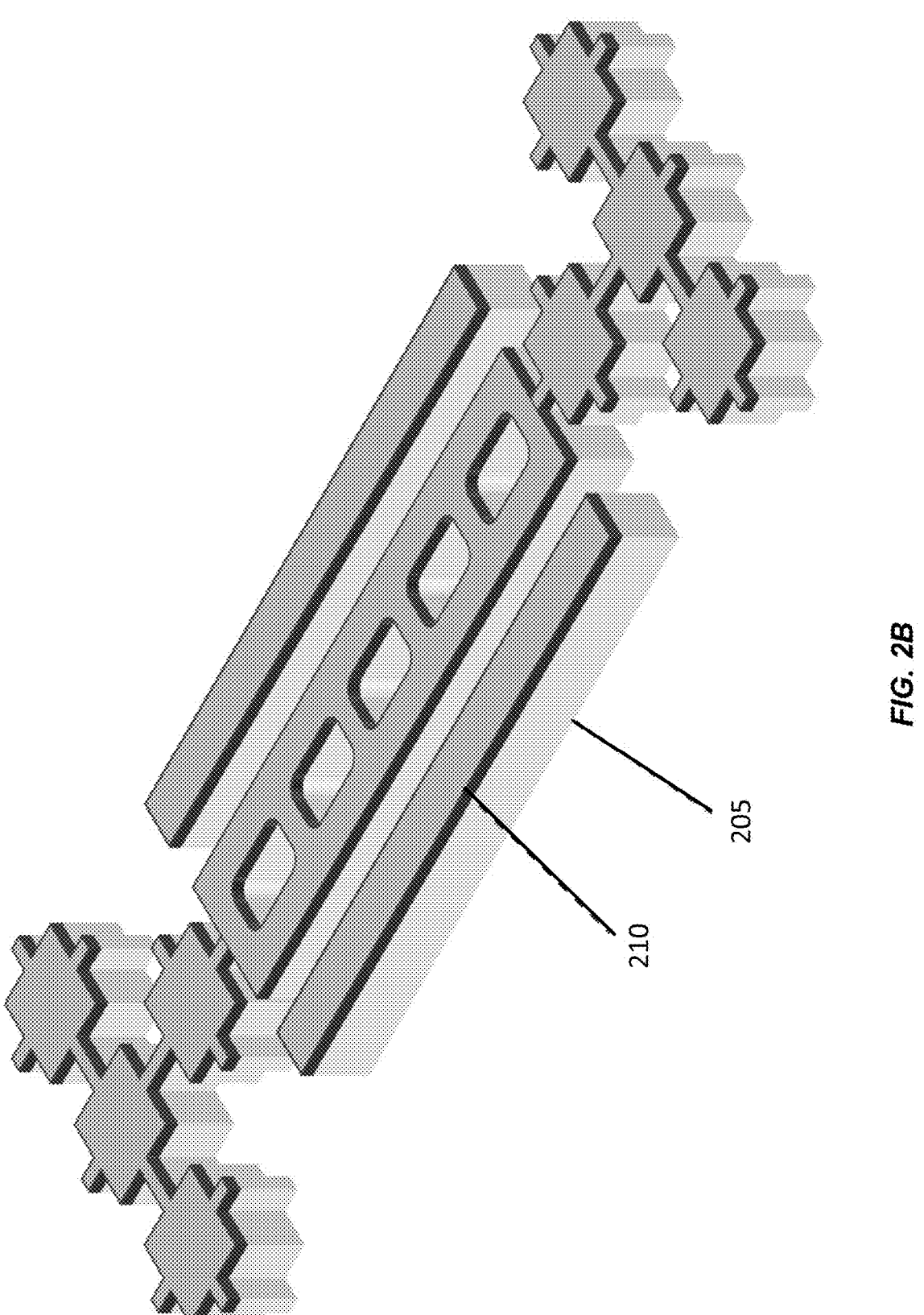
FIG. 2B is a 3-dimensional (3D) diagram of the mechanical resonator fabricated on a silicon substrate according to one embodiment of the present disclosure.

FIG. 2A is a schematic diagram of a mechanical resonator according to one embodiment of the present disclosure. The mechanical resonator illustrated in FIG. 2A only shows a portion of the mechanical resonator (phononic crystal oscillator) illustrated in FIG. 1E. FIG. 2B is a 3-dimensional (3D) diagram of the mechanical resonator fabricated on a silicon substrate according to one embodiment of the present disclosure. A 4-inch silicon on an insulator (SOI) wafer can be utilized at the beginning of the fabrication process. The silicon 205 can be covered with metal 210 (e.g., ~15 nm TiN films) via sputtering. Following sputtering, the silicon wafer can be diced into 1×1 cm$^2$ dies. For the following steps: (i) deposition of niobium markers followed by lift-off and (ii) inductively coupled plasma-reactive ion etching (ICP-RIE) of TiN and Si with Sulfur hexafluoride/Argon (SF$_6$/Ar) and Sulfur hexafluoride/Octafluorocyclobutane (SF$_6$/C$_4$F$_8$) chemistry, the patterning of the structures can be achieved by electron beam lithography. These etching steps can be used to define the capacitor vacuum gap, phononic crystal nanobeam, phonon shields and the release holes throughout the metalized and bare sections of the silicon membrane. The devices can be released with Hydrogen Fluoride (HF) post-fabrication.

Figure 3:
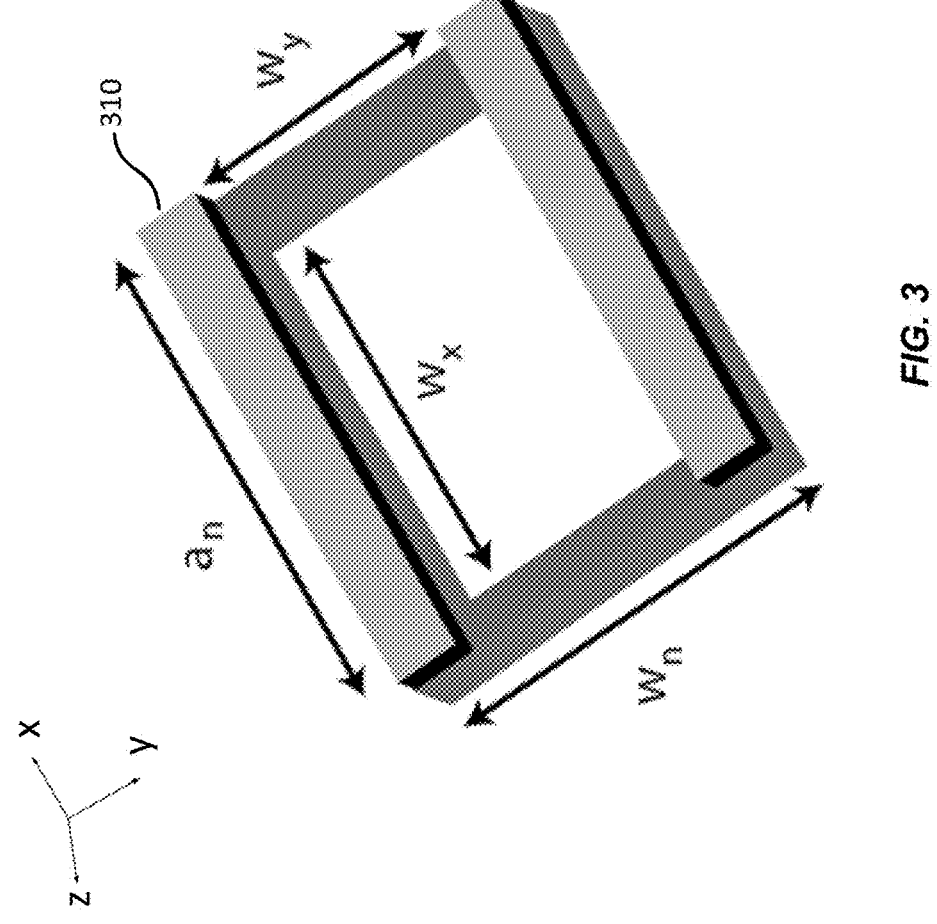
FIG. 3 illustrates a geometry of a unit cell of the inner electrode of the electrostatic transducer according to one embodiment of the present disclosure.

FIG. 3 illustrates a geometry of a unit cell of the inner electrode of the electrostatic transducer according to one embodiment of the present disclosure. The inner electrode of the electrostatic transducer is patterned to form a phononic crystal cavity consisting of multiple identical unit cells, with the unit cell as depicted in FIG. 3. The inner electrode beam 310 is oriented along the x-direction. These unit cells can be completely metallized with a 15-nm layer of TiN on top of a 220-nm silicon membrane. The mechanical behavior of phononic crystal electrostatic transducer in the microwave-mechanical system can be investigated via Finite-element method (FEM) simulations.

Figures 4A, 4B, 4C:
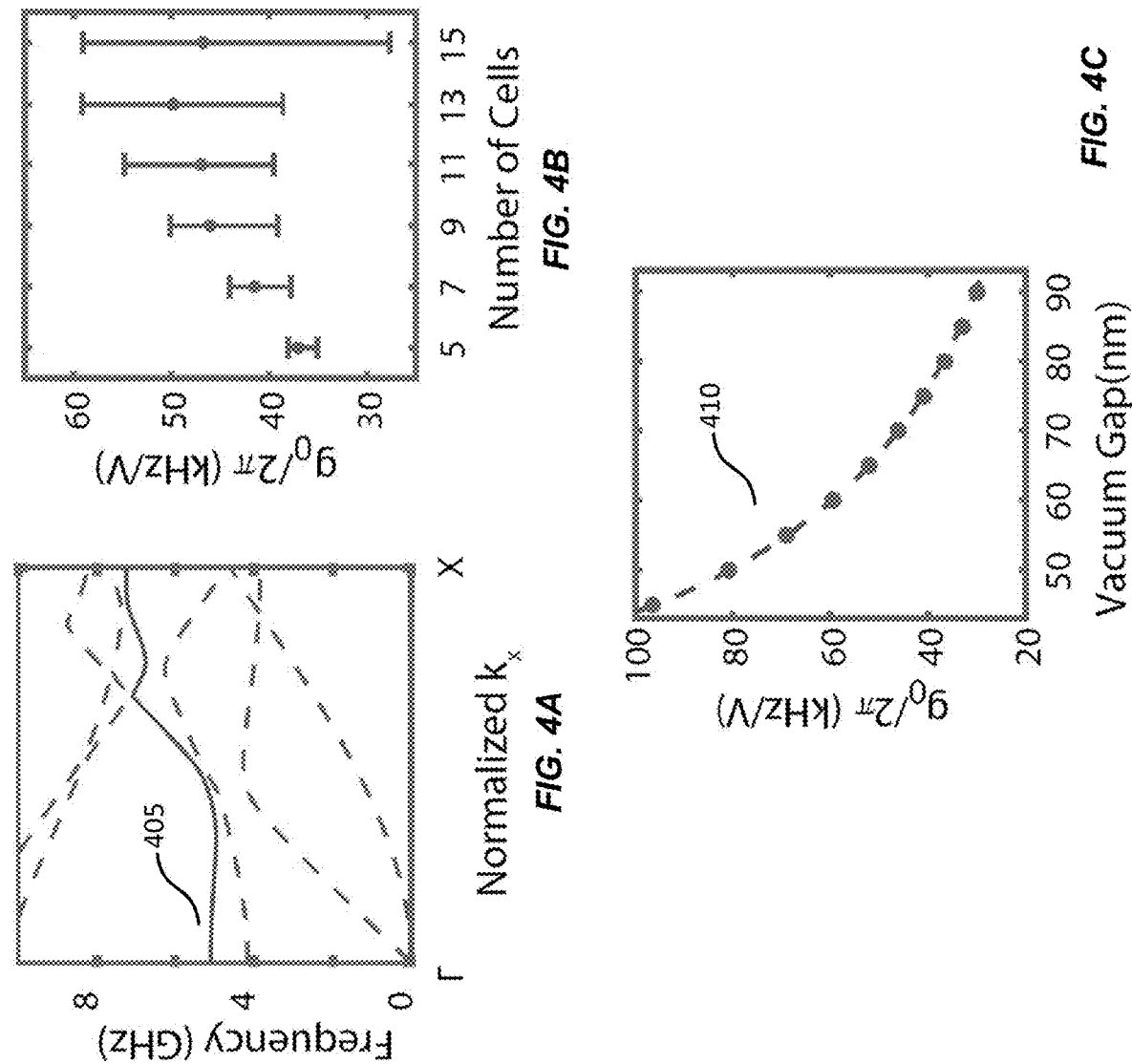
FIG. 4A is an acoustic band diagram of a unit cell of the inner electrode of the electrostatic transducer according to one embodiment of the present disclosure.
FIG. 4B shows disorder simulations of coupling strength with respect to the number of unit cells of the inner electrode of the electrostatic transducer according to one embodiment of the present disclosure.
FIG. 4C illustrates the average coupling strength as a function of vacuum gap size between the inner electrode and the outer electrode according to one embodiment of the present disclosure.

FIG. 4A is an acoustic band diagram of a unit cell of the inner electrode of the electrostatic transducer according to one embodiment of the present disclosure. The solid line 405 represents the Γ point of the breathing mode. The breathing mode is selected because it has a displacement profile that significantly modulates the electromechanical capacitance.

The breathing mode is further necessary to ensure phase matching of the electromechanical interaction. Once multiple unit cells are attached to form a 1-D chain and are clamped by phonon shields that have a full bandgap, they hybridize to form a supermode that spans all the unit cells, which is the mechanical mode of interest.

Ideally, the inner electrode can have as many unit cells as possible, since the electromechanical interaction strength scales proportionally with $\sqrt{N_{cells}}$. In practice, however, fabrication disorder typically leads to mode break-up, limiting the number of cells that can be utilized. This phenomenon can be investigated via disorder simulations, which constitutes a crucial tool in investigating the disorder limited properties of periodically patterned acoustic and optical structures. The disorder can be modeled as random changes in the center positions and the width of the negative patterns, which are etched to form the actual structure. These random changes are represented as realizations of independent Gaussian random variables with zero mean and standard deviation σ. The precise algorithm is as follows: (i) the center of the etched filleted rectangles is varied by σ in each direction and (ii) the height and width of the rectangles are varied by 2σ. Since each simulation represents a given disorder realization, multiple instances for a given number of unit cells are simulated to accurately extract the statistics.

FIG. 4B shows disorder simulations of coupling strength with respect to the number of unit cells of the inner electrode of the electrostatic transducer according to one embodiment of the present disclosure. The impact of disorder on the coupling strength can be investigated with standard deviation σ=2 nm and 55 realizations for each data point. The simulations are for a 70-nm vacuum gap. In this situation, the changes in the mode profile and potential disorder-induced mode breakup is captured in variations in the coupling strength, which is the experimentally relevant parameter. It can be seen that up until 9 unit cells, g$_0$ grows with the number of cells. However, beyond this number, the growth rate diminishes, and the disorder-induced variations increase substantially. At 9 unit cells and a 70-nm gap, a coupling strength of $46_{-7}^{+4}$ kHz/V is in excellent agreement with the experimental results.

FIG. 4C illustrates the average coupling strength as a function of vacuum gap size between the inner electrode and the outer electrode according to one embodiment of the present disclosure. The inner electrode includes 9 unit cells. The simulated average values are in the presence of fabrication disorder. The theoretical fit 410 is proportional to gap$^{-1.66}$. The fit 410 indicates that the coupling strength is a very strong function of the gap and the scaling is more rapid than that of a parallel plate capacitor.

Figure 5B:
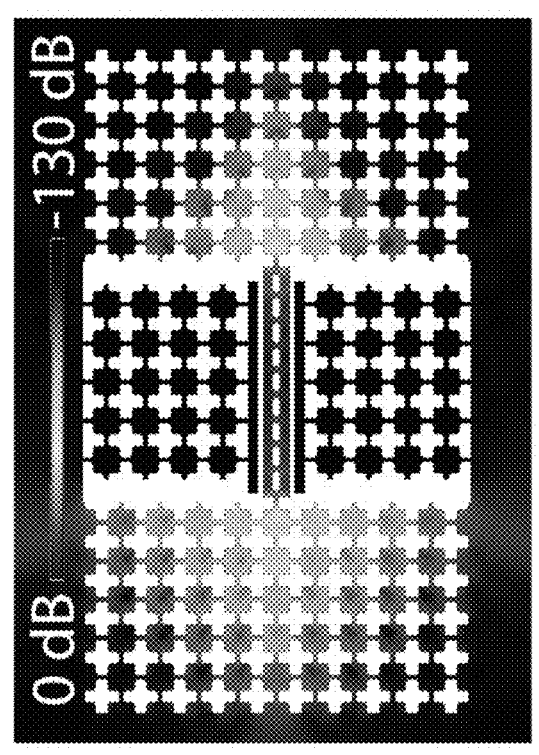
FIG. 5B is a logarithmic plot of mechanical energy density for 5 shield periods according to one embodiment of the present disclosure.
Figure 5A:
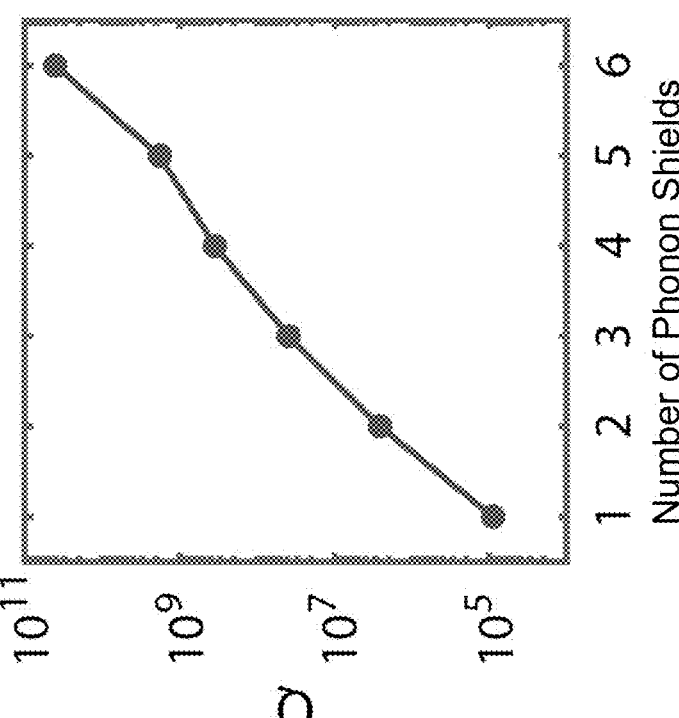
FIG. 5A shows the radiation limited acoustic quality factor as a function of the number of phonon shield periods in the absence of disorder according to one embodiment of the present disclosure.

FIG. 5A shows the radiation limited acoustic quality factor as a function of the number of phonon shield periods in the absence of disorder according to one embodiment of the present disclosure. FIG. 5B is a logarithmic plot of mechanical energy density for 5 shield periods according to one embodiment of the present disclosure. Since acoustic waves cannot propagate in vacuum, the only radiative leakage pathway is through the silicon substrate. This loss can be minimized by clamping the acoustic resonator with a phonon shield that has a complete bandgap. The effectiveness of the phonon shields in suppressing radiation loss can be investigated via finite-element simulations, where the continuum of modes in the substrate is modeled by a perfectly matched layer. The simulations provide the radiation limited mechanical Q in the absence of fabrication disorder. As depicted in FIG. 5A the mechanical quality factor increases nearly exponentially with the number of phonon shields.

In some examples, multiple electromechanical capacitors (e.g., 4 capacitors as shown in FIG. 1F) are attached to a single microwave resonator to provide redundancy in terms of the number of mechanical resonators. This is done to mitigate the impact of frequency shifts caused by fabrication disorder of the microwave resonators, where the different mechanical resonators span roughly 500 MHz (the disorder in the mechanical frequencies is much smaller than the microwave disorder). However, this approach leads to an increased capacitance between the microwave resonator and the coplanar waveguide (CPW), which gives rise to undesirably large external microwave decay. In order to increase the cooperativity and reach the strong-coupling regime, this decay channel has to be suppressed. An off-chip Purcell filter can be used for this purpose.

Figure 6:
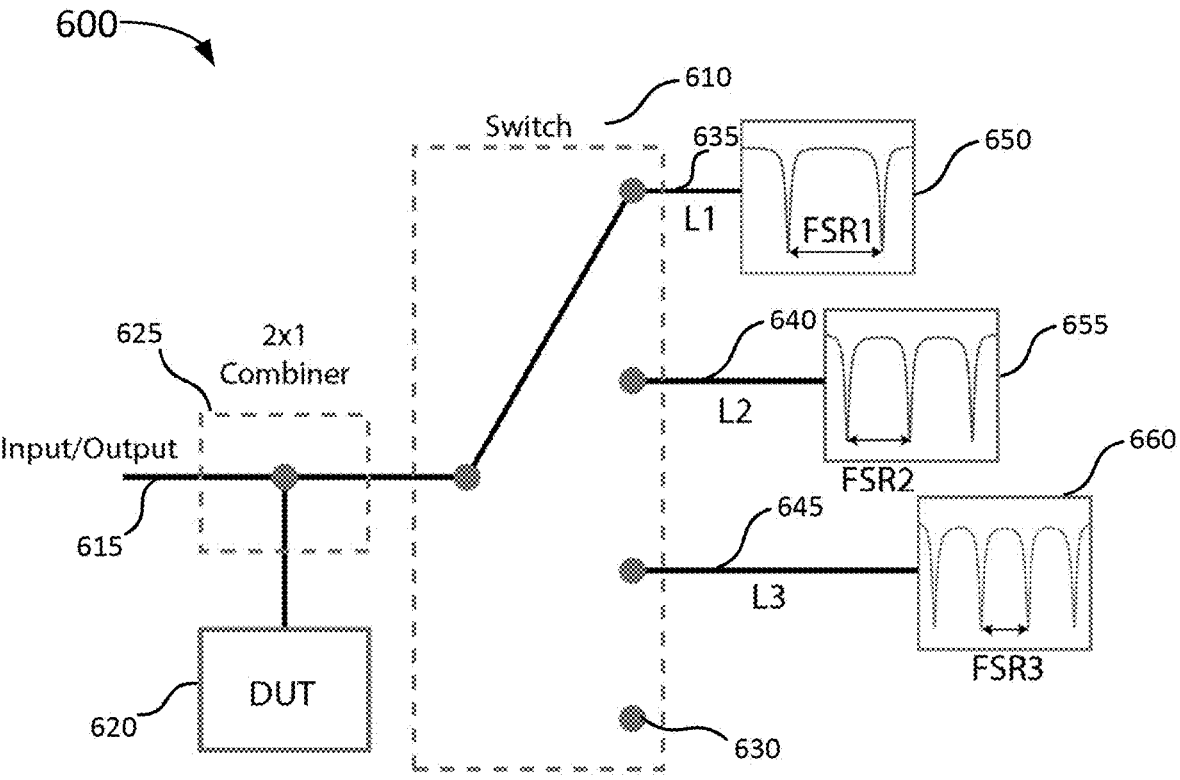
FIG. 6 is a circuit diagram of the Purcell filter configuration according to one embodiment of the present disclosure.

FIG. 6 is a circuit diagram 600 of the Purcell filter configuration according to one embodiment of the present disclosure. The filter can be placed in parallel with the microwave-mechanics system of the present disclosure, where the notch filter reduces the external coupling strength of the microwave resonator. The Purcell filter can be realized as open transmission lines with a multi-pole spectrum. To obtain approximate frequency matching between the devices in the microwave-mechanics system of the present disclosure and the filter, a mechanical switch 610 can be used for choosing among multiple filters with different free spectral ranges (FSRs). The FSRs can be in a span of 200 MHz to 500 MHz. In cases of perfect frequency matching between a device and a filter resonance, the external decay rate $\kappa_e/2\pi$ can be reduced to sub-200 kHz levels. Furthermore, a line in the mechanical switch may not be connected to a transmission line of the filter, for effectively turning off the filter. In FIG. 4, the input/output line 615 is attached to a circulator (not shown in the figure) used for investigation of devices in reflection mode. The input/output line 615 and a device under test (DUT) 620 can be connected to the mechanical switch 610 via a combiner 625. The final line 630 of the switch 610 is not connected to a transmission line. The transmission lines 635, 640, 645, which connect to respective filters 650, 655, 660, may have different lengths (e.g., L1, L2, L3). Their responses can be depicted as Lorentzian resonances separated by a given FSR that differs for each cable.

The $\lambda/4$ tunable microwave resonators can be formed by ICP-RIE etching of TiN films (t≈15 nm) with a sheet kinetic inductance of 40 pH/mil, which are sputtered on high resistivity (>3 kΩ) SOI substrates (device layer thickness 220 nm). The high kinetic inductance TiN films are chosen for two main reasons: (i) obtaining a large impedance (Z= $\sqrt{L/C}$) resonator in order to enhance the electromechanical interaction ($g_{em} \propto \sqrt{Z}$) and (ii) attaining a high degree of tunability via an external magnetic field to bring the microwave into resonance with mechanics. These goals can be achieved by forming a $\lambda/4$ resonator, with the inductive component realized by a nanowire. The total kinetic inductance of this structure is a function of film properties and geometry as shown in Equation (16) below, where $L_\square$ is the sheet inductance, and l is the nanowire length and w is the nanowire width.

$$L_k = L_\square \frac{8}{\pi^2} \frac{l}{w} \tag{16}$$

In order to maximize the impedance, the nanowires can be etched to be as narrow as possible. In some examples, a width of the nanowires is approximately 110 nm. Attempts to reduce wire width below this number led to reduced repeatability and a large disorder in resonator frequency.

A current passing through a TiN nanowire modifies the kinetic inductance in a nonlinear fashion as shown in Equation (17) below, where $I_*$ is the critical current of the nanowire.

$$L_k(I) = L_k(0)\left[1 + \left(\frac{I}{I_*}\right)^2\right] \tag{17}$$

Patterning the nanowires to form closed loops and applying an external perpendicular magnetic field can provide "wireless" means of modifying the kinetic inductance via the screening current induced through the loops. This way, the microwave resonator's frequency can be tuned.

The microwave resonator can be formed in a ladder-like topology as illustrated in FIG. 1F. FEM simulations indicate that the kinetic inductance excellently matches Equation (16) and there is negligible geometric inductance, leading to a kinetic inductance participation ratio of approximately unity (>98%). Furthermore, the impedance of the microwave resonator is calculated to be 2.5 kΩ. The calculated lumped element equivalent circuit parameters for the microwave resonator of device B can be seen in Table 1 as shown below. Despite a substantial impedance, due to a very small mechanical capacitance, the electrical energy participation ratio for the mechanical capacitor ($\eta=C_m/(C_m+C_r)$) can be low (e.g., 1.5%). The low participation ratio permits galvanically connecting multiple electromechanical capacitors to the microwave resonator.

Table 1 is a summary of parameters for two devices fabricated and characterized according to one embodiment of the present disclosure. Based on these parameters, different devices can be selected to exhibit specific features of the microwave-mechanics system in the present disclosure. Due to its larger electromechanical coupling strength, device B can enter the strong coupling regime and attain large cooperativities above 1000. On the other hand, device A has the larger energy decay lifetime and is well suited to demonstrate the substantial lifetimes that can be achieved. Furthermore, as it employs less frequency tuning (due to a smaller mechanics-cavity detuning at zero magnetic field), the lifetimes can be measured at a lower temperature (20 mK). With the low temperature, the heating due to the current on the coil is minimized, which makes it more suitable to perform sensitive sideband thermometry measurements and investigate two-level system (TLS) physics without thermal saturation of TLS. The referenced maximum decay lifetime and the coherence time are at the few-phonon level.

TABLE 1

| Summary of device parameters. | | | | | | | | |
|---|---|---|---|---|---|---|---|---|
| Device | $\omega_m/2\pi$ (GHz) | $\omega_r^{max}/2\pi$ (GHz) | $\kappa_i/2\pi$ (kHz) | $\kappa_e/2\pi$ (kHz) | $g_0/2\pi$ (kHz/V) | $\tau_d^{max}$ (μs) | $\tau_c^{max}$ (μs) | $T_{MXC}$ (mK) |
| A | 5.087 | 5.096 | 520 | 800 | 22.0 | 265 | 8 | 20 |
| B | 5.296 | 5.483 | 775 | 490 | 45.4 | 77 | 2 | 90 |

Figure 7:
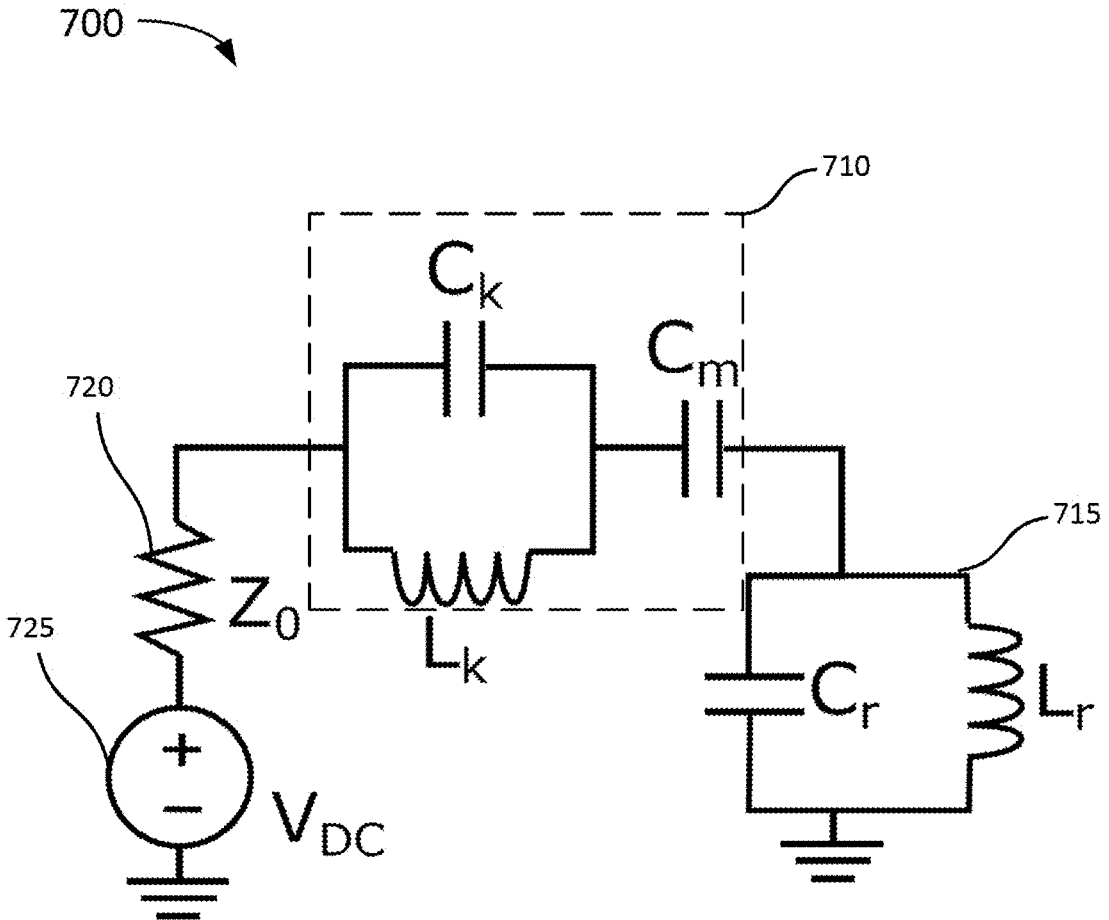
FIG. 7 is an equivalent electrical circuit of the microwave-mechanics system according to one embodiment of the present disclosure.

FIG. 7 is an equivalent electrical circuit 700 of the microwave-mechanics system according to one embodiment of the present disclosure. The calculation of the electromechanical coupling strength via FEM simulations can be sufficient to describe the behavior of the microwave-mechanics system which consists of two coupled resonators. However, obtaining an electrical equivalent circuit for the mechanical resonator is crucial for making the analysis of complex electromechanical circuits more tractable. For this purpose, the mechanical resonator 710 is modeled by a parallel LC resonator ($C_k$,$L_k$) in series with a capacitor $C_m$. The coupling to the lumped element microwave resonator ($C_r$,$L_r$) 715 is capacitive via $C_m$. The mechanical resonator 710 is also capacitively coupled to the CPW which has an impedance $Z_0$ 720. An external voltage bias applied to the mechanical resonator 710 can be modeled by a DC voltage source 725.

The equivalent mechanical capacitance can be expressed in Equation (18) as shown below.

$$C_k = \frac{2C_m^2\omega_m}{\hbar(\partial_x C_m x_{zpf} V_{DC})^2} - C_m \tag{18}$$

The equivalent mechanical inductance can be obtained following the calculation of $C_k$ by noting that $@_m=[L_k(C_k+C_m)]^{-1/2}$. This circuit model provides the correct expression for the electromechanical coupling strength, which is attained by capacitive coupling between the two circuit modes, as shown in Equation (19) below.

$$g_{em} = \frac{C_m}{\sqrt{(C_k + C_m)(C_r + C_m)}}\sqrt{\omega_r\omega_m} \tag{19}$$

In this capacitive coupling, the value of $C_r$ primarily sets the zero-point fluctuations of voltage for the microwave resonator since there is a small electromechanical participation ratio ($\eta=C_m/(C_m+C_r)\ll1$). The small participation ratio of the electromechanical capacitor is caused by the small physical dimensions of the capacitor which is commensurate with 1 μm transverse acoustic wavelength at 5 GHz. This can lead to the electrical energy on top of the electromechanical capacitor to be substantially diluted compared to the total electrical energy stored on the microwave resonator.

Table 2 is a summary of parameters for the equivalent circuit for device B according to one embodiment of the present disclosure. The inventors note that the equivalent circuit model parameters for the mechanical resonator are dependent on the external voltage bias $V_{DC}$. This scaling is noted in Table 2, where $L_k$ and $C_k$ are provided for 1V. The mechanical parameters $C_k$ and $L_k$ are dependent on the applied external voltage. The given values are for 1 V and the dependence on $V_{DC}$ is specified.

TABLE 2

| Equivalent circuit parameters for device B. | |
| --- | --- |
| Parameter | Value |
| $C_m$ | 0.2 fF |
| $C_r$ | 12.1 fF |
| $L_r$ | 75.8 nH |
| $\eta$ | 1.5% |
| $C_k$ | 43.5 nH (1 V/$V_{DC}$)$^2$ |
| $L_K$ | 21.1 fF ($V_{DC}$/1 V)$^2$ |

TABLE 2-continued

| Equivalent circuit parameters for device B. | |
| --- | --- |
| Parameter | Value |
| $f_{r,m}$ | 5.26 GHz |
| $g_0/2\pi$ | 45.4 kHz/V |

In the circuit model illustrated in FIG. 7, the mechanical resonator is capacitively coupled to the CPW which has an impedance $Z_0$=50Ω. This leads to some direct external decay to the CPW. However, when the DC voltage is at 25 V, due to the massive equivalent capacitance, this readout is at the level of 5 Hz, which is negligible and further emphasizes the need for a microwave cavity in order to enhance electromechanical readout of mechanics.

Measurement Setup

The chip for the microwave-mechanics system in the present disclosure can be wire-bonded to a printed circuit board (PCB). The PCB can be placed into a copper box and then mounted to the mixing stage of the dilution refrigerator at ~15 mK. The box has a coil on top for magnetic field tuning the microwave resonators. The coil is obtained by hand winding a superconducting wire around a cylindrical extrusion.

The device is measured in reflection with the aid of a cryogenic circulator. A bias tee is placed between the chip and the circulator to enable DC biasing of the transducer and readout of the microwave cavity via the same CPW. The RF input line consists of multiple cascaded attenuators with a total attenuation of 74 dB. A tunable attenuator is further added to the input line to control the input power in a programmable manner. The DC input has no attenuation and is directly attached to the bias tee (low frequency transmission band up to 500 MHz). At the output, an amplifier chain consists of a high-electron-mobility transistor (HEMT) amplifier thermalized to the 4K stage and a room temperature amplifier, with a total gain of ~65 dB.

The external DC voltage for the electromechanical interaction and the current for the tuning coil can be applied via a multi-channel programmable low-noise DC source. Since a significant amount of current is used to tune the microwave resonators, the normal metal parts in the coil wiring may lead to spurious heating of the mixing stage. The coherent response of the mechanics-cavity system can be probed via a vector network analyzer (VNA) in reflection. For thermometry and investigations of the full driven response of the system, the microwave emission can be detected by a spectrum analyzer. An OPX+ module from Quantum Machines headquartered as Tel Aviv, Israel can be used for time-resolved measurements. This tool enables the generation of pulses with an arbitrary waveform generator (AWG), heterodyne detection, demodulation of signals via a digitizer, and the processing of detected signals with a field-programmable gate array (FPGA).

Following the fabrication of the devices, the measured resonance frequencies can be found in good agreement with the device modeling, within a random offset of approximately 300 MHz, which can be attributed to fabrication disorder. The tunability of the devices can be tested by applying external magnetic fields via currents passing through a superconducting coil mounted on top of the sample box. For small tuning compared to the frequency, the frequency shift can be determined based on Equation (20) below, where k is a device dependent proportionality constant and B is the external perpendicular magnetic field amplitude:

$$\Delta_f = -kB^2 \qquad (20)$$

Figure 8:
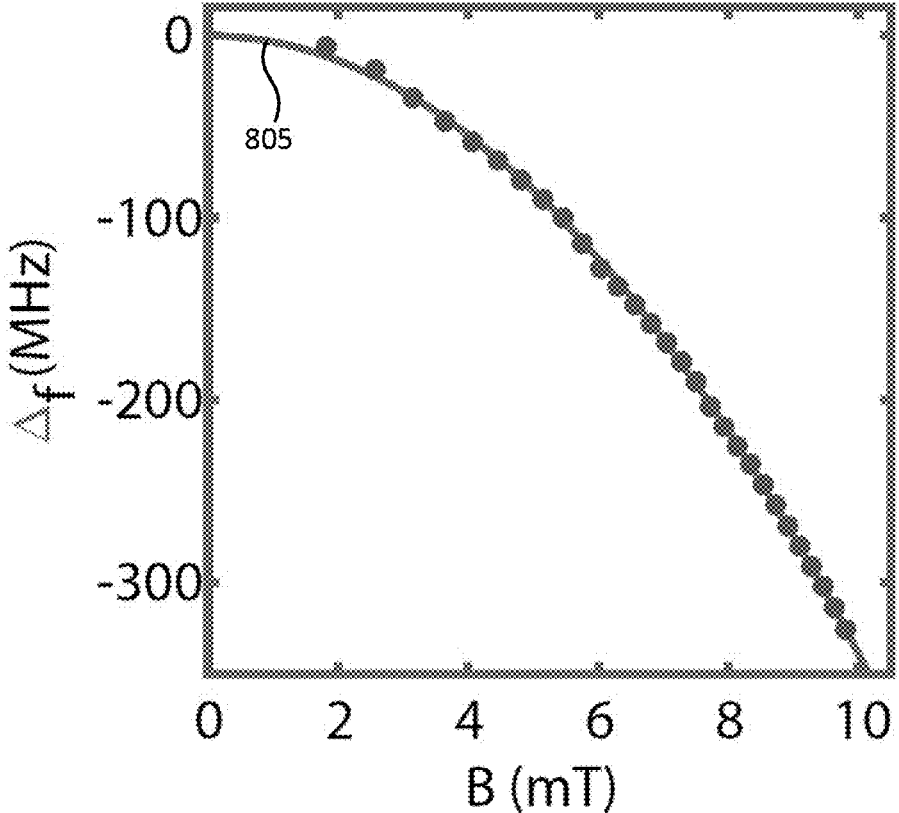
FIG. 8 illustrates a change in the microwave resonance frequency based on the applied external perpendicular magnetic field according to one embodiment of the present disclosure.

FIG. 8 illustrates a change in the microwave resonance frequency based on the applied external perpendicular magnetic field according to one embodiment of the present disclosure. The solid line 805 is a parabolic theory fit. The frequency when B=0 is 5.48 GHz. The parabolic theory fit verifies the frequency shift's parabolic dependence on the magnetic field amplitude as shown in Equation (20). The devices can be tuned by about 6% of their resonance frequency without causing any substantial degradation of the microwave intrinsic quality factor beyond $\kappa_i/2\pi\sim500$ KHz.

Characterization and Measurements

The fabricated electromechanical resonators can be characterized in a dilution refrigerator with a base temperature of 20 mK. A coplanar waveguide is connected to the device for simultaneously applying DC voltages to the mechanical capacitor and probing the microwave resonator in reflection via its coupling to the waveguide. In the absence of electromechanical coupling, the bare microwave cavity response can be measured using a VNA. To locate the mechanical resonance, the frequency of the microwave resonator can be continuously tuned via an external magnetic field. The electromechanical interaction leads to a large reflection at the point where the microwave and mechanical frequencies cross, in a phenomenon known as the EIT.

Figures 9A, 9B, 9C, 9D:
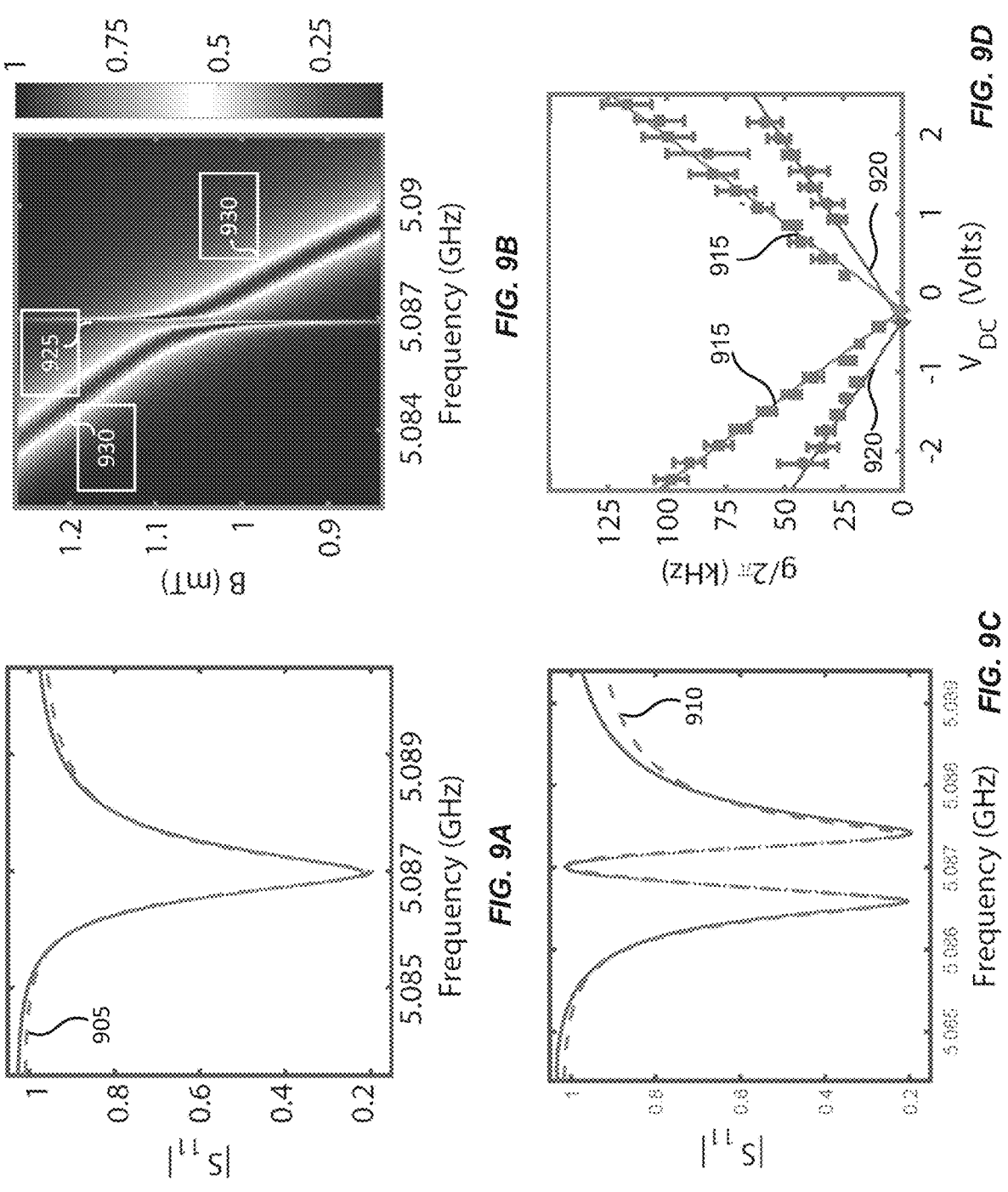
FIG. 9A shows the reflection spectrum of a TiN microwave cavity with the direct current (DC) voltage set to zero and with the cavity detuned from the mechanical resonance for device A according to one embodiment of the present disclosure.
FIG. 9B shows the reflection spectrum of the cavity biased at $V_{DC}=10$ V as a function of the external magnetic field for device A according to one embodiment of the present disclosure.
FIG. 9C shows a cross-section of the data where the microwave and mechanics are resonant in FIG. 9B according to one embodiment of the present disclosure.
FIG. 9D shows extracted coupling rates from electromechanically induced transparency (EIT) traces at different voltages for two devices according to one embodiment of the present disclosure.

FIG. 9A shows the reflection spectrum of a TiN microwave cavity with the DC voltage set to zero and with the cavity detuned from the mechanical resonance for device A according to one embodiment of the present disclosure. The reflection spectrum can be fit to a theoretical expression. From the theoretical fit (dashed line 905), $\kappa_i/2\pi=520$ KHz and $\kappa_e/2\pi=800$ kHz can be obtained.

FIG. 9B shows the reflection spectrum of the cavity biased at $V_{DC}=10$ V as a function of the external magnetic field for device A according to one embodiment of the present disclosure. The broad feature 930 is the microwave. The narrow constant frequency feature 925 is the mechanics, which indicates a signature of the mechanical mode at 5.087 GHz.

FIG. 9C shows a cross-section of the data where the microwave and mechanics are resonant in FIG. 9B according to one embodiment of the present disclosure. The dashed line 910 depicts a theory fit to the EIT lineshape.

FIG. 9D shows extracted coupling rates from EIT traces at different voltages for two devices according to one embodiment of the present disclosure. The electromechanical coupling rate can be extracted using a theoretical fit for the EIT response, and plotted as a function of the applied voltage in FIG. 9D. As evident by lines 915 for device B, the coupling rate is found to be a linear function of the voltage bias with a slope ($g_{0,B}/2\pi=45.4\pm1.1$ kHz/V) closely matching the results from numerical modeling. In addition, measurement results from device A with an identical geometry as device B can be fit into lines 920, but with a small coupling $g_{0,A}/2\pi=22.0\pm1.4$ kHz/V. The smaller coupling rate is likely impacted by mode-breakup due to fabrication disorder. An interesting feature in the data is the small non-zero coupling at the zero-voltage bias, where zero coupling is achieved at a negative offset voltage. This feature is found to be persistent in a shorted capacitor geometry and in the absence of a voltage source, which may indicate the presence of trapped charges in the transducer. The zero-coupling voltage offset voltage for device A is −0.36 V and for device B is −0.22 V. Even after disconnecting the DC supply and directly shorting the electrodes, signs of electromechanical coupling may still be observed, which indicate that the offset may be due to trapped charges.

Coherence Properties

The coherence properties of the microwave-mechanics system can be investigated by exciting the mechanical resonator with a pulse and registering its free decay via electromechanical readout. The electromechanical readout rate can be a function of the detuning between the mechanical and microwave resonances $\Gamma_{em}=g^2\kappa/(\Delta^2+(\kappa/2)^2)$. At any given detuning, the total decay rate of the mechanics can be given as $\Gamma=\Gamma_i+\Gamma_{em}$, where $\Gamma_i$ is the intrinsic decay rate. In order to precisely measure $\Gamma_i$, multiple measurements can be performed where detuning $\Delta$ can be gradually increased, leading to a gradual reduction in Tem until the total decay becomes dominated by the intrinsic part. Measurement data can be collected using device A with a DC voltage of 1.2 V.

Figures 10A, 10B, 10C:
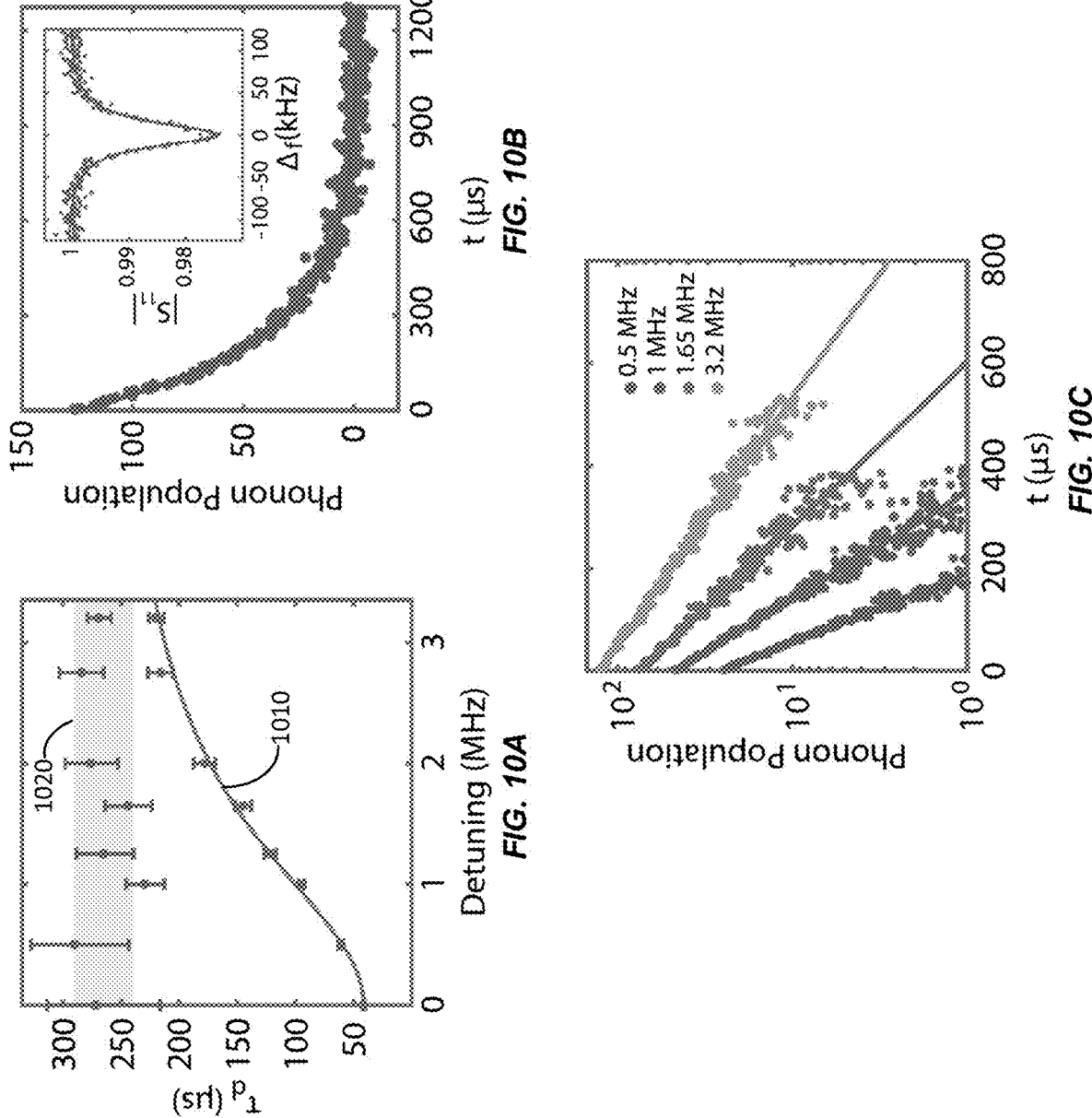
FIG. 10A illustrates the total lifetime ($\tau_d$) extracted from ringdown measurements for different mechanics-microwave detunings $\Delta/2\pi$ according to one embodiment of the present disclosure.
FIG. 10B shows free energy decay (ringdown) data for the maximum detuning of 3.2 MHz according to one embodiment of the present disclosure.
FIG. 10C shows log-scale ringdown plots as a function of the phonon number inside the mechanical resonator for different detunings according to one embodiment of the present disclosure.

FIG. 10A illustrates the total lifetime (Ta) extracted from ringdown measurements for different mechanics-microwave detunings $\Delta/2\,\pi$ according to one embodiment of the present disclosure. The data points along line 1010 show the different mechanics-microwave detunings. Fitting the total decay rate expression as a function of $\Delta$, an intrinsic $\tau_d$ lifetime of 265±25 μs can be extracted corresponding to a Q factor of $8\times10^6$. The line 1010 in FIG. 10A shows a theory fit of the mechanics-microwave detunings. The ringdown range is indicated by the shaded region in FIG. 10A. The data points around the shaded region 1020 show $\tau_{d,i}$ can be found at each detuning by subtracting the contribution from the electromechanical readout.

FIG. 10B shows free energy decay (ringdown) data for the maximum detuning of 3.2 MHz according to one embodiment of the present disclosure. At the maximum detuning, the regime where the intrinsic decay dominates the dynamics can be reached. The total energy decay lifetime $\tau_d$ of 220±6 μs as shown in FIG. 10B strongly supports the large intrinsic lifetime inferred from the fits. The inventors note that the measured mechanical lifetime is remarkably large for a device with compact geometry, corresponding to a quality factor that is more than two orders of magnitude larger than the state-of-the-art piezoelectric devices.

Apart from the energy relaxation lifetime, the coherence time of the mechanics of the devices in the present disclosure bears significance for future quantum applications. The coherence time can be found to be the reciprocal of the linewidth extracted from fitting the EIT response in the large detuning regime ($\Delta\gg\Gamma_i$). The inset of FIG. 10B shows the mechanical spectrum measured at a probe power corresponding to a maximum of 4 phonons in the mechanical resonator. The theory fit gives a linewidth of 33 kHz, corresponding to $\tau_c\approx5$ μs which is substantially shorter than the lifetime. This discrepancy between the decay and coherence times can indicate the presence of frequency jitter.

FIG. 10C shows log-scale ringdown plots as a function of the phonon number inside the mechanical resonator for different detunings according to one embodiment of the present disclosure. While the exact nature of this dephasing remains unknown, it has been hypothesized to be caused by interaction with the TLS defects. To better understand possible dephasing and decay sources, ringdown measurements for different numbers of phonons in the mechanical resonator can be carried out. The intra-cavity phonon number can be changed in accordance with the readout efficiency $\Gamma_{em}/\Gamma$, keeping the output detection powers nearly constant at the lowest levels detectable by the amplifiers to ensure the device can reach the low-phonon regime while maintaining feasible measurement times. FIG. 10C shows exponential decay with no sign of power dependence down to the single-phonon level. Similarly, the coherence time extracted from EIT measurements can be insensitive to phonon numbers in the range of from about 4 to about 500. Although signatures of saturable loss (a common signature of a TLS bath) may not be found in this measurement setting, the coherence and decay times can change as a function of the applied DC voltage, providing direct evidence for the presence of TLS defects.

Limits of Parametric Enhancement

The maximum achievable rate of the electromechanical interactions can be set by the magnitude of the DC voltage that can be applied before the onset of any spurious heating or instabilities in the system. There may not be significant leakage current passing through the devices because of the freezing of the charge carriers at the low measurement temperatures. However, applying large voltages to the narrow-gap capacitors in the devices leads to strong electric fields which may lead to ionization and dielectric breakdown. The leakage current through the transducer structures can be measured as a function of applied voltage.

Figure 11C:
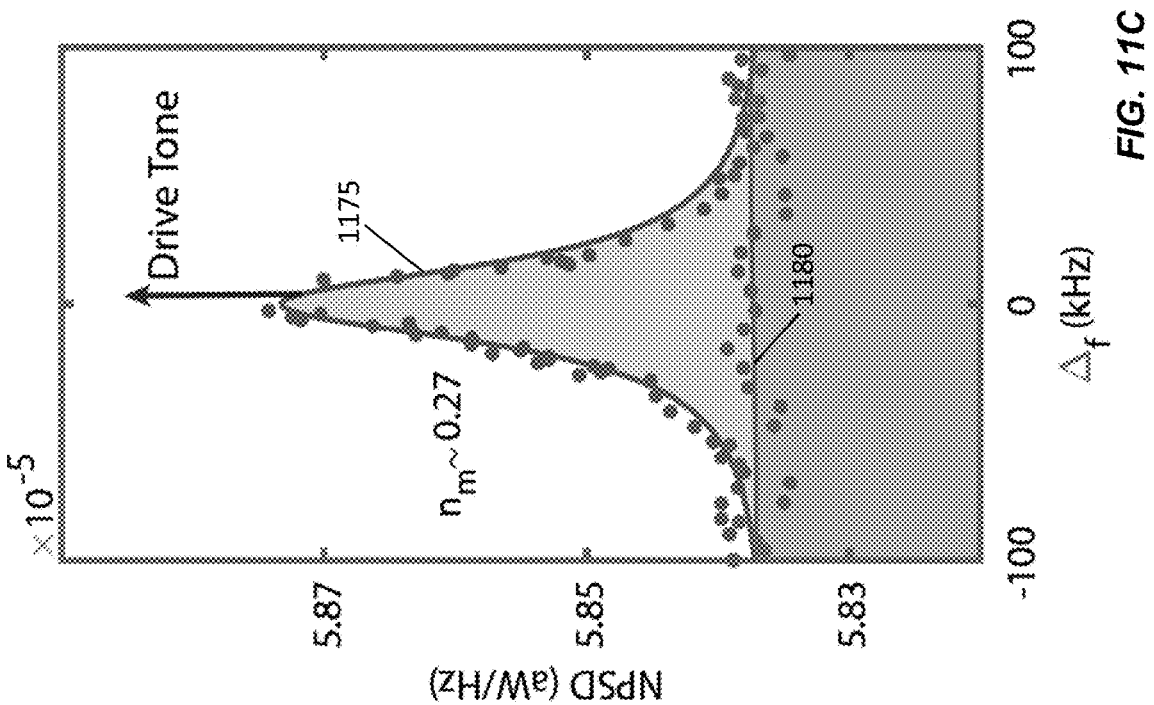
FIG. 11C shows the driven response of the mechanics at 3.1 V detected by a spectrum analyzer according to one embodiment of the present disclosure.
Figure 11A:
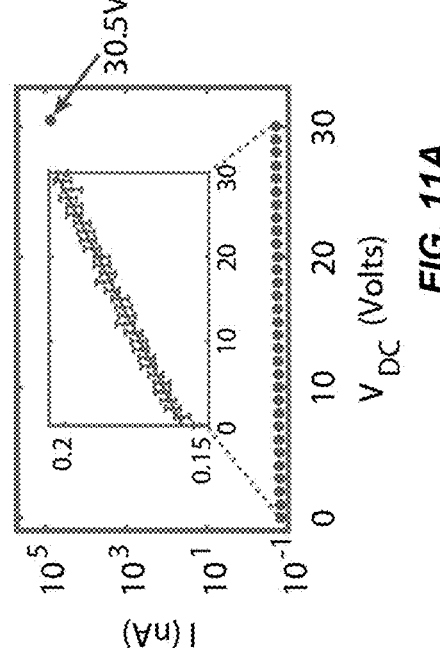
FIG. 11A shows the leakage current through the transducer as a function of the applied voltage according to one embodiment of the present disclosure.

FIG. 11A shows the leakage current through the transducer as a function of the applied voltage according to one embodiment of the present disclosure. The leakage current can be measured with a picoammeter. Error bars are too small to be visible. The inset is a zoomed-in view of the data for the range 0-30 V, with a line fit to a 500 GΩ resistance. The leakage current (with a characteristic resistance of ~500 GΩ) may be dominantly caused by the cables in the measurement, bounding the actual leakage through the device to be below the measurement sensitivity. When increasing the voltage beyond 30 V, an abrupt spike in the leakage current can be observed. The spike may be initially attributed to dielectric breakdown. However, imaging of the devices post warm-up at the room-temperature indicates that the sudden leakage is most likely due to the onset of pull-in instabilities, resulting in the shut-down of the capacitor gap. The onset of this instability in a consistent range (29-31 V) can be found by repeating this experiment on four identical test devices.

Figure 11B:
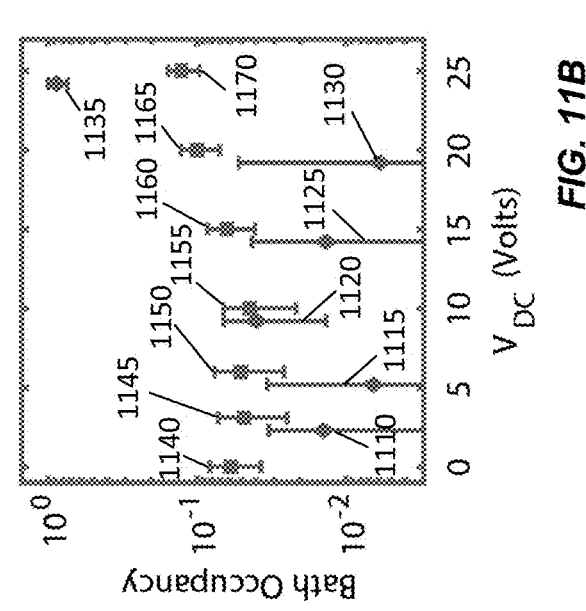
FIG. 11B shows extracted mechanics ($n_{b,m}$) and microwave bath ($n_{b,r}$) occupancy as a function of the applied DC voltage according to one embodiment of the present disclosure.

FIG. 11B shows extracted mechanics and microwave bath occupancy as a function of the applied DC voltage according to one embodiment of the present disclosure. The mechanics bath occupancy ($n_{b,m}$) is illustrated by data points 1110, 1115, 1120, 1125, 1130, and 1135. The microwave bath occupancy ($n_{b,r}$) is illustrated by data points 1140, 1145, 1150, 1155, 1160, 1165, and 1170. A small horizontal offset between the two data sets is added for greater visibility. As evident, the baths remain in the ground state for a large voltage range, with the exception of the mechanical bath at 25 V as shown by data point 1135, where the occupancy rises to 0.86±0.08 phonons. The inventors note that attempts to do measurements at higher voltages were unsuccessful due to the onset of the pull-in instability. The slightly higher occupation of the microwave bath across all voltages (including 0 V) is likely caused by the absence of Infrared (IR)-shielding in the measurement setup, which leads to the generation of quasiparticles, and can raise the microwave bath temperature in devices with a large kinetic inductance. Regardless, despite the observation of these subtle features testifying to the accuracy of the measurement technique herein, no indication of significant pump-induced heating is observed in the mechanical resonator or the microwave cavity for a wide range of voltages, which is a promising feature of the electrostatic driving methods described herein.

FIG. 11C shows the driven response of the mechanics at 3.1 V detected by a spectrum analyzer according to one embodiment of the present disclosure. Side band thermometry can be performed to probe the signatures of any potential pump-induced heating (previously observed in similar devices under radio-frequency drives). The thermometry measurement process for the mechanical resonator is visualized in FIG. 11C. The solid line 1175 shows a fit of the driven response points to a Lorentzian response. The mechanical resonator is populated with 0.27 phonons due to the inelastic scattering of the drive tone. The detected emission from the mechanical resonator at 15 V in the absence of the drive is shown as data points along the line 1180 in FIG. 11C. The background level is set by the added noise from the amplifier chain. All data is from device A. The mechanical resonance can be located by measuring the incoherent emission from the inelastic scattering of the drive when the system is driven with a weak tone. A subsequent measurement with no drives shows a negligibly small emission, which is calibrated in experiments with long averages to extract the resonator's occupation. The mechanics-microwave system can be found to be in the quantum ground state for the entire range of applied voltages (e.g., 0-25 V). Despite observing no heating, the inventors note that the presence of a strong electromechanical back-action cooling (for the mechanical mode) and radiative cooling through the on-chip waveguide (for the microwave cavity) may mask a weak heating process. To find a more sensitive trace of any potential heating, thermometry can be performed in a regime where the microwave cavity is detuned far away from the mechanical resonator to reduce the effect of electromechanical back-action cooling and deduce the temperature of the phenomenological intrinsic baths that the mechanical and microwave resonators interact with.

The Strong-Coupling Regime

Figures 12A, 12B, 12C:
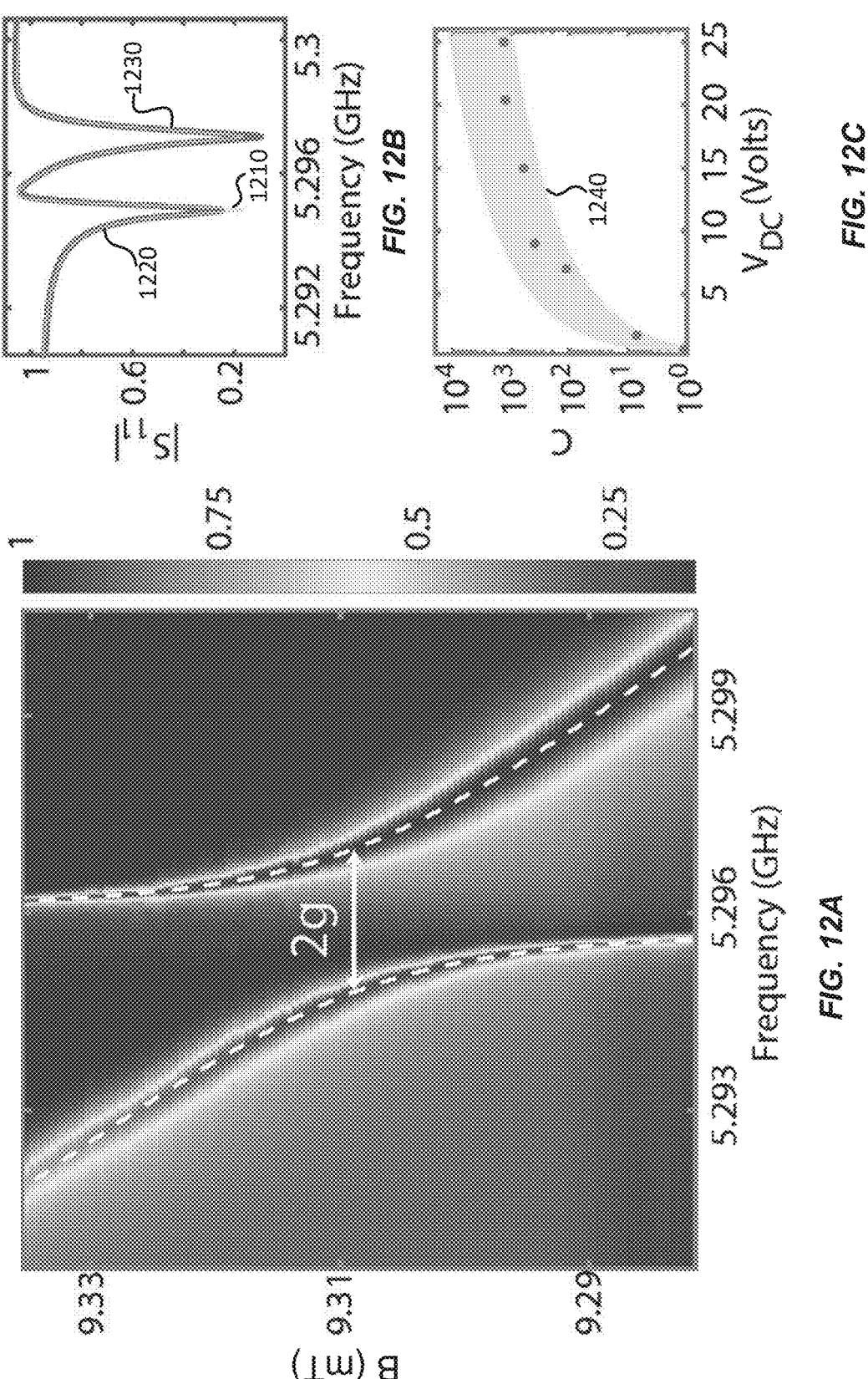
FIG. 12A illustrates measured reflection spectrum showing avoided crossing between the mechanical mode biased at $V_{DC}$=25V and the microwave cavity tuned with a magnetic field according to one embodiment of the present disclosure.
FIG. 12B shows a cross-section of the data in FIG. 11A showing the splitting between the two hybridized modes on resonance according to one embodiment of the present disclosure.
FIG. 12C shows the electromechanical cooperativity measured at different voltage values according to one embodiment of the present disclosure.

FIG. 12A illustrates a measured reflection spectrum showing avoided crossing between the mechanical mode biased at $V_{DC}=25V$ and the microwave cavity tuned with a magnetic field according to one embodiment of the present disclosure. The maximum electromechanical coupling rate within reach for the microwave-mechanics system can be investigated with the device B, which has larger $g_0$. Setting the external voltage to 25 V, different microwave frequencies can be tested by changing the external magnetic field, which gives rise to an avoided crossing feature between the microwave and mechanics as seen in FIG. 12A. A parametrically enhanced electromechanical coupling rate of g=1.08 MHz can be extracted by fitting (e.g., a theory fit illustrated by the two dashed lines) the frequencies of the two hybridized modes to an avoided crossing model. This value corresponds to $g_0=42.7$ kHz/V which matches the values calculated at low voltages, indicating that the parametric enhancement scales linearly with voltage in the entire measurement range. In FIG. 12A, 2g indicates the splitting of the two modes at resonance.

FIG. 12B shows a cross-section of the data in FIG. 12A showing the splitting between the two hybridized modes on resonance according to one embodiment of the present disclosure. The gray solid line 1210 is a theory fit which includes the Fano effect accounting for the observed asymmetry. Achieving the strong-coupling regime is manifested clearly in the measurements of the reflection spectrum at resonance. A pair of hybridized modes 1220 and 1230 with linewidths of (κ+γ)/2=692 kHz can be seen, satisfying 2 g>κ+γ. Achieving the strong-coupling regime in the microwave-mechanics system is significant as it allows the coherent exchange of phonons and microwave photons, a prerequisite for utilizing electromechanical systems in a range of quantum applications.

FIG. 12C shows the electromechanical cooperativity measured at different voltage values according to one embodiment of the present disclosure. The intrinsic decay rates are obtained by ringdown measurements. The data points in all parts are taken with device B. The grey shaded region 1240 shows the range of cooperativity values calculated using the maximum values of couplings and lifetimes measured in different devices. Cooperativity is a key figure of merit in coupling mechanical modes to qubits and microwave resonators. The cooperativity can be defined as the ratio of the electromechanical readout rate to the intrinsic mechanical decay rate $\mathcal{C} = 4 \ g^2/(K_i li)$. The measured electromechanical coupling rates and the mechanical intrinsic decay rates (from the ringdown measurements) can be used to find the cooperativity as a function of bias voltage. For the maximum voltage value of 25 volts, it can be found that $\Gamma_i/2\pi = 4.8$ kHz $(\tau_d = 33 \ \mu s)$, corresponding to a cooperativity of 1270. The values of cooperativity assuming the maximum coupling rates and lifetimes can be measured and marked across different devices on the same plot as a guide. Cooperativity estimates can exceed $10^4$ at 25 V.

Thermometry

Sideband thermometry can be performed by measuring the emission from the microwave and mechanical resonators with a spectrum analyzer. The Hamiltonian of the microwave-mechanics system in the present disclosure is identical to that of a red-detuned optomechanical system with a large sideband resolution $(\omega_m/\kappa \gg 1)$. Hence, in order to extract the thermal occupancy values for the microwave and mechanical thermal baths, the noise power spectral density power spectral density (PSD) following the amplifier chain can be determined using Equation (21), where G is the amplifier gain in dB and $n_{add}$ is the noise added by the amplifiers.

$$S(\omega) = \hbar\omega 10^{G/10} \left( n_{add} + \frac{1}{2} + n_{wg} \left| \left(1 - \frac{\kappa_e \chi_r}{1 + g^2 \chi_m \chi_r}\right) \right|^2 + n_{b,r} \frac{\kappa_e \kappa_i |\chi_r|^2}{|1 + g^2 \chi_m \chi_r|^2} + n_{b,m} \frac{\kappa_e \gamma_i g^2 |\chi_r|^2 |\chi_m|^2}{|1 + g^2 \chi_m \chi_r|^2} \right) \quad (21)$$

In the microwave-mechanics system of the present disclosure, the microwave resonator interacts with an intrinsic bath of occupancy $n_{b,r}$ with rate $\kappa_i$ and the waveguide having an occupancy of $n_{wg}$ with rate $\kappa_e$. Similarly, the mechanical resonator is coupled to an intrinsic bath having an occupancy of $n_{b,m}$ with rate $\gamma_i$. The electromechanical interaction with strength g will further lead to Purcell decay into the microwave for the mechanics, giving rise to electromechanical back-action. The PSD expression also includes the bare electrical and mechanical susceptibilities which are given in Equations (22) and (23), where $\omega_r$ ($\omega_m$) is the microwave (mechanics) resonance frequency.

$$\chi_r^{-1}(\omega) = \kappa/2 - i(\omega - \omega_r) \quad (22)$$

$$\chi_m^{-1}(\omega) = \gamma_i/2 - i(\omega - \omega_m) \quad (23)$$

In the weak coupling regime, the mechanics and microwave resonator thermal occupancies can be expressed as in Equations (24) and (25) below, where $$C = \frac{g^2 \kappa \gamma_i^{-1}}{\Delta^2 + (\kappa/2)^2}$$

is the effective cooperativity when the mechanical and microwave resonators are detuned by $\Delta$.

$$n_r = \frac{\kappa_i n_{b,r} + \kappa_e n_{wg}}{\kappa_e + \kappa_i} \quad (24)$$

$$n_m = \frac{n_{b,m} + C n_r}{1 + C} \quad (25)$$

In the absence of any detuning and at large bias voltages, the cooperativity can become large, leading to substantial electromechanical cooling, which makes it challenging to unambiguously find the mechanical bath occupancy ($n_{p,m}$). Therefore, the devices can be operated in a low-cooperativity regime (large $\Delta$), which permits precise extraction of thermal bath occupancies. Extraction of the mechanical intrinsic bath occupancy is particularly important for quantum memory applications of the mechanical resonators of the present disclosure, as there may not be permanent electromechanical back-action cooling in this scenario and the thermal decoherence rate depends on this bath occupancy.

To facilitate the analysis, the emission due to the mechanics intrinsic bath can be simplified in Equation (26) as shown below, where $\delta = \omega - \tilde{\omega}_m$ is the detuning between the emission frequency and mechanical resonance frequency, with $\tilde{\omega}_m$ being the mechanical frequency shifted by the optical spring effect, $\gamma = \gamma_i + \Gamma_{em}$ being the total mechanical linewidth, and $\tilde{n}_m = n_{b,m} \gamma_i/\gamma$ being the thermal occupancy of the mechanical resonator due to fluctuations of the intrinsic mechanical bath.

$$S_m(\delta) \sim 4\tilde{n}_m \frac{\kappa_e}{\kappa} \frac{\Gamma_{em}}{\gamma} \frac{(\gamma/2)^2}{\delta^2 + (\gamma/2)^2} \quad (26)$$

To accurately utilize the expressions for the noise power spectral density, it is crucial to take into account the distinction between broadening due to frequency jitter and radiative coupling to an intrinsic bath for the mechanical resonator. To this end, the inventors note that the area underneath $S_m(\delta)$ is proportional to the total Purcell enhanced emission from mechanics, which is given as $\Gamma_{em} \tilde{n}_m$. Hence, it can be seen that Equation (26) represents the emission for a mechanical resonator that has a total linewidth $\gamma$ with arbitrary frequency jitter. To take the distinction between jitter and decay into account, once $\tilde{n}_m$ is extracted, only the mechanical intrinsic decay rate $\Gamma_i$ is to calculate the bath thermal occupancy as in Equation (27).

$$n_{b,m} = \tilde{n}_m \frac{\Gamma_{em} + \Gamma_i}{\Gamma_i} \quad (27)$$

The inventors note that, due to the small non-zero microwave bath occupancy, some emission from the mechanical resonator is due to microwave thermal fluctuations entering the mechanics by electromechanical back-action. This emission interferes with that of the microwave resonator and leads to noise squashing as can be seen in the term in Equation (21) proportional to $n_{b,r}$. This noise squashing is also taken into account in the analysis in order to correctly calculate the mechanical bath occupancy.

Generally, no significant emission from the mechanical resonator can be seen during thermometry, due to the mechanics being deep in its motional ground state. Due to the noise introduced by the HEMT amplifier, the spectrum analyzer traces can be noisy to an extent that precludes numerically fitting the mechanical emission. Thus, in order to accurately analyze this noisy data and extract the mechanical thermal occupancy, it is crucial to find the mechanical frequency, linewidth and decay rate at a given voltage.

The mechanical frequency, linewidth and decay rate at a given voltage can be obtained by investigating the driven response of the resonators. Following the application of a coherent tone in resonance with the mechanics resonator, the drive tone is elastically scattered, leading to a delta-like emission from the mechanics and the generation of a coherent phonon population defined as $n_{coh}=|\langle\hat{a}\rangle|^2$. These coherent population dynamics are the origin of the EIT response which can be detected by a VNA. However, the frequency jitter of the system also leads to inelastic scattering of the drive tone. For frequency noise which has a correlation time smaller than the decay rate, an emission with the cavity lineshape can be obtained as the absorbed incoherent phonons lose memory of the drive frequency due to frequency jitter. This inelastic scattering is due to the generation of a number of incoherent phonons in the cavity, whose population is $n_{inc}=\langle\hat{a}^\dagger\hat{a}\rangle-|\langle\hat{a}\rangle|^2$. The incoherent emission can enable extracting the cavity linewidth and frequency via fitting the Lorentzian response. This routine for parameter extraction is repeated prior to mechanics thermometry for each voltage to facilitate accurate calculations with Equation (26) and center the spectrum analyzer detection window.

Apart from extracting the lineshape of the mechanics, the driven response can also be used to make non-time-resolved measurement of the intrinsic decay rate $\Gamma_i$. The total coherent and incoherent phonon populations are related to the total decay rate $\Gamma_d=\Gamma_i+\Gamma_{em}$ and the total linewidth $\gamma$ as shown in Equation (28) below.

$$\frac{n_{inc}}{n_{coh}} = \frac{\gamma}{\Gamma_d} - 1 \qquad (28)$$

These phonon populations can be further related to the areas detected via the spectrum analyzer, where $S_\delta$ is the area underneath the coherent emission, and $S_{bb}$ ($S_{nb}$) is the area underneath the incoherent emission due to broadband (narrowband) frequency noise. Therefore, the relation between the decay rates can be expressed as in Equation (29), where the broadband frequency noise can be arbitrarily strong and the narrow-band noise weak.

$$\frac{\gamma}{\Gamma_d} = 1 + \frac{S_{bb}}{S_\delta}\left(1 - \frac{S_{nb}}{S_\delta}\right) \qquad (29)$$

The intrinsic decay rate $\Gamma_i$ can be obtained by subtracting the electromechanical readout rate from the total decay rate. The $\Gamma_i$ obtained in this manner can be used to extract the mechanical bath occupancy via Equation (27).

The total gain of the output line can be calibrated using thermometry of a 50Ω cryogenic terminator that is thermalized to the mixing (MXC) stage of the cryostat. The output line consists of a HEMT amplifier (LNF-LNC48C) thermalized to the 4 K stage and a room temperature amplifier. The MXC stage temperature is raised by reducing cooling power by turning off the turbo to reduce $^3$He/$^4$He mixture flow, and applying heat using the MXC stage heater. With no external input power, the output power from the amplifier chain can be measured with a spectrum analyzer at different mixing stage temperatures $T_{MXC}$. The measured output power has contributions from the thermal noise of the resistor thermalized to the MXC stage, and the HEMT noise characterized by a fixed noise temperature $T_{HEMT}$. The total power measured in an IF bandwidth $\Delta v_{IF}$ on the spectrum analyzer is equal to the sum of the Johnson-Nyquist noise from the two sources and is given by Equation (30) as show below, where $G_A$ is the absolute (net) gain factor of the output line, and is a combination of the total gain due to the amplifier chain and losses due to coaxial cables. At $T_{MXC}=10$ mK, the measured output power is dominated by HEMT noise.

$$P_{OUT} = \Delta v_{IF}k_B G_A(T_{MXC} + T_{HEMT}) \qquad (30)$$

The output gain $G_A$ can be calculated by subtracting the contribution of the HEMT noise from the total output power measured at various $T_{MXC}$. The measurement can be performed at multiple different MXC temperatures between 730 mK and 1.05 K. The mean and standard deviation of these measurements can be used to obtain $G_A$. Factor $\eta=(hv/kT)/(\exp(hv/kT)-1)$ can be used to account for corrections to Equation (21) due to the Bose-Einstein distribution in the regime $hv \sim k_B T$. Using this calibration method, a net gain of 65.6±0.4 dB can be obtained for the output line.

Pull-In Instability

Figure 13:
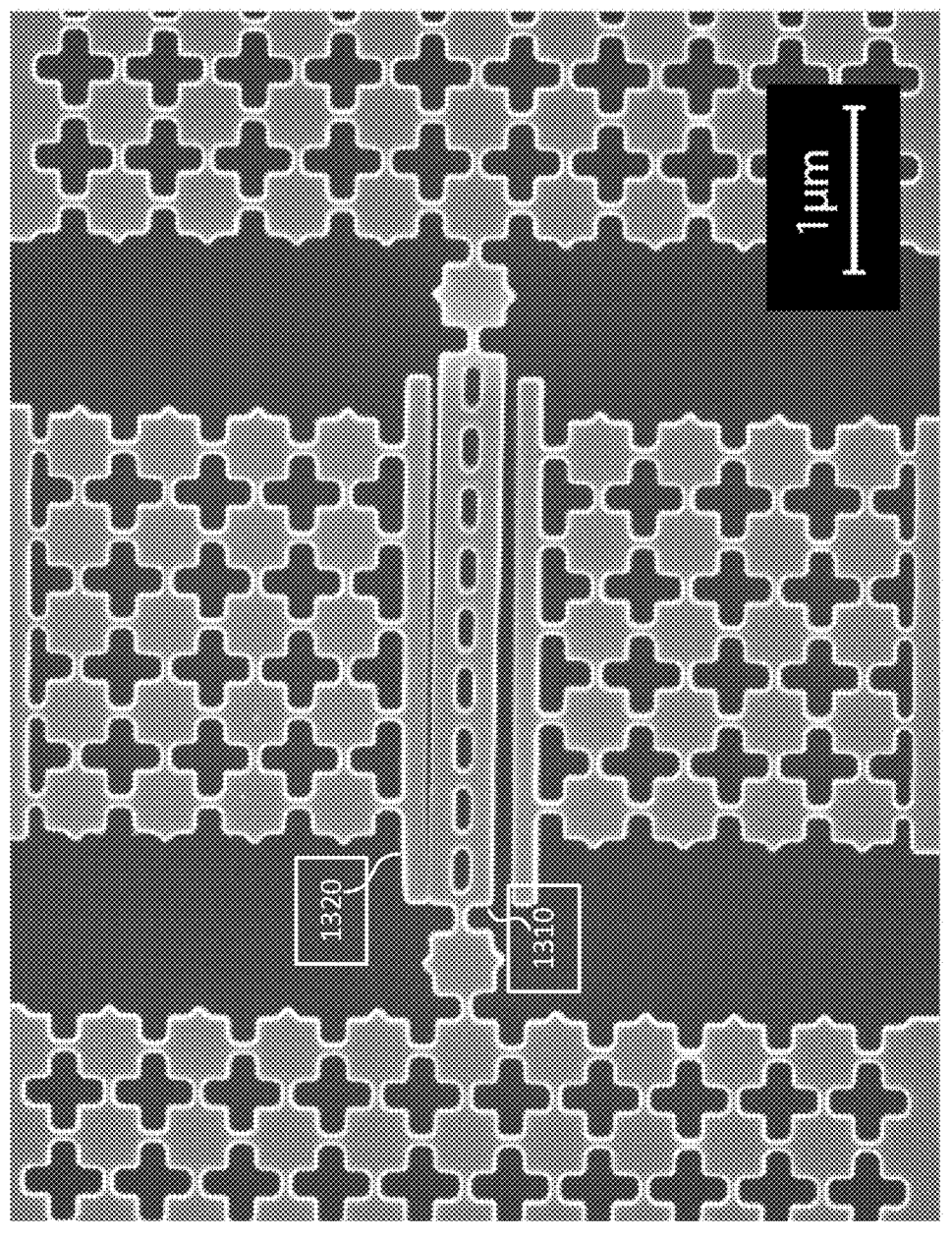
FIG. 13 is a post measurement SEM image of a transducer device which had permanently broken down according to one embodiment of the present disclosure.

FIG. 13 is a post measurement SEM image of a transducer device which had permanently broken down according to one embodiment of the present disclosure. In a flexible device, as a bias voltage continues to increase, an upper part of the flexible device moves rapidly downward, and the upper part and the lower part can eventually contact. This phenomenon can be called "pull-in." The pull-in phenomenon can be observed at the top-left corner of the electromechanical capacitor where the vacuum gap has become shut. Post measurement imaging of the devices which were subject to breakdown indicates that the breakdown behavior can be caused by pull-in of the inner electrode 1310 to an outer electrode 1320. Once the capacitor gap becomes shut, a short resistive leakage path appears, leading to substantial current flow as observed in the leakage current measurements. This "pull-in" phenomenon is commonly observed in electrostatic actuators. Increasing the bias voltage, the strong electrostatic forces can no longer be offset by the mechanical spring force following a certain gap shrinkage, leading to unstable mechanical dynamics. Furthermore, stiction can render this phenomenon irreversible, where removal of the external voltage does not lead to recovery of the device.

The observed pull-in behavior in the devices of the present disclosure is not fully explained with common behavior of larger electrostatic actuators. For these microelectromechanical system (MEMS) devices, the capacitor gap starts to shrink gradually and the onset of instability occurs once the gap has shrunk by about a third of its initial value for parallel plate geometries. However, excellent linearity of g vs $V_{DC}$ can be observed, which indicates the absence of any significant continuous shrinkage of the gap.

As noted earlier, the mechanical dephasing in the measurements may be attributed to coupling to TLS, which is previously shown to be the dominant loss mechanism for acoustic resonators with substantial surface participation at millikelvin temperatures. Modeled phenomenologically as two nearly-degenerate-energy configurations of electrons in amorphous materials, a TLS manifests as a resonant defect with both electrical and acoustic susceptibilities. By extracting the spatial distribution of the strain field from FEM numerical modeling, the spectral density (3/GHz) and the coupling rate (13 MHZ) of individual TLS defects to the nanomechanical resonators in the system can be estimated. The large coupling rate and the small density may suggest a departure from the continuum TLS-bath picture and offer the possibility of observing mechanics-TLS interactions at the individual defect level. The TLS frequency tuning via the Stark shift from the electrostatic bias can be estimated to create TLS frequency shifts at a rate of 20 GHz/V).

Figures 14A, 14B, 14C:
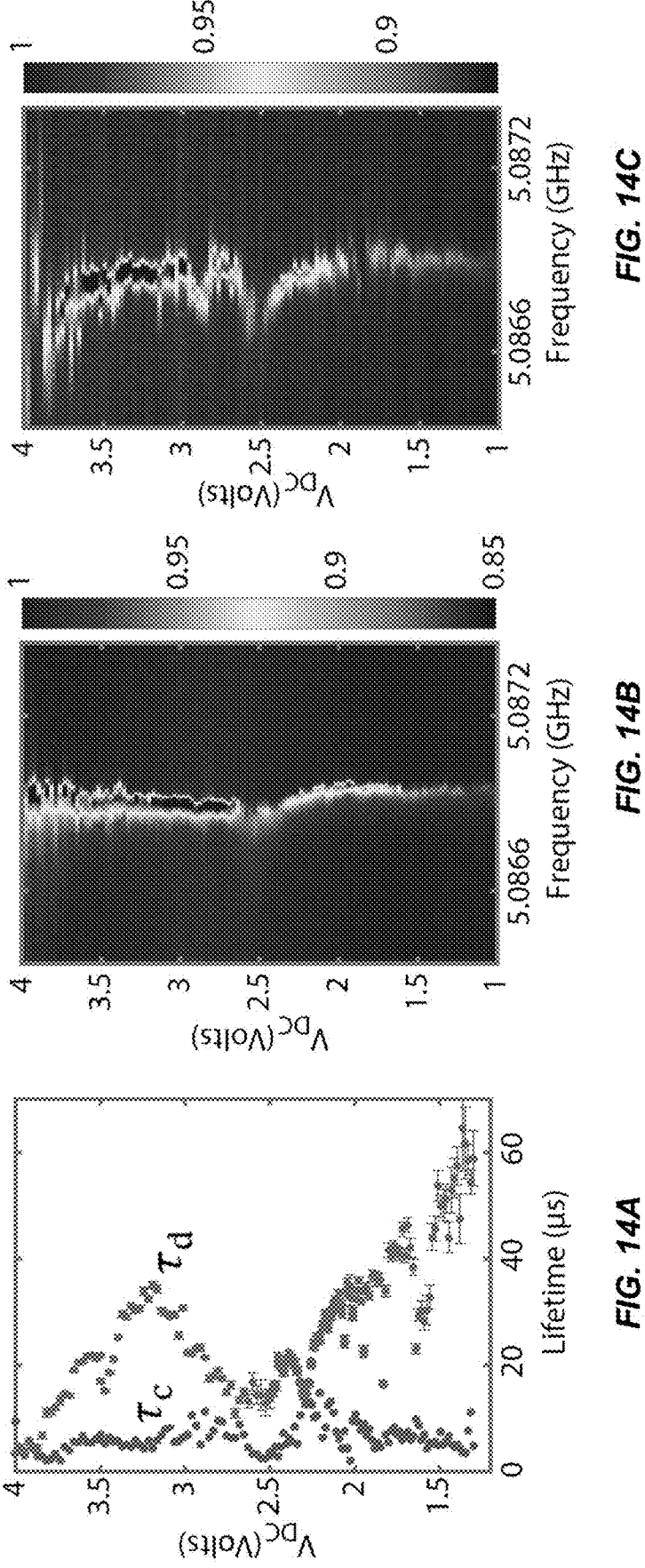
FIG. 14A shows the measured decay time and coherence time as functions of bias voltage according to one embodiment of the present disclosure.
FIG. 14B shows the mechanical reflection spectrum at a probe power of −40 dBm according to one embodiment of the present disclosure.
FIG. 14C shows the measurement in FIG. 13B repeated with a probe at −52 dBm power according to one embodiment of the present disclosure.

FIG. 14A shows the measured decay time $\tau_d$ and coherence time $\tau_c$ as functions of bias voltage according to one embodiment of the present disclosure. FIG. 14B shows the mechanical reflection spectrum at a probe power of −40 dBm according to one embodiment of the present disclosure. FIG. 14C shows the measurement in FIG. 14B repeated with a probe at −52 dBm power according to one embodiment of the present disclosure. The probe power level is set to −39 dbm. Probe powers at 2.5 V are reported as a reference. For each voltage point, the power level is adjusted to retain the intra-cavity phonon number in the range 500-3000. All data is from device A. FIG. 14A manifests strong modifications indicative of interaction with TLS defects. FIG. 14B and FIG. 14C manifest abrupt frequency shifts (in the form of avoided crossings) commensurate with the changes in the coherence and decay times. By comparing measurement results at two probe powers, a saturation behavior can be observed in the vicinity of the voltage values where the mechanical mode is heavily affected by TLS. A more detailed measurement of mechanical linewidth as a function of phonon number at these points can provide a good fit to the widely used TLS model. The inventors note that the signatures of the TLS may not be fully saturated in the devices before the onset of acoustic Kerr nonlinearities at large phonon numbers.

The standard tunnelling model can be used in analyzing the interactions of TLS with acoustic and electrical fields. The TLS is modeled as two potential wells having an asymmetry energy $\epsilon$ and a tunnelling energy $\Delta$, which leads to a TLS energy of $E=\sqrt{\Delta^2+\epsilon^2}$. The interaction of TLS with external fields is via modification of its asymmetry energy as shown in Equation (31), where $\gamma$ is the mechanical deformation potential around 1.5 eV in magnitude, S is the external strain field, p is the TLS dipole moment of roughly 1 Debye, E is the external electric field, and $\epsilon_0$ is the residual asymmetry from the environment.

$$\epsilon = 2\gamma \cdot S + 2p \cdot E + \epsilon_0 \tag{31}$$

The dependence of the asymmetry energy on the electric field can be used for Stark shifting the frequency of TLS via the voltage applied on the electromechanical capacitor. The tuning rate can be calculated as in Equation (32).

$$\delta E = 2\frac{\epsilon}{E}p \cdot E \tag{32}$$

In some examples, $\epsilon/E$ of 0.5 is used for analysis. The narrow vacuum gap capacitors can give rise to large electric fields approaching $5\times10^6$ V/m, leading to a steep tuning rate of $\delta E/h \approx 25$ GHZ/V.

Apart from Stark shifts, the electrical dipole of the TLS also leads to p·E coupling to the microwave fields. The zero-point fluctuations of voltage in the microwave resonator are approximately 10 μV, with maximum electric field values of roughly 50 V/m on the interfaces, leading to a TLS-microwave coupling of 250 kHz. Due to substantial acoustic susceptibility of TLS, strain coupling constitutes an important mechanism for mechanics-TLS interactions. The coupling strength can be written as in Equation (33), where $S_{zpf}$ is the zero-point fluctuations of strain associated with the mechanical mode.

$$\hbar\lambda = \gamma\frac{\epsilon}{E}S_{zpf} \tag{33}$$

This quantity is related to the strain mode volume of the mechanical mode, as shown in Equation (34), where E is the Young's modulus and Vm is the strain mode volume.

$$S_{zpf} = \left(\frac{\hbar\omega_m}{2EV_m}\right)^{1/2} \tag{34}$$

Due to the small physical dimensions of the mechanical resonator, for example $6\times10^{-3}$ μm³, the strain mode volume $S_{zpf}$ can be extremely small, for example $4\times10^{-8}$ m/m. This can cause a strain coupling strength of $\lambda/2\pi=13$ MHz, which clearly dominates other coupling mechanisms to TLS for the mechanical resonator.

Mechanical Coherence

In performing the ringdown measurements, a constant DC drive at a selected voltage level can be used and the external readout rate can be controlled via setting the detuning between the microwave resonator and the mechanics. The mechanical cavity can be populated via sending microwave pulses resonant with the mechanical mode. The pulses are synthesized with an arbitrary waveform generator (AWG), and their length is chosen to be sufficiently long to ensure the mechanical population can reach the steady state. Following the drive pulse, the emitted power can be detected in a given interval by processing the down-converted signal from a digitizer. A power measurement (as opposed to field-quadrature) is obtained by summing the square of the demodulated I and Q quadrature values in a detection window in an FPGA. This detection window length is set to be much shorter than the reciprocal of mechanical linewidth to ensure that all the phonons emitted from the resonator can be detected. The multiple consecutive detection windows during a single measurement can create a ringdown curve. Multiple instances of the experiment can be averaged to improve the signal-to-noise (SNR) ratio and obtain the final data. The AWG, digitizer, and FPGA functionalities are realized using a Quantum Machines® OPX+ module. The digitizer output can be calibrated by using the calibrated gain of the output lines and refer the detected voltage levels to the number of phonons in the cavity.

Multiple ringdowns can be carried out while sweeping the voltage to find the optimal lifetime in a voltage range. These ringdowns are performed at a large number of phonons in order to improve the SNR and make the measurements more tractable. Apart from showing signatures of spectral collisions with TLS that is manifested as deteriorating lifetimes, these measurements can be used for extracting statistics about lifetimes.

Figures 15A, 15B, 15C:
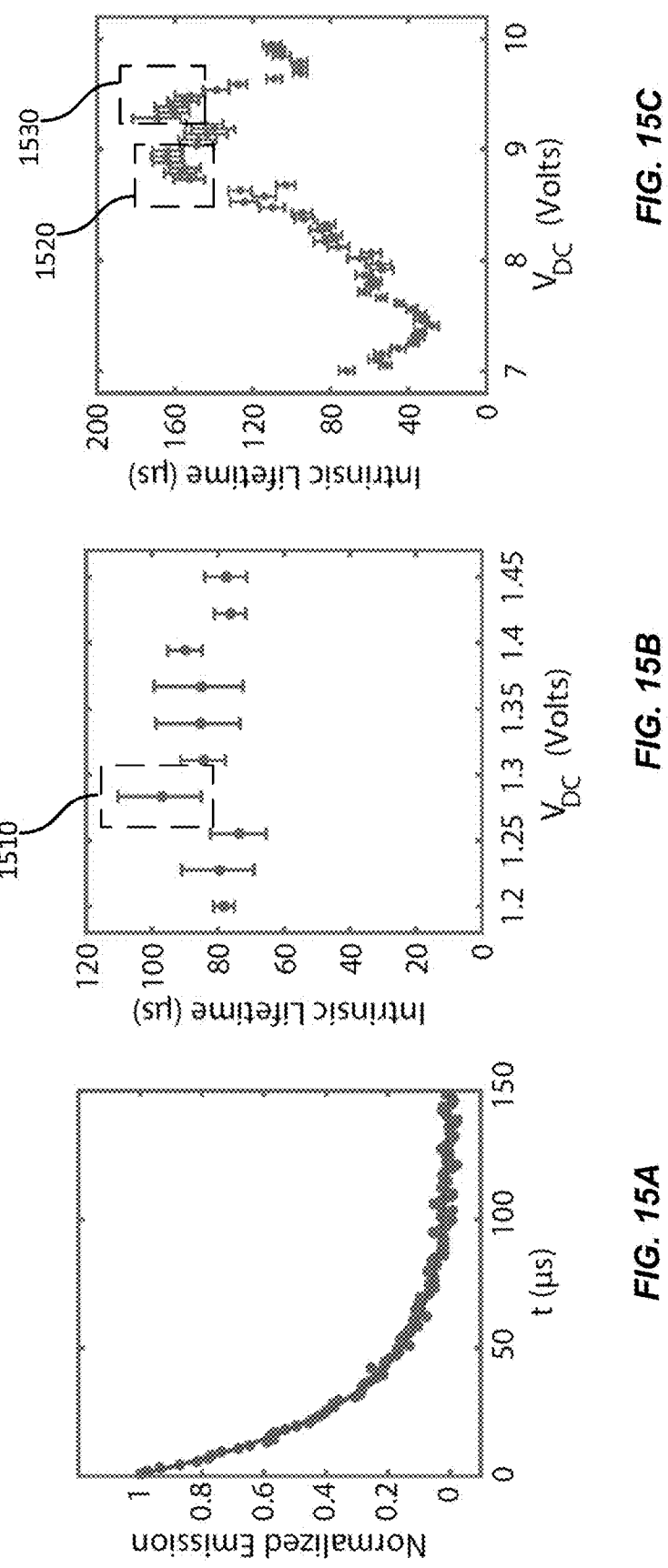
FIG. 15A shows a typical ringdown with an intrinsic lifetime of ~30 μs according to one embodiment of the present disclosure.
FIG. 15B shows an intrinsic lifetime as a function of voltage for device A with around 1000 phonons inside the cavity according to one embodiment of the present disclosure.
FIG. 15C shows an intrinsic lifetime as a function of voltage for device B with around 3000 phonons inside the cavity according to one embodiment of the present disclosure.

FIG. 15A shows a typical ringdown with an intrinsic lifetime of ~30 μs according to one embodiment of the present disclosure. FIG. 15B shows an intrinsic lifetime as a function of voltage for device A with around 1000 phonons inside the cavity according to one embodiment of the present disclosure. FIG. 15C shows an intrinsic lifetime as a function of voltage for device B with around 3000 phonons inside the cavity according to one embodiment of the present disclosure.

It can be seen that lifetimes around 30 μs can be reliably obtained for both device A and device B by slightly optimizing the voltage level. Such a typical ringdown is visualized in FIG. 15A. The points where coherence properties were improved do not exhibit extreme sensitivity to the applied voltage. For example, for the voltage value where best lifetime on device A was obtained, similar lifetimes in a 250 mV range (denoted by a region 1510) can be obtained as shown in FIG. 15B. Similar broad regions where the lifetime is enhanced for device B are depicted in FIG. 15C, as illustrated in region 1520 and region 1530.

Linewidth Characterization

Figures 16A, 16B, 16C:
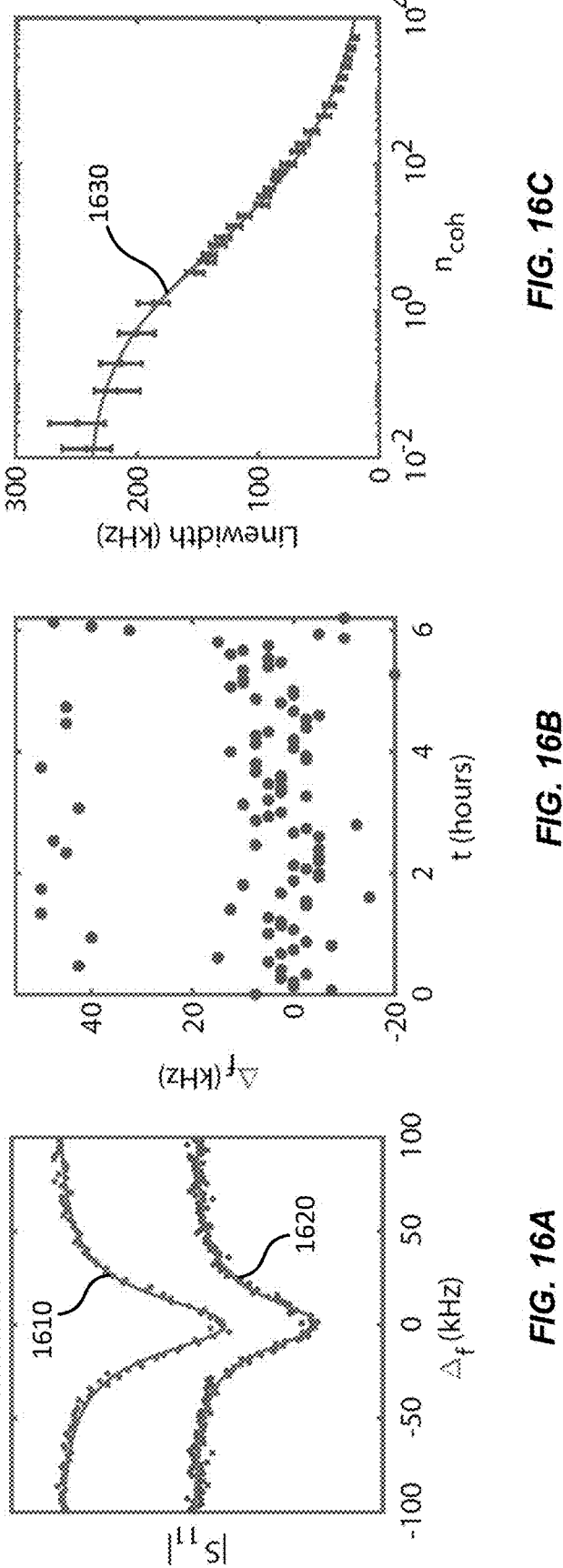
FIG. 16A shows reflection measurements for the mechanics of device A at 1.2 V according to one embodiment of the present disclosure.
FIG. 16B shows mechanical central frequency measurements displaying switching behavior according to one embodiment of the present disclosure.
FIG. 16C shows dependence of linewidth on the number of coherent phonons for device B at 3 V according to one embodiment of the present disclosure.

FIG. 16A shows reflection measurements for the mechanics of device A at 1.2 V according to one embodiment of the present disclosure. The upper trace 1610 is at more than 500 phonons whereas the lower trace 1620 is at around 4 phonons. The variation in the depths of the resonances is due to differences in electromechanical readout strength. The upper trace is shifted for greater visibility. The reflection spectrum measurements can be used to investigate the mechanical linewidth at different power levels in order to investigate their power dependence. For device A, these results corroborate previous observations concerning the absence of saturable TLS dependent losses at the long lifetime point. As shown in FIG. 16A, the linewidth does not show any saturation behavior when the phonon number varies between 4 and 500.

FIG. 16B shows mechanical central frequency measurements displaying switching behavior according to one embodiment of the present disclosure. Each data-point can be acquired in 5 seconds and the measurement can be repeated every 3 minutes. The mechanical resonance frequency can be tracked in long timescales during ringdown measurement. Telegraphic frequency jumps can be observed as shown in FIG. 16B. A potential model for this behavior could be that of a mechanical resonator directly coupled to a low frequency TLS that has non-negligible thermal population, which is sometimes referred to as a thermal fluctuator (TF). The TF jumping to its excited state leads to a dispersive shift for the device, giving rise to central mechanical frequencies which are bunched at a higher frequency. The frequency of the TF, its switching rate, and the coupling strength of it to the mechanics can be inferred using this data.

FIG. 16C shows dependence of linewidth on the number of coherent phonons for device B at 3 V according to one embodiment of the present disclosure. The solid line 1630 is a fit to the TLS model. In contrast to the previously discussed non-saturable behavior, the saturable behavior of the linewidth at an operation point in device B with signatures of TLS spectral collision can be recovered as shown in FIG. 16C. This data can be fit to a TLS continuum model, where the total linewidth $\gamma$ can be expressed as in Equation (35), where n is the number of phonons inside the cavity, F is the TLS participation ratio, $\gamma_{TLS}$ is the TLS decay rate, $n_c$ is the critical phonon number, B is a fit parameter, and $\gamma_0$ is the decay rate from power independent broadening mechanisms.

$$\gamma = \frac{F\gamma_{TLS}}{\tanh\left(\frac{\hbar\omega}{2k_BT}\right)}\sqrt{1+\left(\frac{n}{n_c}\right)^\beta} + \gamma_0 \qquad (35)$$

Due to ambiguity in the phonon number inside the cavity for VNA measurements, the coherent phonon number $n_{coh}$ can be used in the fit. The complete saturation of the linewidth at large phonon numbers may not be observed due to the mechanical nonlinearity which leads to narrowing down of the linewidth and deviation from Lorentzian lineshape. The fit gives $\gamma_0/2\pi \geq 30$ KHz.

As described herein, the present disclosure presents an integrated cavity electromechanical system capable of achieving MHz-level coupling rates at a mechanical frequency of several GHz. The electromechanical coupling rates can be readily increased by multiple folds upon integration of electrostatic transducers with microwave cavities with ultra-high impedance, reaching full parity with piezoelectric platforms. The system can achieve the strong coupling regime with a cooperativity exceeding 1200. Relying on an electrostatic driving field, a large parametric enhancement of the interaction can be obtained with negligible parasitic heating, leading to operation in the quantum ground state. Device fabrication is performed using a TiN-on-SOI material system, which is compatible with superconducting qubits and optomechanical crystals. Additionally, by relying on thin films and single-crystalline silicon, mechanical quality factors can get to more than 8 million, corresponding to two orders of magnitude improvement over piezoelectric devices in similar geometries. The material-agnostic nature of the underlying process may be adopted in platforms hosting spin qubits.

While record-long lifetimes can be observed in devices with electrical connectivity, the measurements in the present disclosure remain much shorter than the second-long results from optomechanical experiments in silicon structures with no metallic components. Thus, the sources of residual acoustic loss can be further investigated, including the role of metallic components, fabrication disorder in the acoustic shields, and two-level-system defects. A better understanding of the loss mechanisms along with the implementation of proper mitigation techniques can lead to longer mechanical lifetimes. With moderate improvements, the mechanical lifetimes can reach the millisecond regime, with the potential to deliver transformative impacts on mechanics-based microwave-optical interconnects, error-protected bosonic qubits, and quantum memories.

The present disclosure also demonstrates electro-optomechanical transduction from microwave photons to telecom-band optical photons via GHz-frequency mechanical modes. The electrostatic force in a DC-biased capacitor is used as a mechanism for actuating GHz-frequency mechanical vibrations in a phononic crystal oscillator and routing mechanical waves through a phononic waveguide to an optomechanical cavity. Devices fabricated based on this concept can perform microwave-optical frequency conversion with a photon conversion efficiency reaching $1.8 \times 10^{-7}$ at a bandwidth exceeding 3 MHz, and efficient phase modulation with a half-wave voltage of $V_\pi = 750$ mV. The devices are made from a conventional silicon-on-insulator platform, operate at room temperature and atmospheric pressure, and do not rely on intrinsic material properties such as piezoelectricity or Pockels effect, therefore offering a universal mechanism adaptable to a wide range of material platforms. The transduction efficiency may be further improved by several orders of magnitude with operation at millikelvin temperatures. GHz-frequency silicon mechanical oscillators exhibit exceptionally narrow spectral linewidths (in the 10-100 kHz range) at these temperatures, translating to significant improvements in the electromechanical and optomechanical cooperativities. Additionally, integration with high-impedance microwave cavities can readily increase the electromechanical readout rate to values in the range of 0.5-1 MHz. With these parameters, efficiencies can exceed 50% at a bandwidth above 500 kHz using few μ-Watt optical pump powers, at which continuous-wave operation has been demonstrated with NbTiN microwave resonators. The electro-optomechanical transduction in the present disclosure may provide new avenues for RF photonics applications such as filtering, isolation, frequency multiplication, and beam-steering by enabling silicon devices compatible with the standard complementary metal-oxide semiconductor (CMOS) technology.

Electro-Optomechanical Frequency Conversion Via Electrostatic Drive

Transducing signal from microwave to optical frequencies is indispensable for building long-range quantum and classical data links. However, it is challenging to overcome the five-orders-of-magnitude difference in frequency between microwave and telecom optical photons. Progress has been made in direct electro-optic frequency conversions using nonlinearity in Pockels crystals. An electro-optomechanical approach, which uses intermediate mechanical oscillators to bridge the frequency gap, can achieve higher conversion efficiencies in the resonating bandwidth owing to the low propagation speed and micron-scale wavelength of on-chip microwave phonons. An electro-optomechanical conversion involves two steps: (1) information carried by the microwave photons are swapped into the mechanical oscillator via electromechanical coupling; and (2) the mechanical motion subsequently modulates the phase of the optical field and imprints the information at the acousto-optic sidebands coherently.

Piezoelectric materials such as lithium niobate, gallium arsenide, gallium phosphide, and aluminum nitride are usually adopted in the first step for high-efficiency electromechanical conversions. These materials, however, rely on sophisticated fabrication processes that hinder the mass integration with the existing technologies. Particularly, the promise of long lifetime and high coherence of mechanical oscillators at millikelvin temperature has been compromised to date when involving piezoelectric materials, which imposes a severe obstacle towards realizing practically useful quantum transduction. Single crystal silicon has provided the backbone for ubiquitous integrated photonic and electronic information processing. The recent demonstrations of 10-billion level quality factor of silicon nanomechanical oscillators at low temperature, combined with the high photoelastic coefficient and thus high optomechanical coupling, further place silicon as the ideal monolithic material platform for building electro-optomechanical transducers. The challenge, however, is the absence of intrinsic piezoelectricity in silicon due to its centro-symmetric crystal structure. While various piezo-silicon heterogeneous integration methods have been demonstrated to mitigate the problem, the pursuit of highly efficient conversion between microwave and gigahertz mechanics on a monolithic silicon platform is still an ongoing process.

The present disclosure overcomes these limits by providing a piezo-free electro-optomechanical quantum transducer with long phonon lifetime on a monolithic silicon platform. The electro-optomechanical quantum transducer in the present disclosure demonstrates cavity electro-optomechanical frequency conversion from 5 GHz microwave to telecom-band optical photons on silicon-on-insulator platform at room temperature. Instead of using intrinsic piezoelectric material property, the electromechanical conversion can be realized via the capacitive coupling between a nanomechanical oscillator and a voltage-biased capacitor. The acousto-optic modulation efficiency is on par with previous piezo-optomechanical work. Meanwhile, the opto-electromechanical transduction in the present disclosure utilizes much simplified fabrication with conventional silicon processing and metal deposition.

Silicon is not considered as a piezoelectric material due to its centro-symmetric crystalline structure. It can provide a large optomechanical coupling and an exceptionally low acoustic loss in cryogenic temperatures to facilitate efficient microwave-optical transduction. Previous work has pursued capacitive forces, as an alternative to piezoelectricity, for driving mechanical waves in silicon. While efficient electro-optic transduction has been realized using this approach, the low frequency of the involved mechanical modes (1-10 MHz) has resulted in a small electro-optic conversion bandwidth. Conversely, large-bandwidth operation has been achieved by driving GHz-frequency acoustic waves, but achieving a large conversion efficiency has remained out of reach.

The present disclosure demonstrates electro-optomechanical transduction via a 5 GHz mechanical mode on a silicon-on-insulator platform. A novel capacitive driving method is implemented for actuating mechanical vibrations in an extended geometry, where mechanical motion is shared between an electromechanical resonator and an optomechanical cavity via a phonon waveguide. By optimizing the design geometry, the transduction efficiency in structures can be maximized with robust performance against frequency disorder. Devices based on this concept are fabricated and tested at room temperature and atmospheric pressure. A microwave-optical photon conversion efficiency of $1.8 \times 10^{-7}$ can be achieved in a 3.3 MHz bandwidth. Additionally, the transducer devices can be used as resonant phase modulators and their performance can be quantified by measuring a modulation half-wave voltage of 750 mV. The efficiency and half-wave voltage of the electro-optomechanical transduction platform in the present disclosure are comparable to previous results in piezo-optomechanical devices. Additionally, a significantly higher efficiency may be achieved for operation at cryogenic environments due to the exceptionally low phonon loss in crystalline silicon.

The electro-optomechanic transduction techniques provided in the present disclosure can establish a universal gigahertz acousto-optic modulation and efficient frequency conversion paradigm that is compatible with the state-of-the-art CMOS technology and independent of intrinsic piezoelectrics, while providing highly efficient superconducting-to-optical quantum transducers with ultra-low added noise.

The electromechanical coupling is created using a capacitor with moving electrodes. When a DC (i.e., static) field is applied to this structure, coherent coupling can be created between a mechanical motion and a microwave drive. This electromechanical coupling is distinct from past works using intrinsic piezoelectric materials. It can enable universal approaches for microwave-to-mechanical conversion on normal dielectric platforms. The DC bias also provides an additional control knob of the conversion efficiency as the electromechanical coupling is linearly proportional to the bias voltage.

The electro-optomechanical frequency conversion can be accomplished by a one-dimensional air-hole array patterned on a suspended silicon nanobeam. The structure can be recognized as a composition of three sections: the electromechanical crystal (EMC) region, the phonon waveguide region, and the optomechanical crystal (OMC) region. The EMC region is responsible for the electrostatic conversion from the input microwave drive to a mechanical motion as described above. The phonon waveguide connects the EMC and OMC regions and allows the propagation of the transduced mechanical motion towards the OMC region. Finally, the OMC supports both an optical cavity mode and a mechanical mode whose overlapping gives rise to the coupling between the mechanical motion and the intracavity optical field owing to the moving-boundary and photoelastic effects of silicon, thereby converting the mechanical motion to optical photons. The mechanical resonators exploited for the entire microwave-to-optical transduction have a distributed mode profile with balanced motional localizations at the EMC and OMC regions, which can be achieved by careful engineering of the mechanical band structure (e.g., geometries of the air-hole unit cells) of the phonon waveguide. Such a design allows spatial separation of the regions for microwave-to-mechanical and mechanical-to-optical conversions, respectively, so as to avoid any optical metal loss from the electrodes of the capacitor at the EMC The electro-optomechanical transducer of the present disclosure can be made from crystalline silicon membranes (e.g., 220 nm thickness) with extremely thin metal layers (e.g., 15 nm Titanium Nitride) and both are piezoelectric-free. Therefore, the mechanical modes distribute mostly in silicon. Owing to the high optical refractive index and photoelastic coefficients, the electro-optomechanical transducer can benefit from the largest optomechanical coupling rate known to date, thereby enhancing mechanical-to-optical conversion efficiency. Moreover, the ultra-low mechanical loss of silicon at millikelvin temperatures can enable a longer phonon lifetime that allows increased interaction time for energy exchange in quantum transducers.

The material choice also brings the benefit of convenient device fabrication processes. The fabrication of the device in the present disclosure only involves patterning of silicon and metallic electrodes, the same materials for state-of-the-art photonic and electronic integrated circuits. This advantage facilitates mass productions of on-chip acousto-optic devices for various RF photonic applications such as filters, magnet-free optical isolators, or microwave frequency multipliers using existing CMOS fabrication technology, which would not be possible with piezoelectric materials.

The electro-optomechanical transducer of the present disclosure can directly translate 5-GHz microwave quantum excitation to telecom-band photons when incorporating superconducting qubits at millikelvin temperatures. Since the mechanical modes localize at the low-loss thin-film crystalline silicon, the transducers of the present disclosure can have ultra-high mechanical quality factors at $10^6$~$10^7$ level. The extended mechanical lifetime, as a result, provides longer electromechanical and optomechanical interaction times and high cooperativities towards the desired strong coupling regime. The electro-optomechanical transducer of the present disclosure can be used to build long-range quantum information network.

Operation Principle and Device Design

Figure 17A:
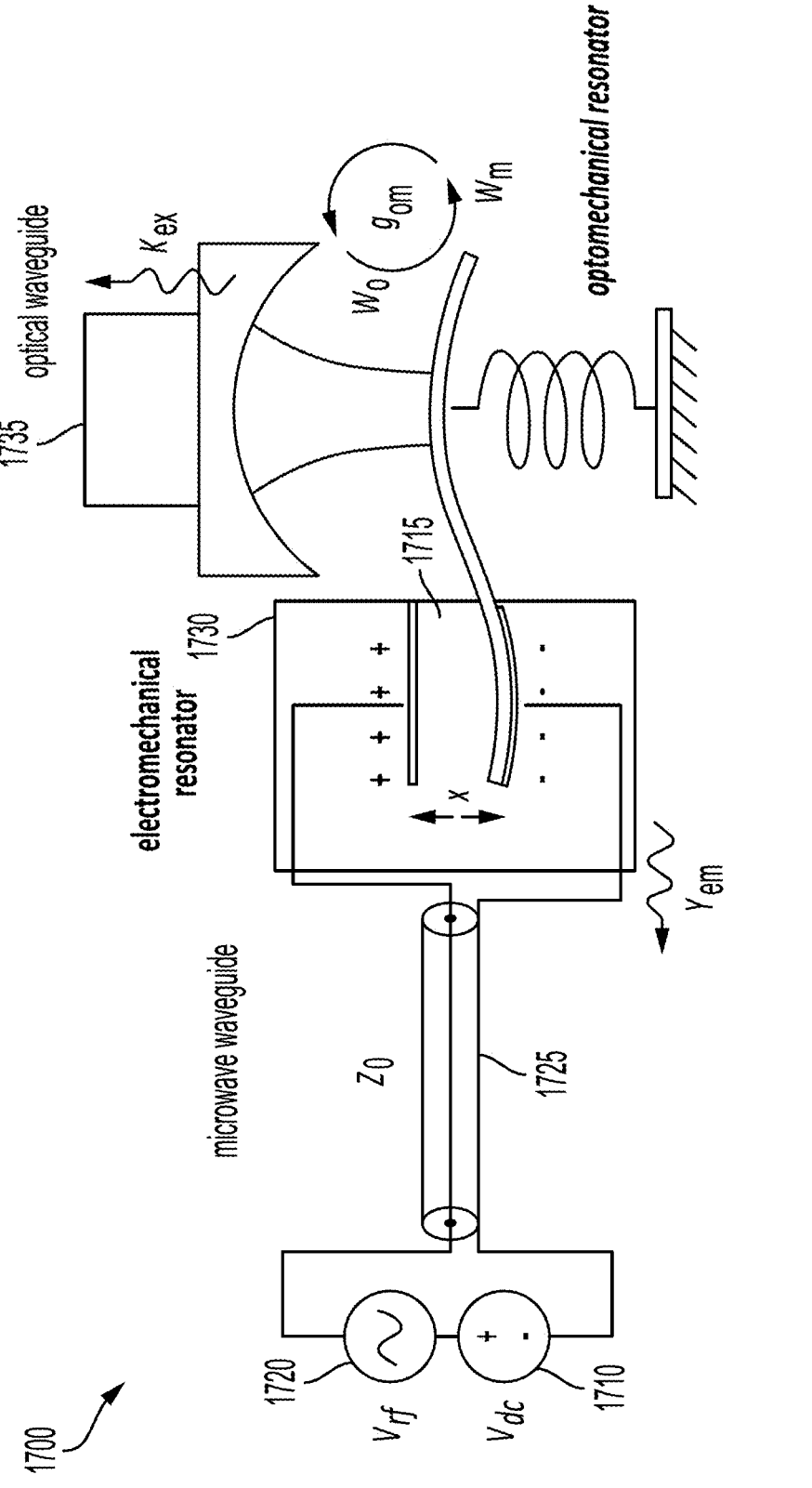
FIG. 17A is a schematic diagram showing a frequency conversion process according to one embodiment of the present disclosure.

FIG. 17A is a schematic diagram 1700 showing a frequency conversion process according to one embodiment of the present disclosure. The frequency conversion process can include three main components: (i) coherent conversion of radio-frequency signals to mechanical waves, followed by (ii) routing and delivering of the acoustic wave to an optomechanical crystal cavity, and (iii) creation of sideband optical photons by modulating the light inside the optomechanical cavity. The first component can be realized by taking advantage of electrostatic actuation. In this approach, a constant voltage 1710 (e.g., DC voltage) across a parallel-plate capacitor 1715 generates an electrostatic force of attraction. By perturbing the voltage with a time-varying signal 1720 at the frequency $\omega$ (delivered via a microwave waveguide 1725), an oscillatory component can be created with the attraction force $F(\omega)=(C/x)V_{dc}V_{rf}$. Here, $C/x$ is the rate of change of the capacitance with respect to a change in the capacitor's gap $x$. This induced time-varying force resonantly drives a mechanical mode that is confined to the capacitor's electrodes to form an electromechanical resonator 1730. The mechanical oscillations, in turn, dynamically change the capacitance, creating an electromagnetic field that radiates back into the microwave waveguide 1725. This electromagnetic radiation results in loss of mechanical energy, which can be modeled via an electromechanical dissipation (decay) rate ($\gamma_{em}$). The electromechanical decay rate ($\gamma_{em}$) can be derived as shown below. Meanwhile, the moving parallel-plate capacitor 1715 can be coupled to an optical cavity (not shown) via an optical waveguide 1735 to form an optomechanical resonator.

The current passing through a motion-dependent capacitor $C(x)$ can be expressed in Equation (36) as shown below.

$$i(t) = C(x)\frac{V}{t} + \frac{C}{x}\frac{x}{t}V = i_{conductive} + i_{motional} \qquad (36)$$

As evident, the product of velocity and voltage gives rise to the motional current, which in the most general case includes multiple frequency components. Assuming a static voltage bias of $V_b$, the RF component of the motional current can be expressed in Equation (37) as shown below.

$$i_{motional,RF}(t) = V_b\frac{C}{x}\frac{x}{t} \qquad (37)$$

The rate of energy loss of the mechanical resonator from the motional current can be written in Equation (38) as shown below, where $Z_0$ is the impedance of the microwave waveguide.

$$P_{em} = Z_0 V_b^2 \left(\frac{C}{x}\right)^2 \left(\frac{x}{t}\right)^2 \qquad (38)$$

This energy loss rate can be readily converted to an electromechanical dissipation rate upon division by the total energy $E_m$ stored in the mechanical oscillator, as shown in Equation (39) below, where $$E_m = m_{eff}\left(\frac{x}{t}\right)^2,$$

and $m_{eff}$ is the effective mass of the mechanical resonance.

$$\gamma_{em} = \frac{P_{em}}{E_m} = \frac{Z_0 V_b^2}{m_{eff}}\left(\frac{C}{x}\right)^2 \qquad (39)$$

To determine the electromechanical dissipation rate $\gamma_{em}$ from simulations, it may be necessary to express the change of the capacitance per displacement $\partial C/\partial x$ for a given set of mechanical, microwave, and electrostatic modes. Mechanical displacement can create capacitance change via the photoelastic effect, where the stress field alters the permittivity of silicon. Additionally, a change in the capacitance can be obtained from the moving-boundary effect, where the material boundaries deform with the mechanical motion. The photoelastic and moving-boundary contributions can be denoted in Equation (40) and expressed in Equations (41) and (42) respectively.

$$\left.\frac{\partial C}{\partial x}\right|_{\omega_m} = \left.\frac{\partial C}{\partial x}\right|_{PE} + \left.\frac{\partial C}{\partial x}\right|_{MB} \qquad (40)$$

$$\left.\frac{\partial C}{\partial x}\right|_{PE} = -\frac{\epsilon^2}{\epsilon_0 V_{dc} V_{rf}} \int\int\int_V [E_{dc}^* \cdot (P \cdot S) \cdot E_{rf}] V \qquad (41)$$

$$\left.\frac{\partial C}{\partial x}\right|_{MB} = \frac{1}{V_{dc} V_{rf}} \int\int_S [(Q \cdot \hat{n})(\Delta \epsilon E_{dc}^\| E_{rf}^\| - \Delta \epsilon^{-1} D_{dc}^+ D_{rf}^+)] S \qquad (42)$$

Here, P and S are the photoelastic and strain tensors, $\epsilon$ is the dielectric permittivity of silicon, $\Delta \epsilon = \epsilon_1 - \epsilon_2$ and $\Delta \epsilon^{-1} = 1/\epsilon_1 - 1/\epsilon_2$ are the permittivity contrast between the two materials across the boundary. The displacement field Q can be normalized such that $\max(|Q|) = 1$. The quantities $V_{dc}$, $V_{rf}$ denote the voltage difference values across the capacitor electrodes and are related to the electric fields as expressed in Equation (43), where the integral can be taken over any path connecting the two electrodes. Note that the quasi-static approximation for all the fields is used such that $E = -\nabla V$.

$$V_{dc(rf)} = \int E_{dc(rf)} \cdot I \qquad (43)$$

Due to the non-zero resistivity of the silicon device layer ($\approx 3 k\Omega/cm$), static fields are expected to be screened by the free carriers and vanish inside the bulk. To model this effect, silicon can be treated as a conductor for simulating the distribution of the DC biasing field. Considering Equation (39) and Equation (40), this assumption results in the vanishing of the photoelastic contribution, and also a simplification to the moving-boundary component, where only the term with perpendicular field components remains in place as shown in Equation (44).

$$\left.\frac{\partial C}{\partial x}\right|_{\omega_m} = \frac{-1}{V_{dc} V_{rf}} \int\int_S (Q \cdot \hat{n}) \Delta \epsilon^{-1} D_{dc}^+ D_{rf}^+ dS \qquad (44)$$

Plugging Equation (44) into Equation (39), the microwave-to-mechanical external coupling can be expressed in Equation (45), where $\tilde{\gamma}_{em}$ is the per-volt electromechanical dissipation rate defined by Equation (46).

$$\gamma_{em}(V_b) = V_b^2 \tilde{\gamma}_{em} \qquad (45)$$

$$\tilde{\gamma}_{em} = \frac{z_0}{m_{eff} V_{dc}^2 V_{rf}^2}\left[\int\int_S (Q \cdot \hat{n}) \Delta \epsilon^{-1} D_{dc}^+ D_{rf}^+ dS\right]^2 \qquad (46)$$

While electrostatic actuation is the standard operation method for MEMS devices, its application to microwave-optical frequency conversion has remained relatively limited. This is partly due to the difficulty in simultaneously achieving a large electromechanical conversion efficiency and confining high-Q mechanical resonances in the GHz frequency band. Additionally, routing acoustic waves between the electromechanical and optomechanical systems is challenging due to the often-dissimilar form factors of the mechanical vibrations employed in these distinct processes. Some of these challenges can be solved by developing GHz-frequency electromechanical crystals, which can demonstrate operation in the strong coupling regime with large mechanical quality factors (approximately 10 million) in cryogenic environments. Electromechanical crystal resonators rely on phononic crystal structures, which can interface with optomechanical crystals to realize efficient microwave-optics transduction.

Figure 17B:
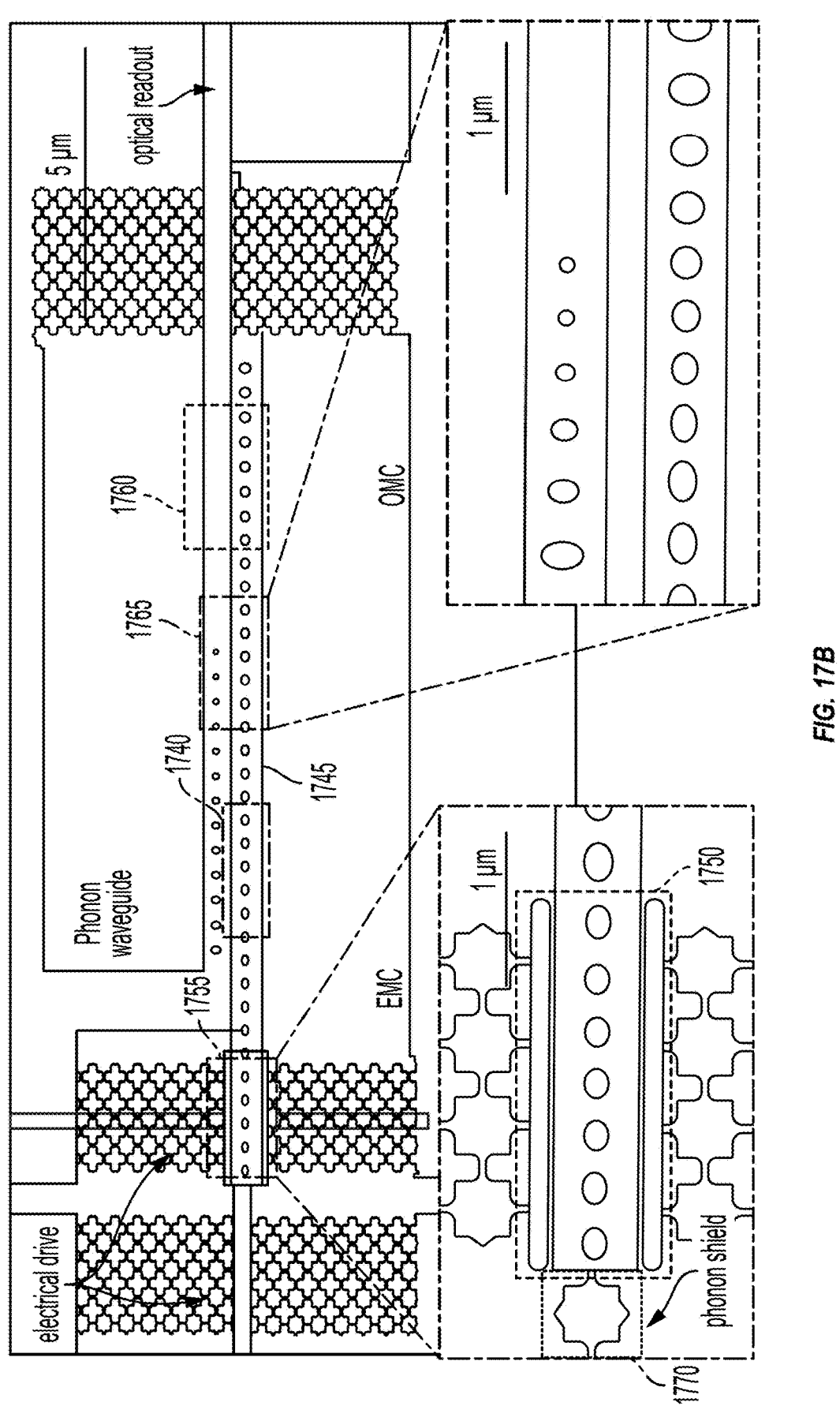
FIG. 17B is a scanning electron microscope image of a fabricated device according to one embodiment of the present disclosure.

FIG. 17B is an SEM image of a fabricated device according to one embodiment of the present disclosure. FIG. 17B illustrates several components of the devices in the electro-optomechanical system of the present disclosure. A suspended silicon nanobeam 1745 with an array of air holes contains an EMC section 1755 and an OMC section 1765, which are accessed via on-chip microwave and optical waveguides (not shown). The EMC section 1755 and the OMC section 1765 are connected by a phonon waveguide 1740. The nanobeam 1745 starts with a phononic crystal "defect" cavity covered by a thin metallic layer which supports a "breathing" mechanical mode. Combined with a pair of electrodes 1750 which are symmetrically positioned across narrow air gaps, this section forms the EMC resonator. The EMC section is adiabatically tapered to the phonon waveguide 1740, which connects to the OMC section 1765 at the opposite end. The phonon waveguide is designed to be reflective for the Transverse Electric (TE)-polarized optical fields, but transmissive to the mechanical breathing mode of interest. Finally, the OMC cavity can be terminated by a photon/phonon mirror section 1760, which prevents optical and mechanical leakage into the membrane. Additionally, the nanobeam 1745 is connected to the surrounding membrane via an array of two-dimensional phonon shields 1770 with a wide band gap for all phonon polarizations at the vicinity of the operation frequency. Phonon shields are used to clamp the two ends of the nanobeam. The phonon shields have a mechanical band structure with a complete band gap from 4.3 GHz to 6 GHz, which terminates the hybridized mechanical modes at 5 GHz. This design helps the confinement of the mechanical modes within the nanobeam by preventing radiative leakage into the surrounding membrane.

Device Modeling

Figure 18:
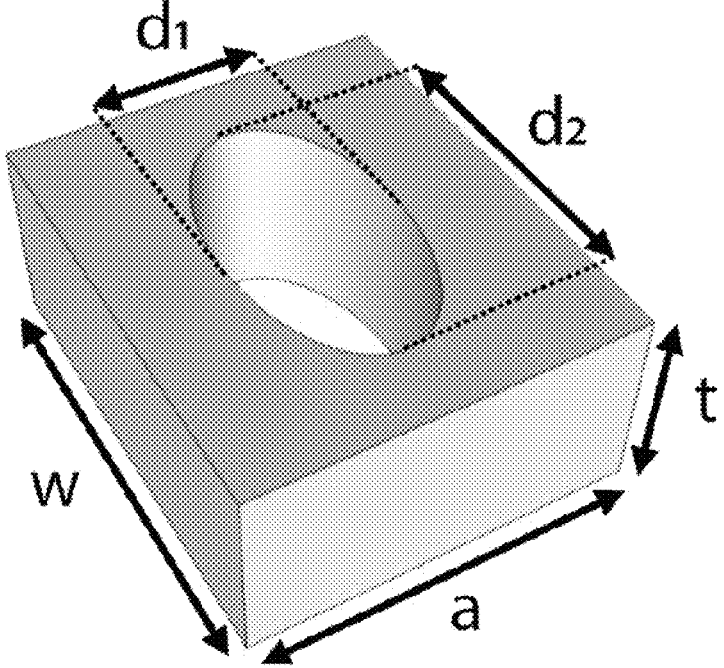
FIG. 18 illustrates the geometry of an air hole according to one embodiment of the present disclosure.

FIG. 18 illustrates the geometry of an air hole according to one embodiment of the present disclosure. The nanobeam as illustrated in FIG. 17B includes an array of air holes. Each air hole can be of an elliptical shape as illustrated in FIG. 18.

FIG. 19A illustrates geometric parameters of an air hole illustrated in FIG. 18 according to one embodiment of the present disclosure. The beam width w=530 nm and thickness t=220 nm are maintained throughout the structure. The conjugated diameters $d_1$ and $d_2$ of the elliptical air hole and the unit length a of the elliptical hole array on the nanobeam can vary at different sections of the nanobeam, including the EMC section, the phonon waveguide, the OMC section, and the photon/phonon mirror section (photon/phonon reflector).

FIG. 19B illustrates a mechanical band structure of the phonon waveguide according to one embodiment of the present disclosure. FIG. 19C illustrates a mechanical band structure of the photon/phonon reflector used to terminate the OMC section according to one embodiment of the present disclosure. The dashed line 1910 in FIG. 19B or the dashed line 1920 in FIG. 19C marks the nominal frequency of the EMC and OMC resonators. The band structures of the phonon waveguide can be designed to be reflective for the TE-polarized optical field but transmissive to the mechanical breathing mode at 5 GHz. Thereby, while acting as a mirror to confine the optical mode in the OMC section, the phonon waveguide also mediates the coupling between the localized EMC and OMC mechanical modes, forming hybridized supermodes which simultaneously overlap with the optical field as well as the microwave and DC-bias electric fields.

Figures 19D, 19E, 19F:
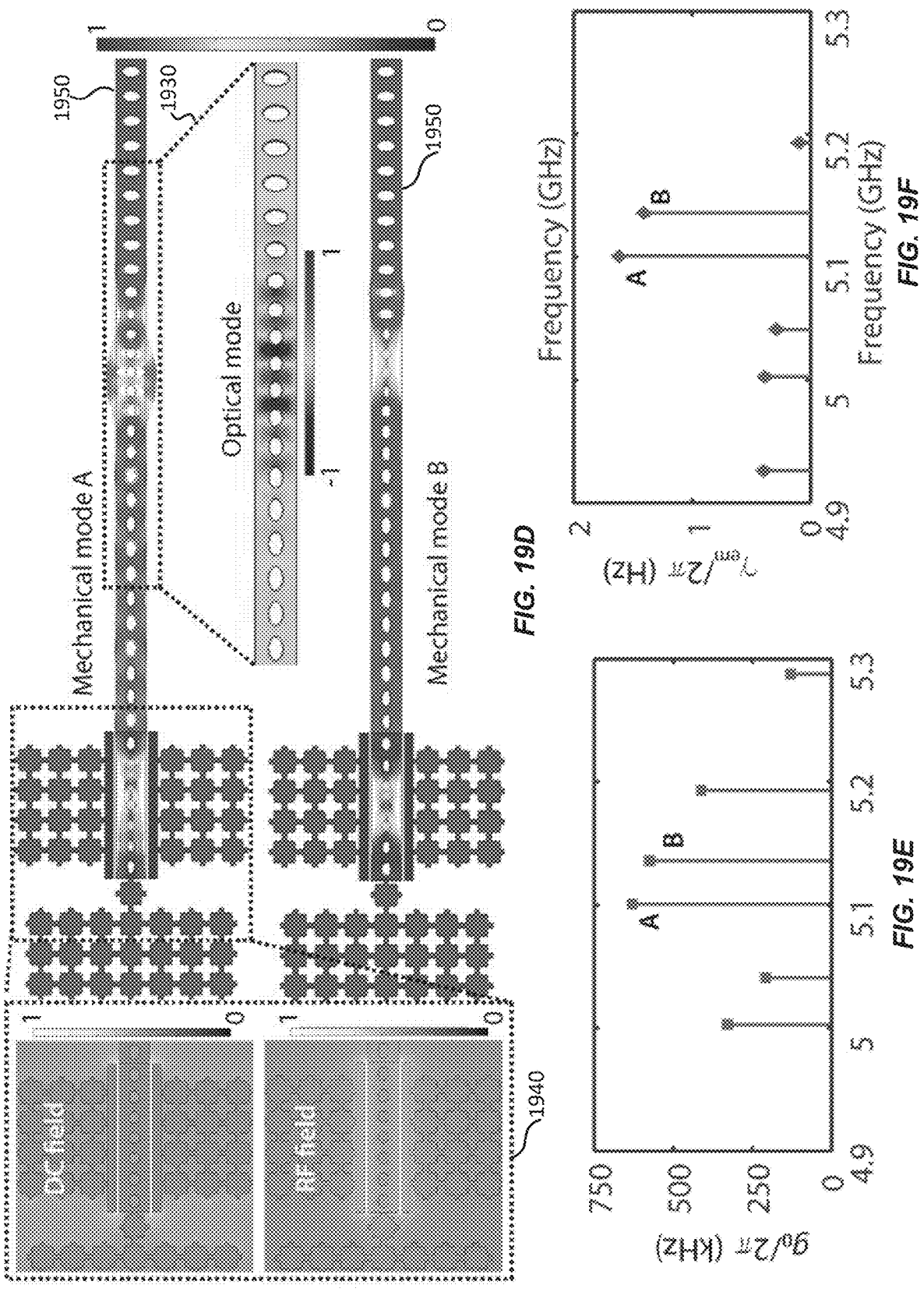
FIG. 19D shows simulated displacement field amplitudes for the two of the hybridized modes with the largest electromechanical and optomechanical couplings according to one embodiment of the present disclosure.
FIG. 19E shows a calculated optomechanical coupling rate of the simulated modes according to one embodiment of the present disclosure.
FIG. 19F shows an electromechanical dissipation rate of the simulated modes assuming a bias DC voltage of 10 V according to one embodiment of the present disclosure.

FIG. 19D shows simulated displacement field amplitudes for the two of the hybridized modes with the largest electromechanical and optomechanical couplings according to one embodiment of the present disclosure. The inset 1930 shows the mode profile of the optical cavity field and the inset 1940 shows the mode profile of the electric field, from the DC bias voltage and the microwave drive. A nonlinear color map on the nanobeam 1950 is used to highlight the spatial distribution of the electric fields in the EMC. FEM simulations can be employed to model the optical, electrical and mechanical responses of the device. As evident in FIG. 19D, the termination of the phonon waveguide with the EMC and OMC resonators creates a mechanical Fabry-Perot cavity, which supports extended "supermodes." The degree of overlap between the mechanical energy density of each supermode and the electric/optical fields in EMC/OMC resonators sets the rates of electromechanical and optomechanical interactions. The single-photon optomechanical coupling $(g_0)$ and the electromechanical decay rate $(\gamma_{em})$ can be calculated for all the supermodes in the vicinity of the bare resonance frequency of the EMC and OMC resonators.

FIG. 19E shows a calculated optomechanical coupling rate of the simulated modes according to one embodiment of the present disclosure. FIG. 19F shows an electromechanical dissipation rate of the simulated modes assuming a bias DC voltage of 10 V according to one embodiment of the present disclosure. The two dominant peaks A and B in FIGS. 19E and 19F correspond to the two hybridized modes A and B in FIG. 19D. As evident in FIG. 19E and FIG. 119F, with careful design of the structure, a pair of dominant supermodes can be obtained in the spectra, which are identified as symmetric and anti-symmetric superpositions of the bare EMC and OMC resonances. The design can be optimized to achieve robustness against percent-level frequency offsets between the EMC and OMC resonators, by numerically studying the effects of fabrication disorder on the degree of hybridization of the supermodes.

For each supermode, the moving-boundary and photoelastic contributions to the optomechanical coupling can be calculated via surface and volume integrals, respectively. To calculate the electromechanical dissipation rate, the inventors note that, due to the linear dependence of the electromechanical force on the biasing voltage $V_b$, the dissipation rate is expected to scale quadratically with it as $\gamma_{em}(V_b)=V_b^2\tilde{\gamma}_{em}$. The per-volt electromechanical dissipation rate Yem can be evaluated by evaluating a normalized surface integral at the silicon/air boundaries in the device. The per-volt electromechanical dissipation rate $\tilde{\gamma}_{em}$ can then be expressed in Equation (47).

$$\tilde{\gamma}_{em} = \frac{z_0}{m_{eff}V_{dc}^2 V_{rf}^2}\left[\int\int_S (Q\cdot\hat{n})\Delta\epsilon^{-1}D_{dc}^{\pm}D_{rf}^{\pm}\,dS\right]^2 \tag{47}$$

Here, $\Delta\epsilon^{-1}=1/\epsilon_1-1/\epsilon_2$ are the permittivity contrast between the two materials across the boundary, $\omega_m$ and $m_{eff}$ are the frequency and the effective mass of the mechanical mode, and $Z_0=50\Omega$ is the impedance of the microwave feed line. The displacement field, Q, can be normalized such that $\max(|Q|)=1$. The quantities $V_{dc}$, $V_{rf}$ denote the voltage difference across the capacitor electrodes, expressed as line integrals of the corresponding electric fields. The distinction between the spatial profiles of the DC and RF electric fields may be due to the frequency-dependent electric response of the substrate.

Fabrication and Characterization

The devices can be fabricated by starting with a 220-nm silicon-on-insulator substrate sputtered with a thin (t=15 nm) film of TiN, which is used as the metallic layer for the electrodes. First, the geometry of nanobeam, phonon shields, and the optical waveguide is patterned via electron-beam lithography (EBL), followed by the dry etching through the metal and silicon layers via $SF_6/Ar$ and $SF_6/C_4F_8$ chemistry, respectively. Second, a following aligned EBL and etching processes can be added to remove the metal layer from the optical components and define the electrodes. Finally, the devices are released with hydrofluoric (HF) acid. The optomechanical and electromechanical responses of the fabricated devices can be characterized with measurements.

Figures 20A, 20B:
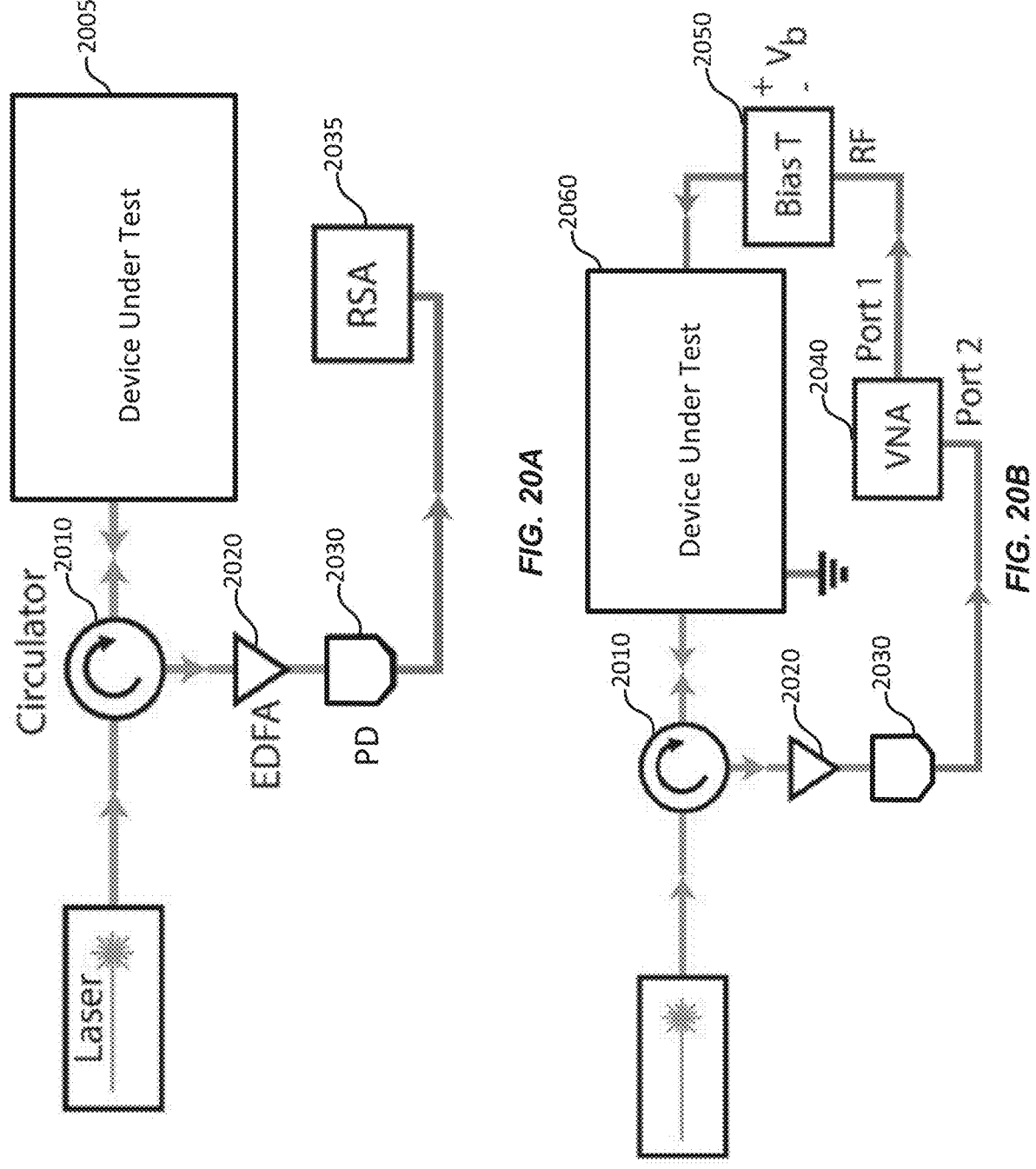
FIG. 20A shows a measurement setup for optomechanical detection of thermal mechanical motion according to one embodiment of the present disclosure.
FIG. 20B shows a measurement setup for microwave-to-optical frequency conversion according to one embodiment of the present disclosure.

FIG. 20A shows a measurement setup for optomechanical detection of thermal mechanical motion according to one embodiment of the present disclosure. The device under test 2005 can be measured in reflection with the aid of a cryogenic circulator 2010. EDFA 2020 represents an erbium-doped fiber amplifier. PD 2030 represents a photo detector. RSA 2035 represents a real-time spectrum analyzer.

FIG. 20B shows a measurement setup for microwave-to-optical frequency conversion according to one embodiment of the present disclosure. A VNA 2040 can be used to excite the mechanical modes via a microwave drive for measuring the beat note in the photocurrent. A bias tee 2050 can be used to provide DC voltage to the device under test 2060. The laser light can be delivered to the device chip by a tapered fiber waveguide, which can also be used to collect the device's response in reflection. The optomechanical response can be characterized by setting the laser frequency detuning from the optical cavity to one mechanical frequency $(\Delta=-\omega_m)$. These initial measurements may not use any electric drive. Instead, the thermally excited mechanical motion from the ambient room-temperature environment can lead to the conversion of power from the incident pump frequency into the optical resonance due to the optomechanical coupling. The generated sideband can interfere with the reflected pump, leading to a beat note oscillating at the mechanical frequency. This beat note can be measured with a fast detector and analyzed (e.g., on a spectrum analyzer) to find the spectrum of the thermally excited mechanical modes.

Figures 20C, 20D, 20E:
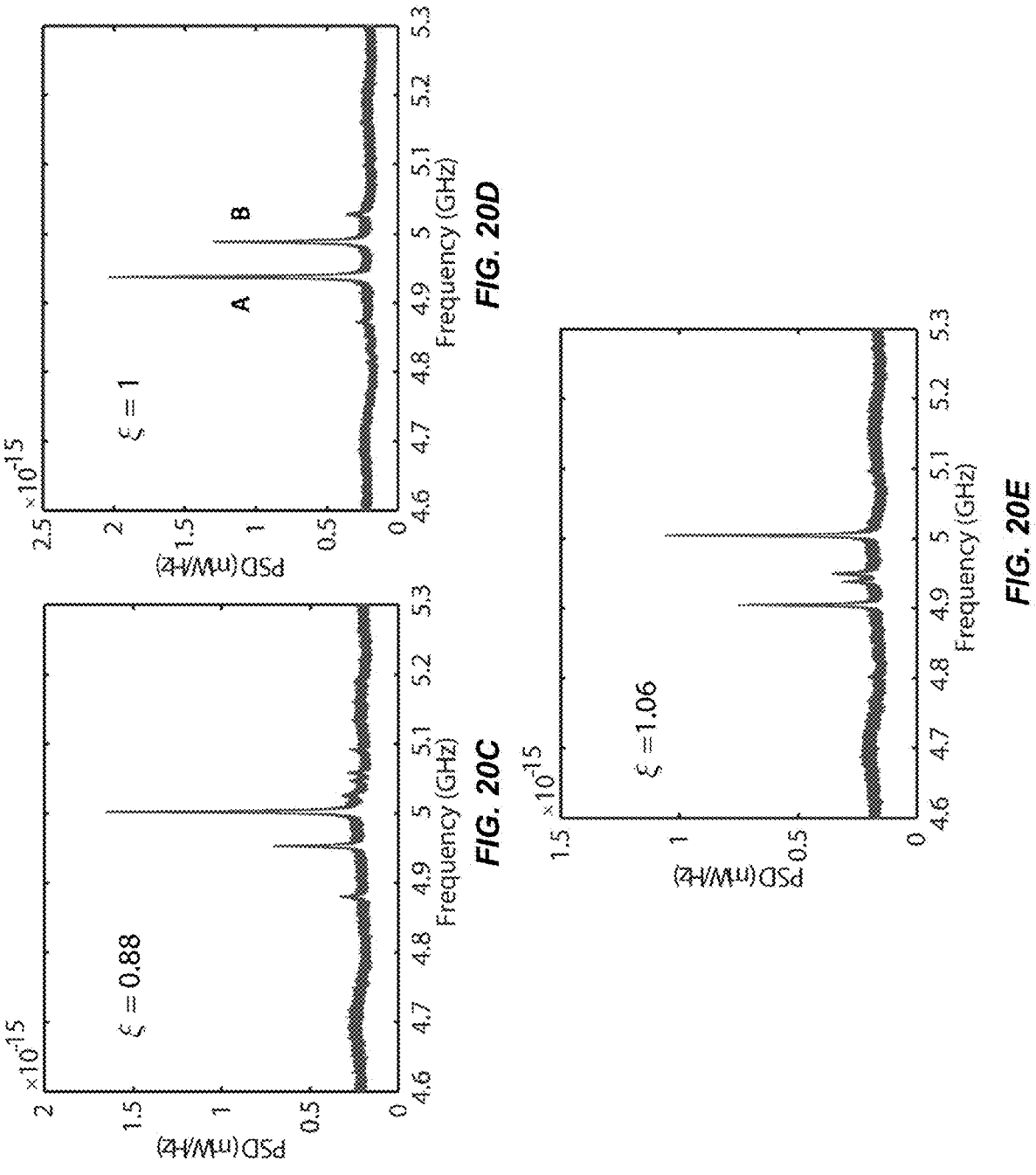
FIGS. 20C-20E illustrate measurements of the optically transduced thermal mechanical spectrum for three devices with different values of the scale parameter ξ according to one embodiment of the present disclosure.

FIGS. 20C-20E illustrate measurements of the optically transduced thermal mechanical spectrum for three devices with different values of the scale parameter ξ according to one embodiment of the present disclosure. The measurements are performed with the pump laser detuned by Δ/2π≈−5 GHz from the optical cavity, and a laser power of 46 μW (n_c=980) at the on-chip waveguide. The presence of multiple peaks in the spectra points to the presence of hybridized supermodes. The areas under the peaks in the spectrum provide a relative measure of the optomechanical coupling rate (g_0) of the different modes (with a quadratic proportionality in the weak coupling regime, where g_0≪κ for an optical linewidth of κ).

Figures 20F, 20G, 20H:
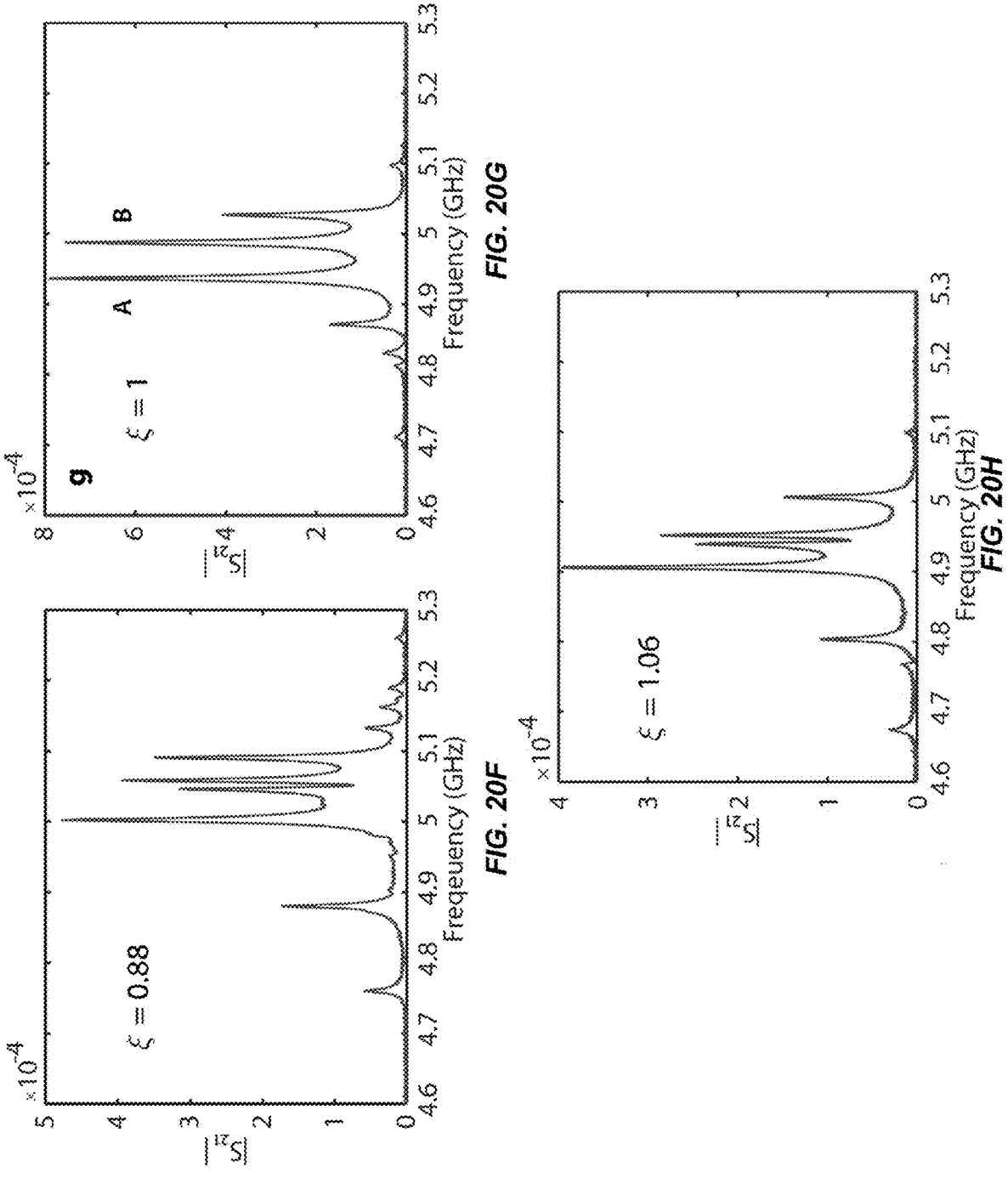
FIGS. 20F-20H illustrate corresponding microwave-to-optical transduction spectra for the measurements illustrated in FIGS. 20C-20E according to one embodiment of the present disclosure.

FIGS. 20F-20H illustrates corresponding microwave-to-optical transduction spectra for the measures illustrated in FIGS. 20C-20E according to one embodiment of the present disclosure. The electromechanical coupling can be created by applying a DC voltage (V_b=10 V) to the electrical port in the device. The mechanical supermodes with significant transduction efficiency can be identified based on the measurement results in FIGS. 20F-20H. To achieve an optimal mechanical spectrum, the frequency of the electromechanical and optomechanical sections of the device can be precisely matched. This is done post-fabrication by identifying the device with the optimal geometry among an array of devices with a varying scale factor (ξ) defined to create a mechanical frequency offset between the optical and electrical sides. The optimal device can be identified by looking for concomitant maxima in the optomechanical and microwave-optics transduction spectra. Additionally, in the devices with near-optimal scaling, a pair of peaks in the transmission spectrum (e.g., modes A and B in FIG. 20D and FIG. 20G) can be observed, which is in qualitative agreement with device modeling. The inventors note that despite the changes in the fine features of the spectrum, all devices show relatively strong transduction signals for a range of scaling parameter values (ξ∈ [0.88-1.06]), indicating robustness against systematic fabrication offsets.

Calibrating Microwave-Optics Conversion Efficiency

Figures 21A, 21B, 21C, 21D:
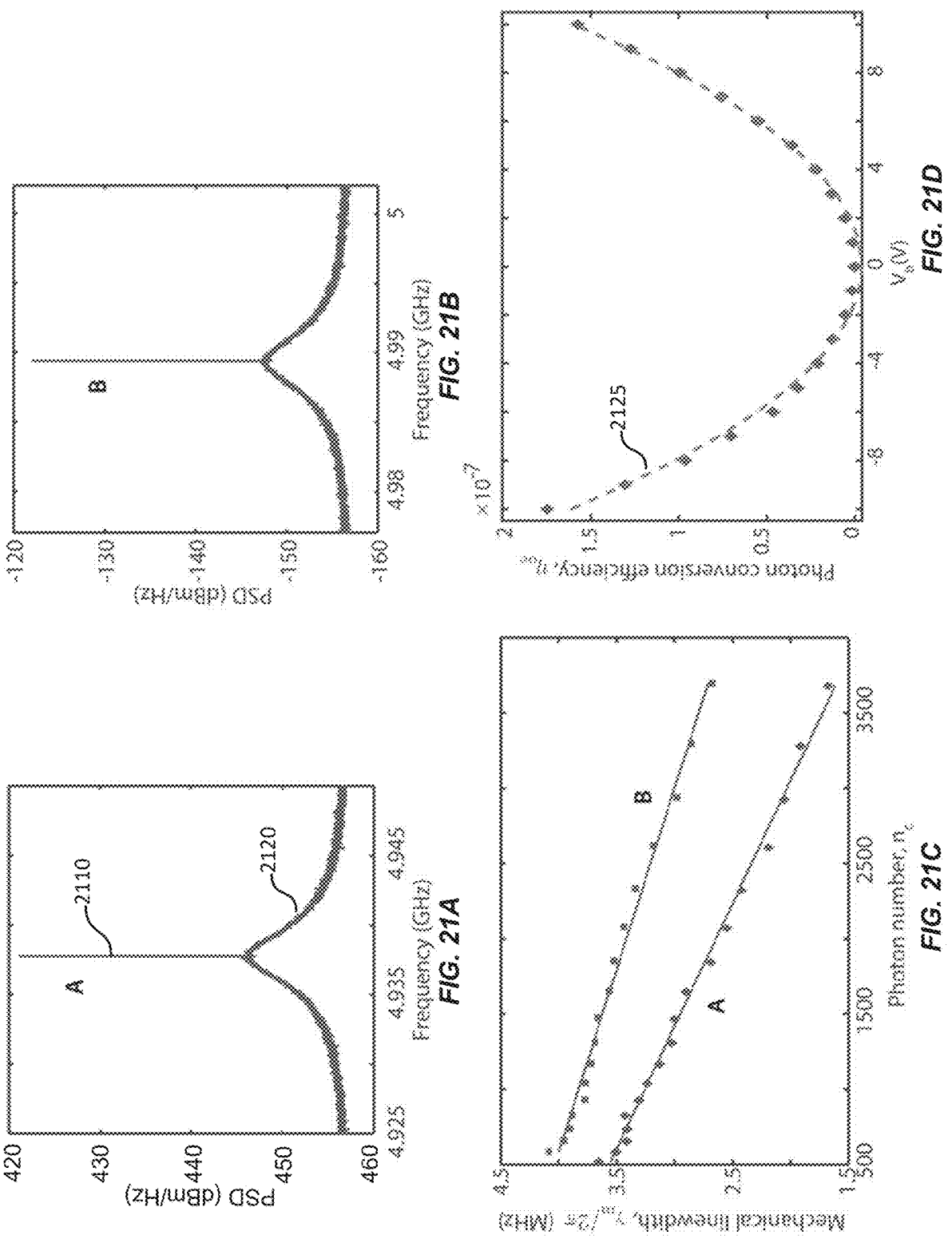
FIG. 21A illustrates the power spectral density (PSD) at the frequency of mode A according to one embodiment of the present disclosure.
FIG. 21B illustrates the PSD for the mechanical mode B with the same microwave power and bias voltage as in FIG. 21A according to one embodiment of the present disclosure.
FIG. 21C illustrates measured linewidths of the mechanical modes A and B as a function of the intra-cavity photon number from the pump laser according to one embodiment of the present disclosure.
FIG. 21D illustrates microwave-to-optical photon flux conversion efficiency $\eta_{oe}$ for mode A as a function of the DC bias voltage according to one embodiment of the present disclosure.

FIGS. 21A-21E illustrate experimental characterizations of the electro-optomechanical frequency conversion when the scaling parameter value ξ is 1. FIG. 21A illustrates the PSD at the frequency of mode A according to one embodiment of the present disclosure. It shows the driven response 2110 (the narrow central peak) and the thermal Brownian motion 2120 (the broad baseline feature) for the mechanical mode A. The microwave power is set to −40 dBm and the DC-bias voltage is 10 V. The number of phonons can be found as n_{phon}^A=1116.

FIG. 21B illustrates the PSD for the mechanical mode B with the same microwave power and bias voltage as in FIG. 21A according to one embodiment of the present disclosure. The number of phonons can be found at n_{phon}^B=1457.

FIG. 21C illustrates measured linewidths of the mechanical modes A and B as a function of an intra-cavity photon number from the pump laser according to one embodiment of the present disclosure.

FIG. 21D illustrates microwave-to-optical photon flux conversion efficiency η_{oe} for mode A as a function of the DC bias voltage according to one embodiment of the present disclosure. Measurements are done with an optical power of 46 μW (n_c=980) in the on-chip waveguide. The microwave drive power is kept sufficiently low (e.g., −6 dBm) to avoid high-order acousto-optic harmonic generation. Line 2125 is a theoretical fit for these measurements.

Figure 21E:
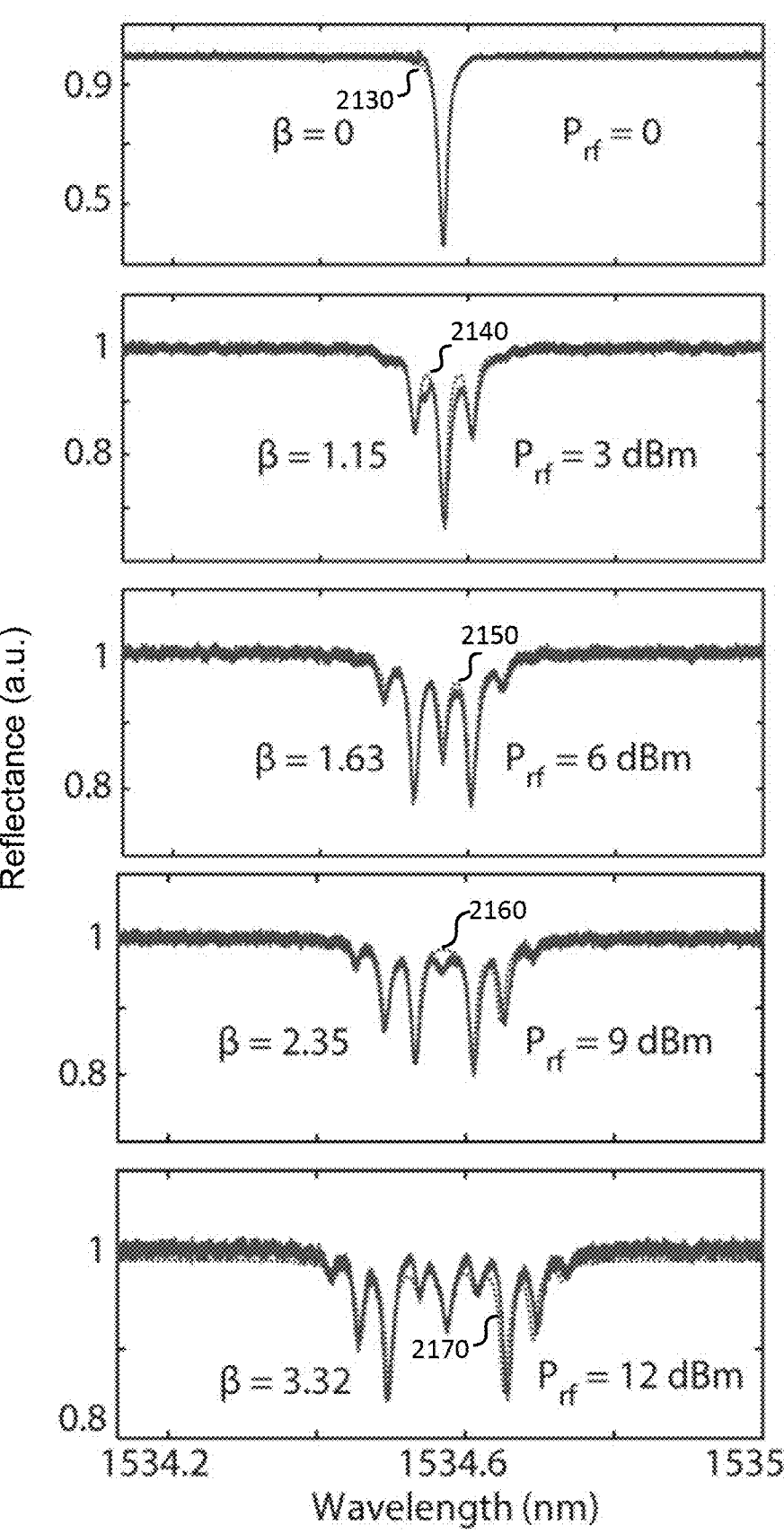
FIG. 21E illustrates optical reflection spectra for microwave drive tones resulting in a large modulation index according to one embodiment of the present disclosure.

FIG. 21E illustrates optical reflection spectra for increasing microwave drive powers resulting in a large modulation index according to one embodiment of the present disclosure. The dotted curves 2130, 2140, 2150, 2160, and 2170 are the theoretical fits for reflectance as a function of the wavelength at different microwave drive powers. The modulation index (B) can be extracted from each theoretical fit at the corresponding microwave drive power. The DC bias voltage is set at 10 V for these measurements.

The optomechanical and electromechanical coupling rates can be characterized in a device with near-optimal geometry. Due to the small magnitude of the electromechanical decay rates, exclusive electrical measurement of the mechanical modes (e.g., via the reflection spectrum) may not be possible. Instead, the electromechanical decay rate can be obtained by measuring the number of electrically excited phonons from a resonant drive with a known input power. The relationship of the electromechanical decay rate and the number of electrically excited phonons can be expressed in Equation (48).

$$n_{phon} = \frac{\gamma_{em}}{(\gamma/2)^2} \cdot \frac{P_{rf}}{\hbar\omega_m} \tag{48}$$

Here, γ is the (total) linewidth of the mechanical oscillator, ω_m is the frequency of the mechanical oscillator, and P_{rf} is the power of the drive tone. The number of phonons in the cavity can be calibrated by measuring the optically transduced PSD, which includes a narrow-band coherent response from the resonant drive along with an incoherent component from the thermal motion of the mechanical resonator, as shown in FIGS. 21A and 21B. The driven phonon number can be obtained by comparing the coherent component and the incoherent component as shown in Equation (49).

$$n_{phon} = \frac{1}{e^{\frac{\hbar\omega_m}{k_B T}} - 1} \frac{S_{coh}}{S_{th}} \tag{49}$$

Here, k_B is the Boltzmann constant, T is the room temperature, S_{coh} and S_{th} are the integrals of the coherent and thermal portions of the PSD, respectively. Using this technique, the electromechanical dissipation rates for the most prominent mechanical modes can be obtained as $$\gamma_{em}^A/2\pi = 0.85 \text{ Hz}$$

and $$\gamma_{em}^B/2\pi = 1.1 \text{ Hz at } V_b = 10 \text{ V}$$

(as shown in FIGS. 21A and 21B). The optomechanical coupling for these two modes can then be calculated by measuring the change in the mechanical linewidth caused by the optomechanical back-action, $$\Delta\gamma_m = -4g_0^2 n_c/\kappa,$$

as a function of photon number from the optical pump $n_c$. Coupling rates $$g_0^A/2\pi = 577$$

kHz and $$g_0^B/2\pi = 470$$

kHz can be calculated based on the measured value of the optical linewidth $\kappa/2\pi=1.39$ GHz.

Using the measured electrical and optical coupling rates, the (internal) microwave-to-optical frequency conversion efficiency can be calculated as $\eta_{oe}=\mathcal{C}_{em}\mathcal{C}_{om}/(1+\mathcal{C}_{em}+\mathcal{C}_{om})^2$. Here, $$\mathcal{C}_{em} = \gamma_{em}/\gamma \text{ and } \mathcal{C}_{om} = 4g_0^2/\kappa\gamma$$

are electromechanical and optomechanical cooperativities. The measured efficiency in FIG. 21D can be found to increase with the DC-bias voltage in a quadratic fashion, in accordance with the theoretical prediction. A maximum value of $\eta_{oe}=1.8\times10^{-7}$ can be obtained for the mechanical mode A at $V_b=10$ V. The transduction bandwidth for this mode is measured as B=3.3 MHz, which is set primarily by the intrinsic mechanical linewidth.

The measurement results can be crosschecked by performing an alternative calibration of the electromechanical decay rate via direct observation of the optomechanical phase modulation. The modulation index can be defined as $\beta\equiv 2\, g_0\sqrt{n_{phon}}/\omega_m$. The modulation index can be increased by increasing the input microwave drive, which ultimately results in the generation of higher-order harmonics of the microwave drive tone in the optical emission from the cavity. These harmonics lead to the splitting of the optical reflection spectrum as the laser frequency sweeps near the optical resonance. Fitting the reflection spectrum to a theory model, the modulation index can be extracted. Subsequently, the efficiency of the modulator can be quantified by finding the half-wave voltage $(V_\pi)$ that renders $\beta=\pi$. Further the half-wave voltage $V_\pi$ can be related to the electromechanical decay rate via Equation (50).

$$V_\pi = \frac{\pi\gamma\omega_m}{4g_0}\sqrt{\frac{2Z_0\hbar\omega_m}{\gamma_{em}}} \quad (50)$$

Using this technique, the electromechanical dissipation rate can be obtained as $$\gamma_{em}^A/2\pi = 0.79 \text{ Hz at } V_b = 10 \text{ V},$$

similar to the result from thermal motion calibration. The inventors note that the device under study can reach values as small as $V_\pi=750$ mV at $V_b=14$ V. This half-wave voltage is on par with previous realizations based on piezoelectric materials. While, in the current devices, the maximum DC-bias voltage is limited to $V_b\approx 15$ V (limited by the onset of the pull-in instability), it may be possible to further lower the half-wave voltage $V_\pi$ in optimal designs accommodating larger bias voltages.

Effects of Frequency Offset on the Mechanical Spectrum

The frequency conversion efficiency is critically dependent on the hybridization of the mechanical modes which lead to simultaneously large optomechanical coupling and electromechanical conversion. The matching of the mechanical resonance frequencies in the EMC and OMC sections ensures the formation of the desired supermode. However, in practice, the nanofabrication of the devices can induce disorders which can create a frequency offset between the EMC and OMC mechanical modes. Such disorders may result from several factors such as non-uniformity of the hole array pattern, thinning of the silicon device layer when removing the on-top metal, and etching anisotropy.

To understand how the resonance offset alters the frequency conversion process, the mechanical supermodes can be simulated to calculate the optomechanical and microwave-to-mechanical external coupling rates with a deliberately introduced geometric offset factor $\xi$ to the lattice constant ($\xi a$) and the two axes of the ellipse hole ($\xi d_1, \xi d_2$) at the EMC center (while maintaining the adiabatic tapering curve, the phonon waveguide, and OMC parameters). The choice of $\xi=1$ corresponds to the condition of matched EMC and OMC resonances. For $\xi<1$, the frequency of the EMC breathing mode increases, and aligns spectrally with a parasitic mode localized at the OMC-phonon waveguide region (where $d_2$ and $a$ are larger than the OMC center as will be shown in FIG. 22A). In this situation, while the electromechanical coupling remains large, the hybridized mechanical mode is shifted away from the optical cavity mode. Therefore, the optomechanical coupling rate and consequently the microwave-optical conversion efficiency are reduced. For $\xi>1$, on the other hand, the frequency of the EMC mode is lower than the original OMC defect mode and matches with a parasitic mode localized in the OMC-phonon waveguide region (where $d_1$ and $a$ are larger than the OMC center, as will be shown in FIG. 23A). The poor spatial overlap of the optical and mechanical fields (caused by a spatial shift in the opposite direction compared to $\xi>1$) results in a reduced optomechanical and microwave-optical conversion efficiency. It can be concluded that, while the mechanical mode hybridization may be robust against disorder, it is important to fine-tune the EMC/OMC resonances for optimized performance.

Figure 22A:
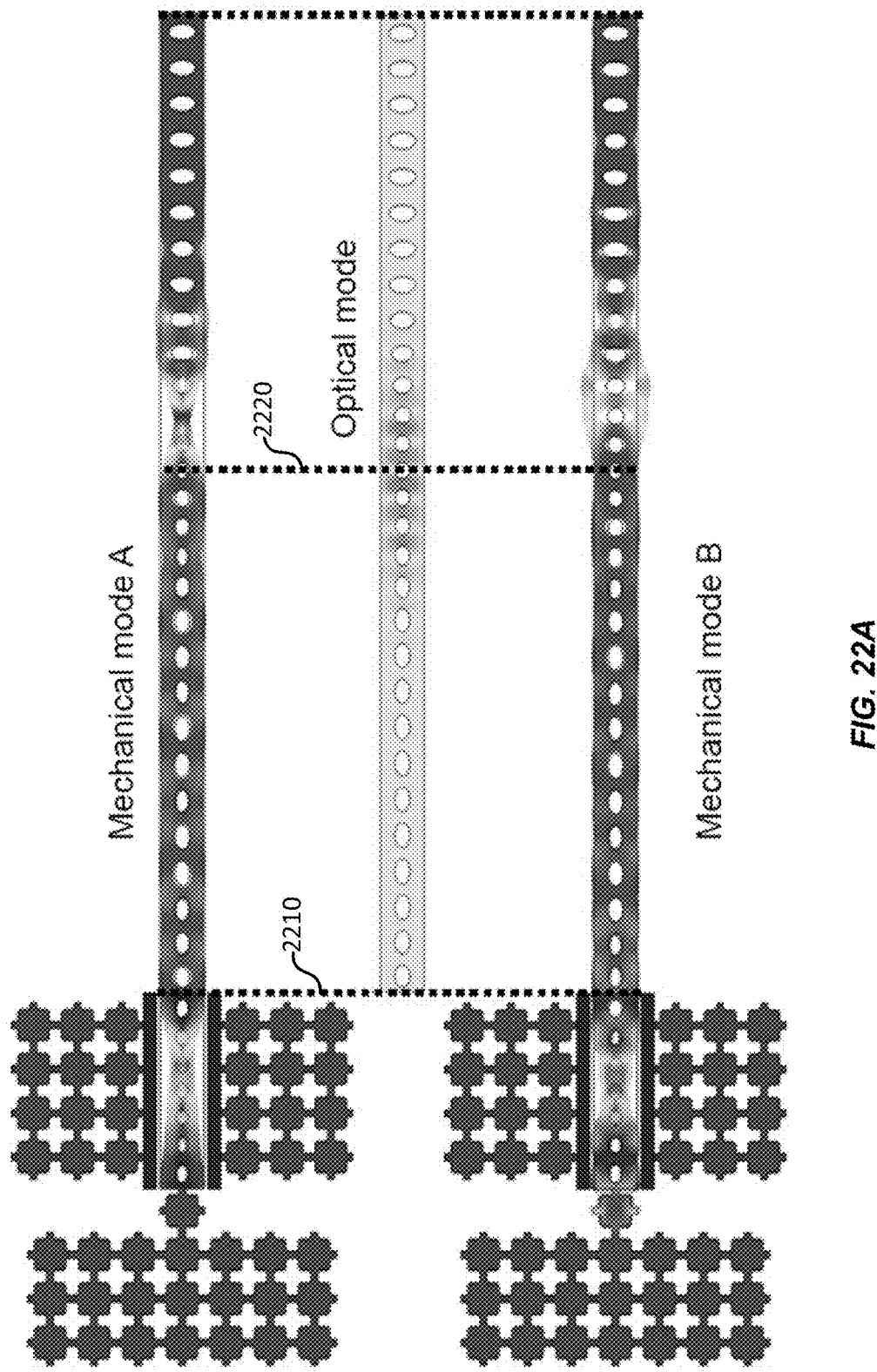
FIGS. 22A-22C illustrate mechanical mode hybridization with the scale parameter set to ξ=0.88 according to one embodiment of the present disclosure.
Figure 22B:
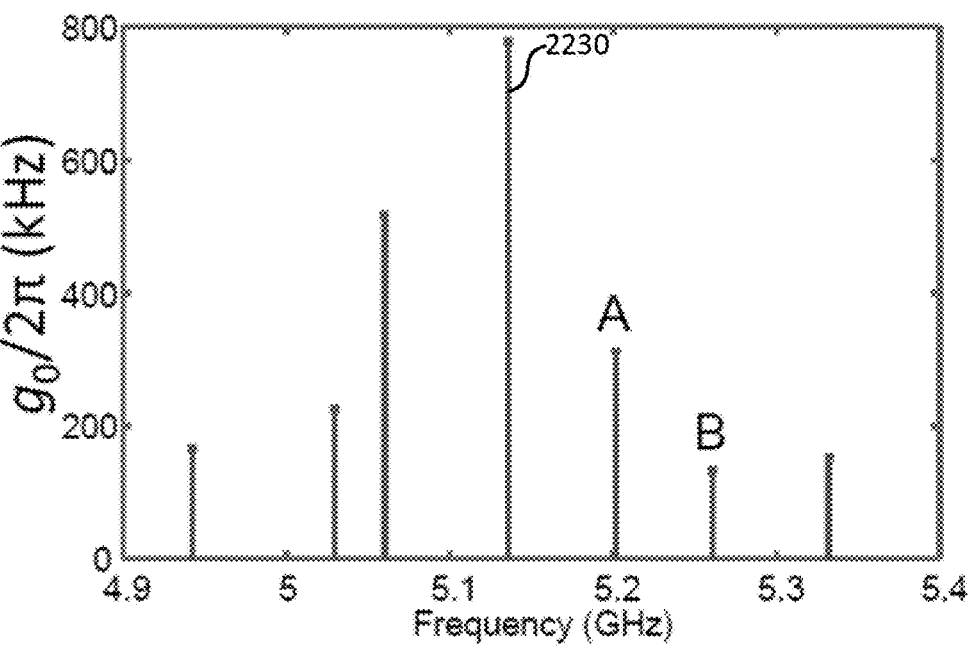
Figure 22C:
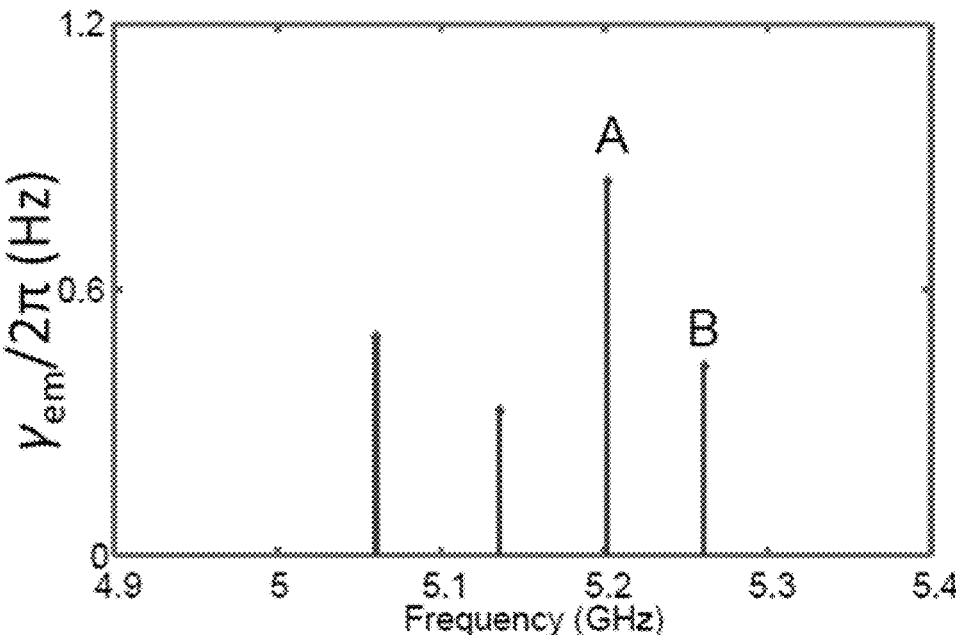

FIGS. 22A-22C illustrate mechanical mode hybridization with the scale parameter set to $\xi=0.88$ according to one embodiment of the present disclosure. FIG. 22A shows a simulated mechanical displacement of the two primary supermodes and the electric field of the optical cavity. FIG. 22B shows calculated optomechanical coupling rates. FIG. 22C shows calculated electromechanical decay rates. The dashed lines 2210 and 2220 in FIG. 22A denote the location of the OMC's central defect. While mechanical hybridization (e.g., modes A and B in FIGS. 22B and 22C) persists in this structure, the optomechanical coupling rates decrease from the optimal design ($\xi=1$) because of the spatial misalignment of the mechanical mode with respect to the optical cavity.

Figure 23A:
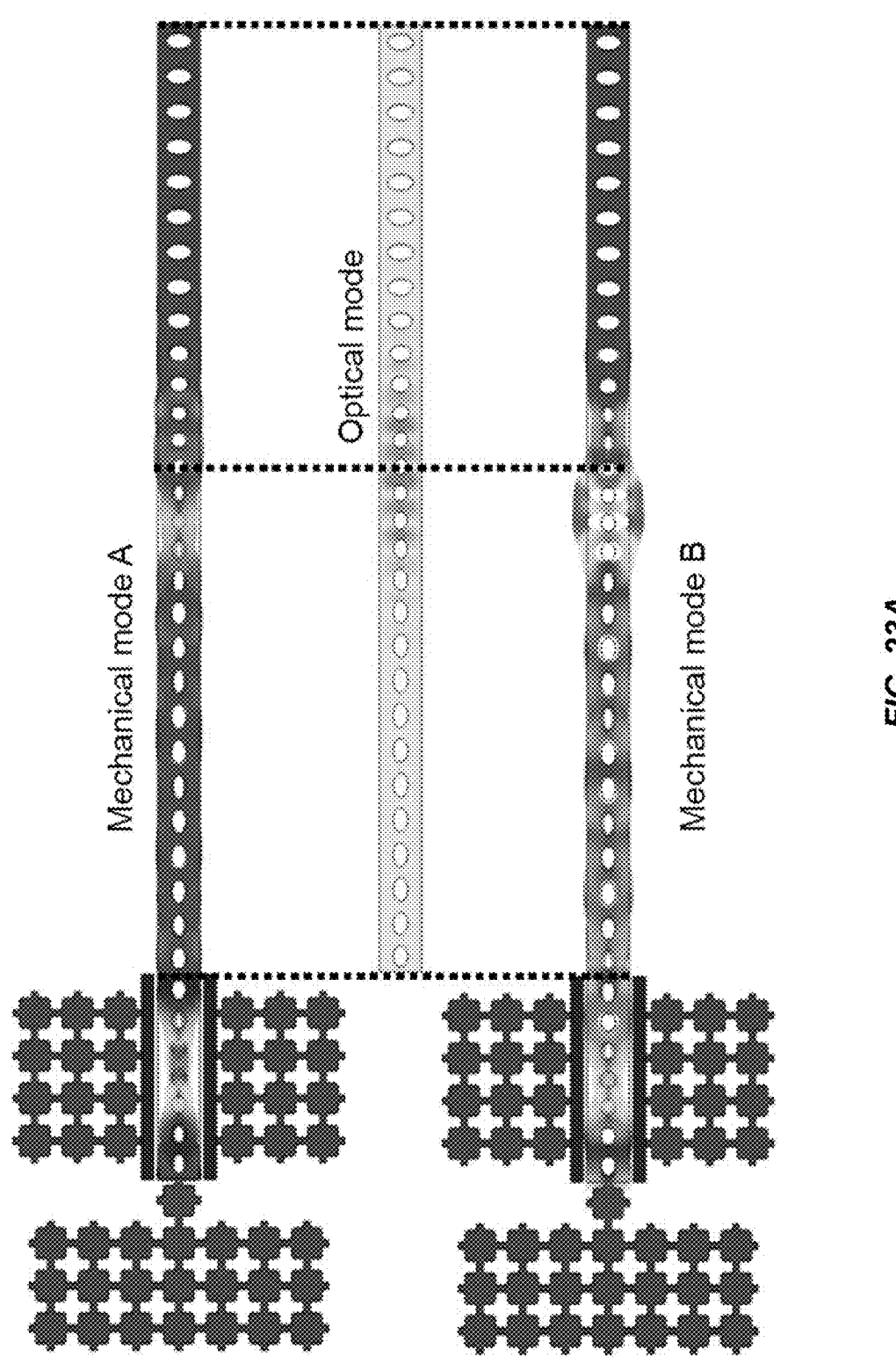
FIGS. 23A-23C illustrate mechanical mode hybridization with the scale parameter set to $\xi=1.06$ according to one embodiment of the present disclosure.
Figure 23B:
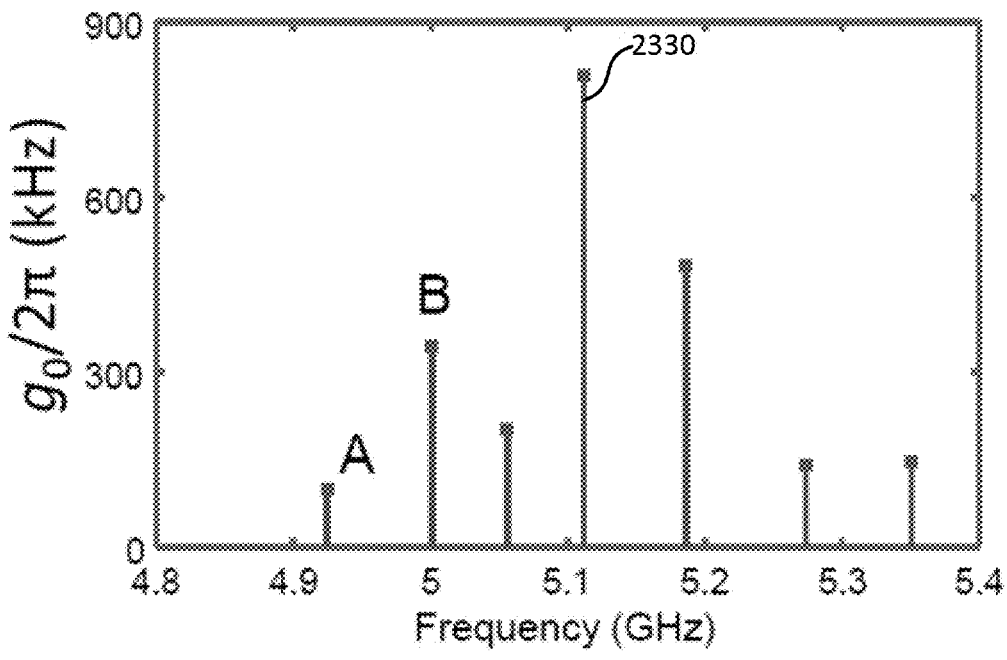
Figure 23C:
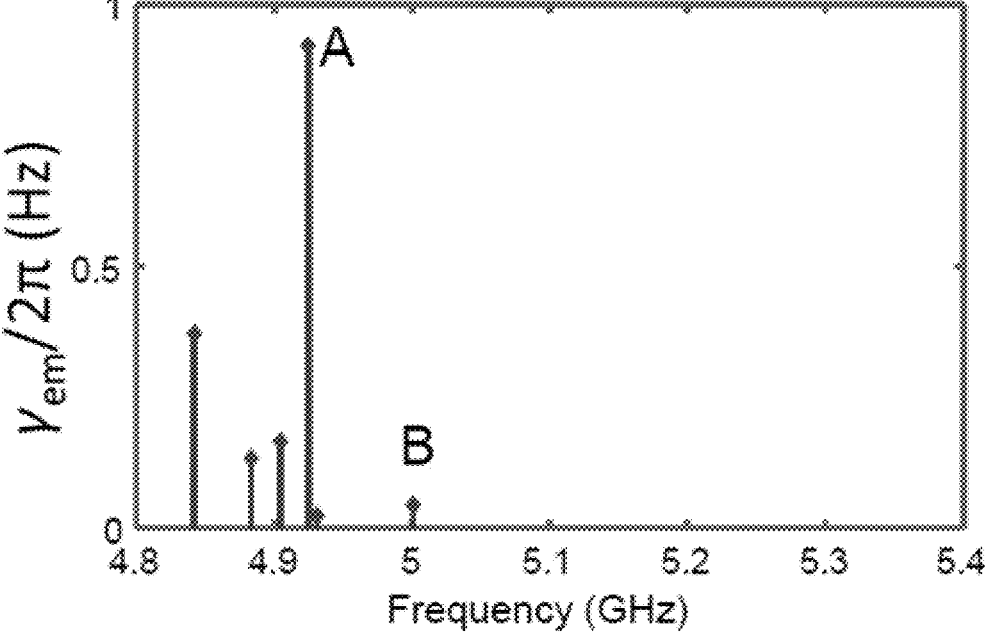

FIGS. 23A-23C illustrate mechanical mode hybridization with the scale parameter set to $\xi=1.06$ according to one embodiment of the present disclosure. FIG. 23A shows simulated mechanical displacement of the two primary supermodes and the electric field of the optical cavity. FIG. 23B shows calculated optomechanical coupling rates. FIG. 23C shows calculated electromechanical decay rates. The dashed lines in FIG. 23A denote the location of the OMC's central defect. In addition to the reduced optomechanical coupling, the EMC/OMC sections are only weakly hybridized, with unequal energy participation in the two supermodes, as shown in FIGS. 23B and 23C.

Figures 24A, 24B:
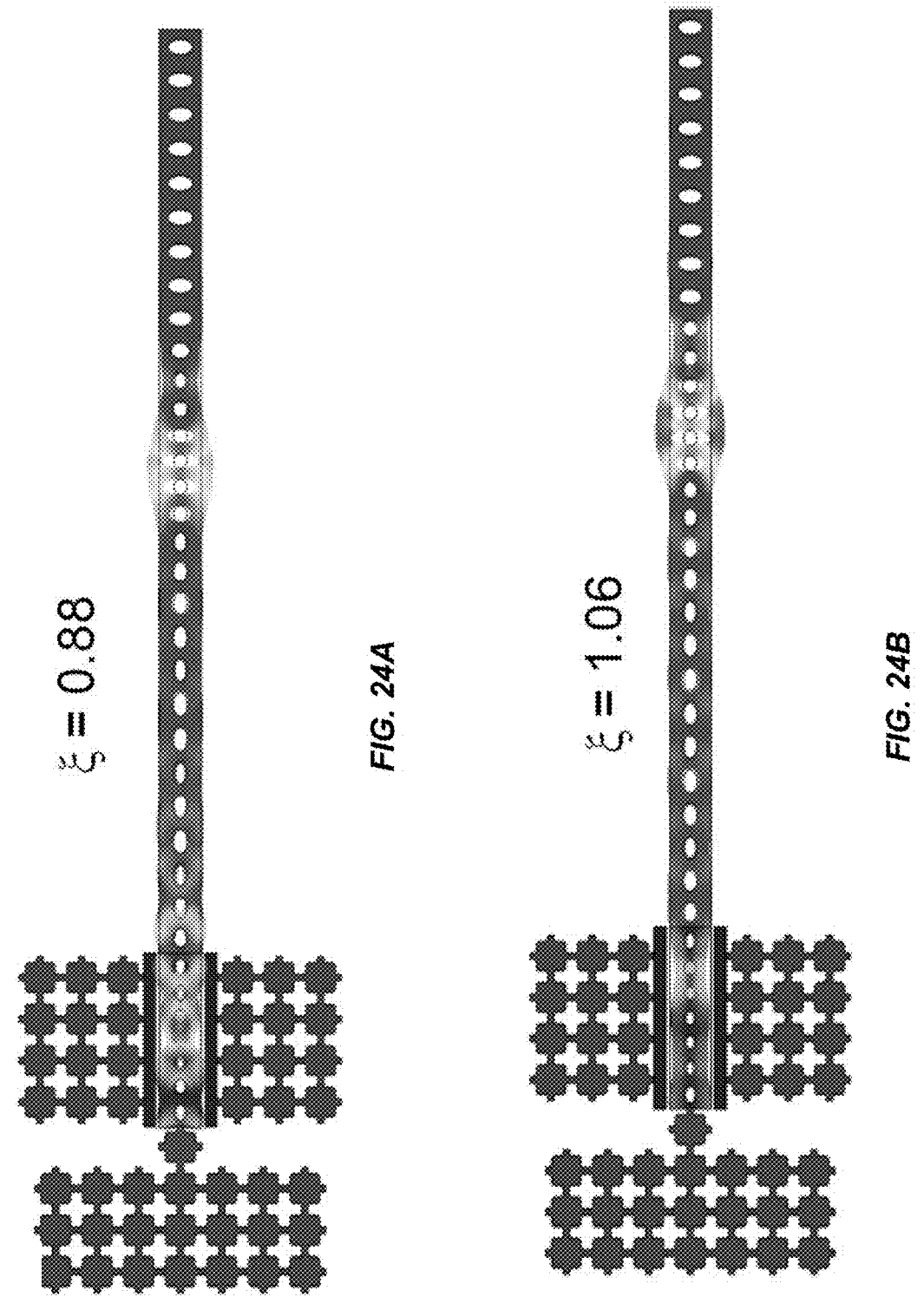
FIG. 24A and FIG. 24B illustrate mechanical displacement profiles of the supermodes with the largest optomechanical coupling for the designs with $\xi=0.88$ and $\xi=1.06$ respectively according to one embodiment of the present disclosure.

FIG. 24A and FIG. 24B illustrate mechanical displacement profiles of the supermodes with the largest optomechanical coupling for the designs with $\xi=0.88$ and $\xi=1.06$ respectively according to one embodiment of the present disclosure. The effects of frequency offset can be alternatively understood by keeping track of the breathing mode at the OMC defect center, which at ($\xi\neq1$) weakly hybridize with parasitic mechanical modes in the EMC section, resulting in supermodes with high optomechanical coupling rates (see the modes 2230 and 2330 near 5.1 GHz in FIG. 22B and FIG. 23B), but weak electro-mechanical coupling. For example, at $\xi=0.88$, the OMC defect mode hybridizes with a shear mode at the EMC section. Since the displacement direction of the shear mode is out of the plane, this mode does not change the air gap of the capacitor and has a negligible $\partial C/\partial x$ (FIG. 24A). As another example, at $\xi=1.06$, the mode at the EMC section is a second-order breathing mode with reduced aC/ax (FIG. 24B). Therefore, while these modes have significant optomechanical coupling rates, their overall microwave-optical frequency conversion efficiency is compromised by the reduced electro-mechanical coupling. The simulations are in qualitative agreement with the experimental observations shown in FIGS. 20C-20H.

Homodyne Detection of the Mechanically Transduced Microwave Signals

The optomechanical interaction in the rotating frame of the pump laser can be described via the Hamiltonian, as shown in Equation (51).

$$\hat{H}/\hbar = \Delta\hat{a}^\dagger\hat{a} + \omega_m\hat{b}^\dagger\hat{b} - g_0\hat{a}^\dagger\hat{a}\hat{b} \tag{51}$$

Here, $\hat{a}$ and $\hat{b}$ are the annihilation operators for the optical and mechanical fields. The variables $\omega_o$, $\omega_m$, and $\omega_p$ denote the frequencies of the mechanical oscillator, optical cavity and the pump laser, and the detuning parameter is defined as $\Delta=\omega_o-\omega_p$. Using this Hamiltonian, the classical response of the system can be derived as shown in Equations (52) and (53), using a pair of equations of motions for the classical mode amplitudes $a=\langle\hat{a}\rangle$ and $b=\langle\hat{b}\rangle$.

$$\dot{b} = -(i\omega_m + \gamma/2)b + ig_0a^*a - \sqrt{\gamma_{em}}\,b_{in} \tag{52}$$

$$\dot{a} = -(i\Delta + \kappa/2)a + i(b + b^*)a - \sqrt{\kappa_e}\,a_{in} \tag{53}$$

Here, $\kappa_e$ is the optical external coupling from the waveguide coupler to the optical cavity, and $a_{in}$ is the incident optical field amplitude. Similarly, $\gamma_{em}$ and $b_{in}$ denote the electromechanical decay rate and the amplitude of the electrical drive in the microwave waveguide.

For small (optomechanical) cooperativities, the equation for the mechanical mode can be solved by ignoring the optomechanical interaction, leading to $b=\sqrt{n_{phon}}e^{-i\omega_m t}$, with the phonon number given by Equation (48). In this situation, the remaining equation for the optical mode can be rewritten as a function of the modulation index $\beta=2\,g_0\sqrt{n_{phon}}/\omega_m$ as shown in Equation (54).

$$\dot{a} = -(i\Delta + \kappa/2)a + i\beta\omega_m\cos(\omega_m t)a - \sqrt{\kappa_e}\,a_{in} \tag{54}$$

For a small $\beta$ in the sideband resolved regime ($\kappa<\omega_m$), only the first-order sidebands are pertinent in the intracavity optical field. Hence, it is appropriate to write the optical field in the rotating frame of the laser carrier frequency as shown in Equation (55).

$$a = a_{-1}e^{i\omega_m t} + a_0 + a_1 e^{-i\omega_m t} \tag{55}$$

Plugging Equation (55) into Equation (54), each frequency component can be expressed in Equations (56)-(57).

$$a_0 = -\frac{\sqrt{\kappa_e}}{i\Delta + \kappa/2}a_{in} \tag{56}$$

$$a_1 = \frac{i\beta\omega_m/2}{i(\Delta - \omega_m) + \kappa/2}a_0 \tag{57}$$

$$a_{-1} = \frac{i\beta\omega_m/2}{i(\Delta + \omega_m) + \kappa/2}a_0 \tag{58}$$

The optical waveguide output field can be written as a function of the field inside the cavity as shown in Equation (59).

$$a_{out} = a_{in} + \sqrt{\kappa_e}\,a = A_0 - A_1 e^{-i\omega_m t} - A_{-1}e^{+i\omega_m t} \tag{59}$$

For the cases when the laser pumps are detuned by one mechanical frequency to the red or blue side of the optical cavity ($\Delta=\pm\omega_m$), the modulation creates a single frequency component predominantly as shown in Equation (60).

$$A_{\pm1} = -\frac{i\beta\omega_m}{\kappa}\frac{\kappa_e}{\pm i\omega_m + \kappa/2}a_{in} \tag{60}$$

The microwave-to-optical power conversion efficiency can be written as the ratio of the power in the generated optical side bands normalized to the power of the electrical drive used to excite the mechanical mode, as shown in Equation (61), where $P_{in,o}=|a_{in}|^2$ is the optical pump power at the feed waveguide.

$$\frac{P_o(\omega_m)}{P_{rf}} = \frac{|A_{\pm1}|^2}{P_{rf}} = \frac{\beta^2\omega_m^2}{\kappa^2}\frac{\kappa_e^2}{\omega_m^2 + \kappa^2/4}P_{in,o} \tag{61}$$

Using the definition of $V_\pi$ (the peak microwave voltage required to excite the mechanical mode sufficiently for achieving a modulation index of $\beta=\pi$), the modulation index can be substituted as $\beta=\pi\sqrt{2Z_0 P_{rf}/V_\pi^2}$ in the expression for the efficiency. The microwave-to-optical power conversion efficiency can then be expressed in Equation (62), where $Z_0$ is the impedance of the transmission line.

$$\frac{P_o(\omega_m)}{P_{rf}} = \frac{2\pi^2 Z_0 \omega_m^2 \kappa_e^2}{\kappa^2(\omega_m^2 + \kappa^2/4)V_\pi^2} P_{in,o} \tag{62}$$

Subsequently, the power conversion efficiency can be recast to the photon flux conversion efficiency, as shown in Equation (63).

$$\frac{P_o(\omega_m)/\hbar\omega_p}{P_{rf}/\hbar\omega_m} = \frac{2\pi^2 Z_0 \omega_3^3 \kappa_e^2}{\kappa^2 \omega_p(\omega_m^2 + \kappa^2/4)V_\pi^2} P_{in,o} \tag{63}$$

At low intra-cavity photon numbers $$\left(n_C \ll \kappa\gamma/4g_0^2\right),$$

Equation (63) is equivalent to $\eta_{oe}=4\mathcal{C}_{em}\mathcal{C}_{om}/(1+\mathcal{C}_{em}+\mathcal{C}_{om})^2$ (barring the extraction factor $\eta_o=\kappa_e/\kappa$). Note that this conversion efficiency is inversely proportional to $$V_\pi^2.$$

Figure 25:
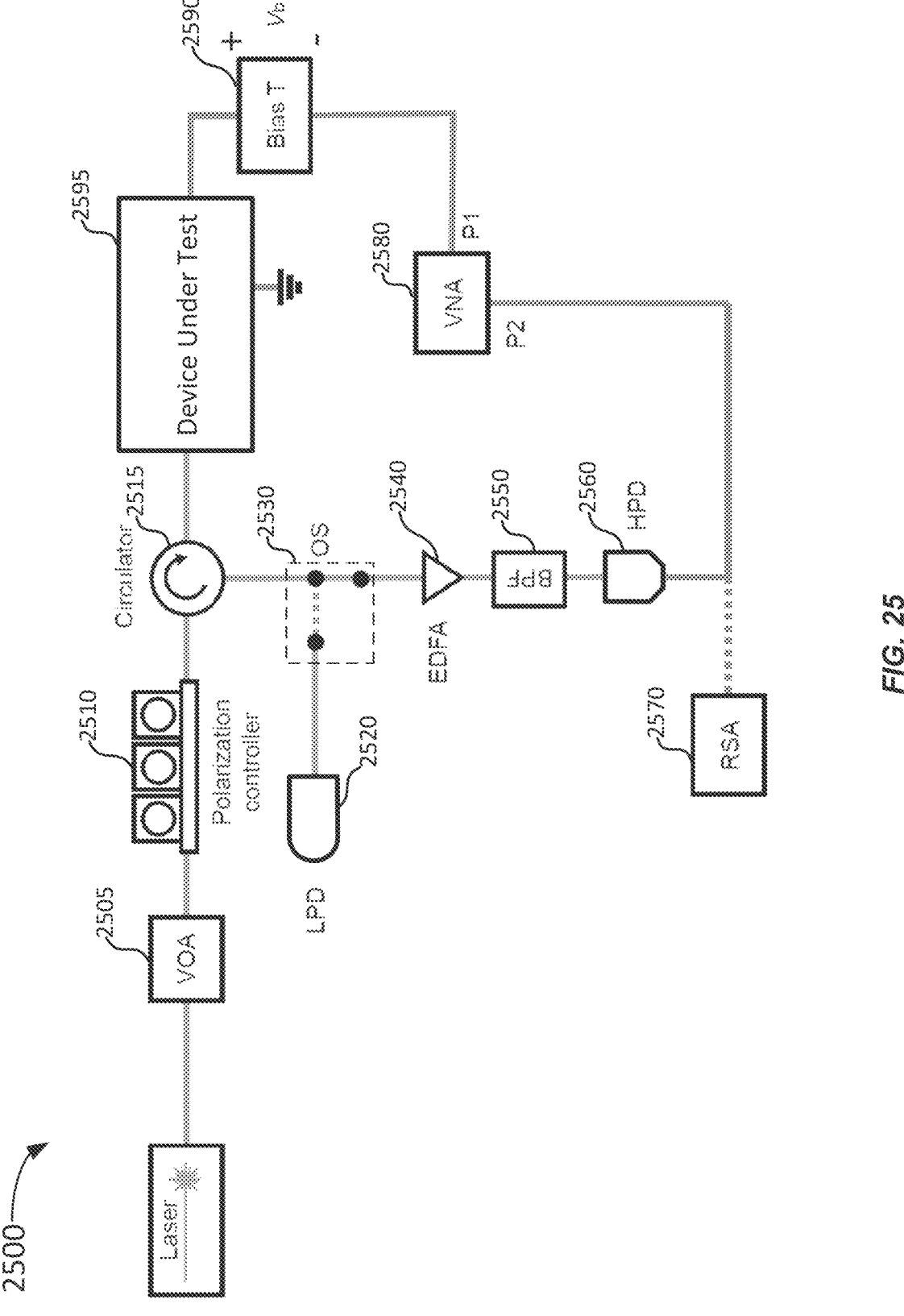
FIG. 25 shows a detailed schematic of a homodyne measurement setup for characterizing electro-optomechanical frequency conversion according to one embodiment of the present disclosure.

FIG. 25 shows a detailed schematics 2500 of a homodyne measurement setup for characterizing electro-optomechanical frequency conversion according to one embodiment of the present disclosure. VOA 2505 represents a variable optical attenuator. A polarization controller 2510 is used to randomly select a polarization state. A circulator 2515 is used for investigation in reflection mode. LPD 2520 represents a low-speed photodetector. The LPD 2520 is used for measuring the optical reflection spectrum. OS 2530 represents an optical switch. EDFA 2540 represents an erbium-doped fiber amplifier. BPF 2550 represents an optical bandpass filter. HPD 2560 represents a high-speed photodetector. The HPD 2540 has a 25 GHz bandwidth and is used for measuring the modulated sidebands. RSA 2570 represents a real-time spectrum analyzer. VNA 2580 represents a vector network analyzer. A Bias Tee 2590 is used to provide DC voltage to the device under test 2595.

The homodyne setup in FIG. 25 can detect the converted optical frequency component. A low modulation index can be achieved by setting the DC-bias voltage at $V_b$=10 V and microwave drive power at $P_{rf}$=−6 dBm. When the laser incident is at the blue sideband, the converted frequency component beats with the laser frequency at the high-speed photodetector, resulting in the microwave voltage received by the VNA 2580 as shown in Equation (64).

$$|s_o(\omega_m)| = \frac{2\beta\omega_m\kappa_e}{\kappa\sqrt{\omega_m^2 + \kappa^2/4}} G \cdot P_{in,o} \tag{64}$$

Here, the factor G includes the power amplification of the EDFA 2540, power-to-voltage response of the photodetector, optical fiber loss and microwave cable loss. The magnitude of the $S_{21}$ trace, as shown in Equation (65), measures the voltage in Equation (64) over the incident microwave voltage.

$$|S_{21}| = \frac{|s_o(\omega_m)|}{V_{in}} = \frac{2\sqrt{2}\,\omega_m\kappa_e}{V_\pi\kappa\sqrt{\omega_m^2 + \kappa^2/4}} G \cdot P_{in,o} \tag{65}$$

Comparing Equation (65) with Equation (64), it can be concluded that $|S_{21}|$ is proportional to the square-root of the frequency conversion efficiency at any given laser power $P_{in,o}$. Therefore, the experimental measurements of $|S_{21}|$ can be used to characterize the spectra of transduction in the devices.

Reflection Spectrum of a Strongly Driven Resonant Phase Modulator

For a high modulation index ($\beta$>1), higher-order sidebands are involved in the solution of Equation (54), which leads to the splitting of the reflection spectrum. Here, the general solution of Equation (54) can show how $\beta$ can be obtained from the reflection spectrum fitting. By the transformation $\alpha(t)=\alpha(t)\exp[-\beta \sin(\omega_m t+\phi)]$, Equation (54) can be rewritten as Equation (66) below.

$$\dot{\alpha} = -(i\Delta + \kappa/2)\alpha - \sqrt{\kappa_e}\,e^{i\beta\sin(\omega_m t+\phi)}a_{in} \tag{66}$$

Using Jacobian-Anger expansion as shown in Equation (67), where $J_k(\beta)$ is the Bessel function of the first kind, and $\alpha(t)=\Sigma_k a_k\exp(ik\omega_m t)$, Equation (66) can be transformed into Equation (68), which can lead to Equation (69).

$$e^{i\beta\sin(\omega_m t+\phi)} = \sum_k J_k(\beta)e^{ik(\omega_m t+\phi)} \tag{67}$$

$$ik\omega_m\alpha_k = -(i\Delta + \kappa/2)\alpha_k - J_k(\beta)e^{ik\phi}\sqrt{\kappa_e}\,a_{in} \tag{68}$$

$$\alpha_k = -e^{ik\phi}\frac{J_k(\beta)\sqrt{\kappa_e}}{i(\Delta + k\omega_m) + \kappa/2}a_{in} \tag{69}$$

The intracavity optical field can thereby be expressed in Equation (70), based on which the reflected optical field can be expressed in Equation (71).

$$a(t) = \sum_n e^{in(\omega_m t+\phi)}\sum_k J_{n+k}(\beta)J_n(\beta)\frac{-\sqrt{\kappa_e}\,a_{in}}{i(\Delta + k\omega_m) + \kappa/2} \tag{70}$$

$$a_{out}(t) = a_{in} + \sqrt{\kappa_e}\,a(t) \tag{71}$$

The spectra of the reflected optical power can be measured via a low-speed photodetector with the maximum bandwidth of 10 MHz, which may only detect the slowly varying envelope of the optical field. Therefore, the reflection spectrum at the low-speed photodetector can be expressed in Equation (72), where $\langle \bullet \rangle$ denotes time averaging (due to the small bandwidth of the detector).

$$R = \left\langle \frac{|a_{out}|^2}{|a_{in}|^2}\right\rangle = \sum_k\left|J_k(\beta) - \frac{J_k(\beta)\kappa_e}{i(\Delta + k\omega_m) + \kappa/2}\right|^2 \tag{72}$$

In the fabricated optic-electromechanical device of the present disclosure, however, the total optical reflection can include stray light reflection from non-resonance structures, which may contribute to a static noisy background. Before fitting the measured reflected power spectra to Equation (71), it is necessary to remove the background features.

Since the background is invariant under different modulations of the OMC optical cavity, the static background can be extracted by interpolating the optical resonance of the reflectance spectrum without modulation. The backgrounds of the modulated spectra can thereby be removed by normalizing the spectra by the obtained non-modulated background. After the background removal, the experimental data can be fitted using Equation (72) for each plot in FIG. 21E, from which the corresponding modulation index can be extracted.

Practical Limits on the DC-Bias Voltage

The maximum electromechanical decay rate is set by the maximum DC voltage that can be applied before the breakdown of the optic-electromagnetic device in the present disclosure. This upper limit is set by the pull-in voltage at which the nanobeam (the center electrode) touches one of the outer ground electrodes. This 'pull-in' phenomenon is commonly observed in electrostatic actuators when the electrostatic force with increasing voltage becomes too strong to be reset by the effective mechanical spring force, leading to unstable mechanical dynamics. Once the bias voltage reaches the onset of such instability, the electrodes may not recover the original positions due to the static stiction. The pull-in is occasionally accompanied by permanent structural damage, which is suspected to be caused by a transient large current through the shut-down capacitor, leading to heat generation and the meltdown and collapsing of the mechanical structure. In one experiment, repeatable breakdown voltages across 5 devices are measured to be $15\pm1$V.

Figure 26A:
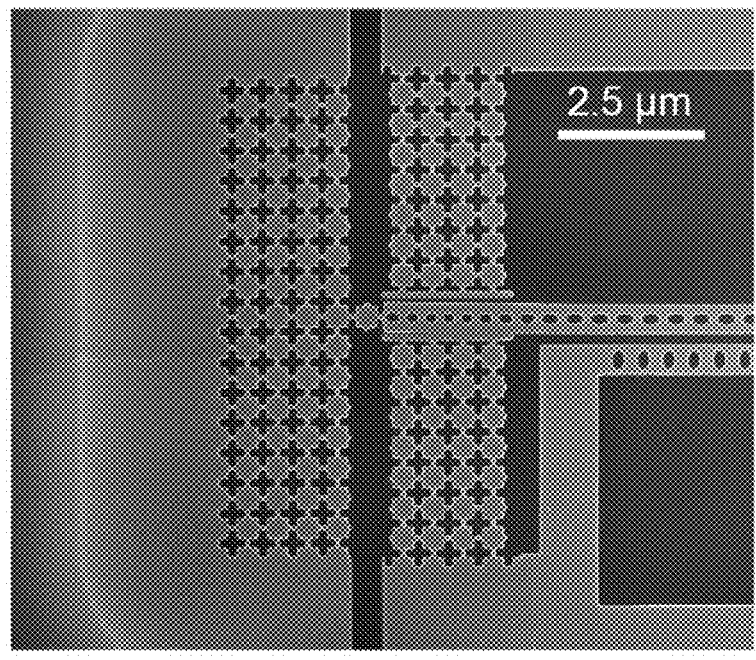
FIG. 26A shows an SEM image of a nanobeam touching one of the ground electrodes featuring a pull-in phenomenon according to one embodiment of the present disclosure.
Figure 26B:
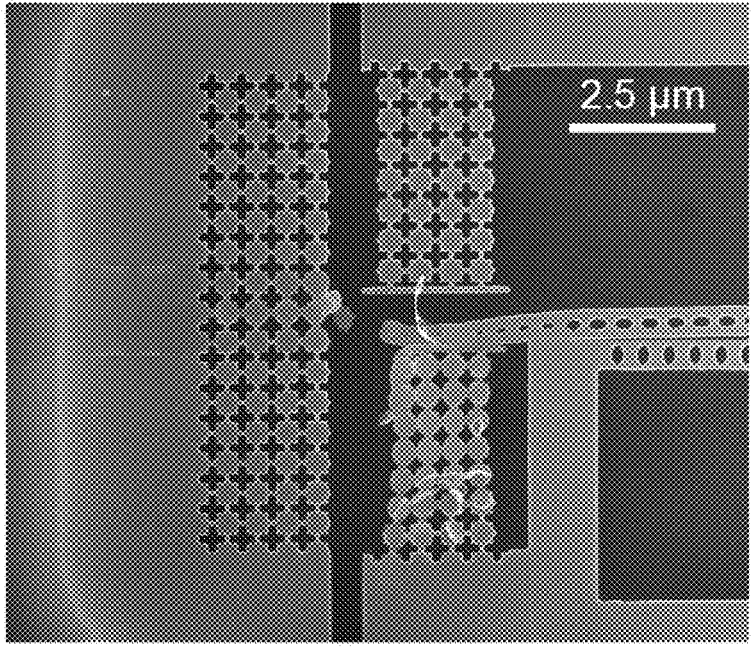
FIG. 26B shows an SEM image of a broken-down device with collapsed nanobeam after applying a DC-voltage of 14 V according to one embodiment of the present disclosure.

FIG. 26A shows an SEM image of a nanobeam touching one of the ground electrodes featuring a pull-in phenomenon according to one embodiment of the present disclosure. FIG. 26B shows an SEM image of a broken-down device with collapsed nanobeam after applying a DC-voltage of 14 V according to one embodiment of the present disclosure. The voltage that results in the pull-in of the device in FIG. 26A is 16V. The device does not melt, which may be attributed to an out-of-plane motion without a direct touching of the metal layer. The reshaping of the phonon shields near the electrodes and the peeling-off of the TiN layer suggest damage might be created by heating from the short circuit.

Applications of the Phononic Crystal Electrostatic Transducer

FIG. 27 is a simplified flowchart illustrating a method of storing a qubit signal according to one embodiment of the present disclosure. The method 2700 includes receiving a qubit signal in a microwave form (2710) and converting the qubit signal into a quantum acoustic signal by tuning the qubit signal into resonance with a phononic crystal oscillator (2712). The qubit signal can be a superconducting qubit generated by a superconducting circuit. The qubit signal contains certain quantum information. The superconducting circuit can be a microwave resonator made from TiN. The phononic crystal oscillator can include a capacitor with a moving electrode. The microwave resonator and the phononic crystal oscillator can be tuned into resonance so that the qubit signal in microwave form can be converted into a quantum acoustic signal.

The method also includes storing the quantum acoustic signal in the phononic crystal oscillator for a predetermined period of time (2714). In some examples, the quantum acoustic signal can be stored for a duration of half rabi cycles. The method also includes detuning the qubit signal in the microwave form from the phononic crystal oscillator (2716). The qubit signal is then back in the microwave form, and the contained quantum information can then be retrieved by certain devices.

It should be appreciated that the specific steps illustrated in FIG. 27 provide a particular method of storing a qubit signal in microwave-mechanics quantum memory according to one embodiment of the present disclosure. Other sequences of steps may also be performed according to alternative embodiments. For example, alternative embodiments of the present disclosure may perform the steps outlined above in a different order. Moreover, the individual steps illustrated in FIG. 27 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 28 is a simplified flowchart 2800 illustrating a method of transducing quantum signals for fiber optic transmission according to one embodiment of the present disclosure. The method 2600 includes receiving a quantum microwave signal at a first terminal of an optic fiber (2810); tuning the quantum microwave signal to couple to a phononic crystal oscillator (2812); and converting the quantum microwave signal to a quantum acoustic signal in response to the tuning (2814). The quantum microwave signal can be generated by a microwave resonator. The phononic crystal oscillator at the first terminal of the optic fiber can be tuned to couple to the microwave resonator (e.g., resonance with the quantum microwave signal). The quantum microwave signal is then converted to a quantum acoustic signal.

The method also includes modulating an optical resonator to couple to the phononic crystal oscillator (2816) and converting the quantum acoustic signal to a quantum optical signal in response to the modulating (2818). The mechanical oscillation of the phononic crystal oscillator can modulate the phase of the optical field of the optical resonator so that the optical resonator can be in resonance with the phononic crystal oscillator. Thereby, the quantum acoustic signal can be converted to a quantum optical signal.

The method also includes causing the quantum optical signal to be transmitted via the optic fiber from the first terminal of the optical fiber to a second terminal of the optic fiber (2820). The quantum optical signal at the second terminal of the optical fiber may be down-converted. For example, the quantum optical signal can be converted to a quantum acoustic signal by modulating an optical resonator at the second terminal of the optic fiber to resonate with a phononic crystal oscillator at the second terminal. The quantum acoustic signal can be further converted to a quantum microwave signal by tuning a microwave resonator at the second terminal into resonance with the phononic crystal oscillator.

It should be appreciated that the specific steps illustrated in FIG. 28 provides a particular method of transducing a qubit for fiber optic transmission using an electro-optomechanical system according to one embodiment of the present disclosure. Other sequences of steps may also be performed according to alternative embodiments. For example, alternative embodiments of the present disclosure may perform the steps outlined above in a different order. Moreover, the individual steps illustrated in FIG. 26 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for transducing and storing a qubit signal, the system comprising:

a voltage source;

a substrate;

a membrane suspended over the substrate;

a phononic crystal oscillator disposed in a first region of the membrane, wherein the phononic crystal oscillator comprises a capacitor having a moving electrode including an array of multiple phononic crystal unit cells, wherein the moving electrode is connected to the voltage source; and a superconducting circuit disposed in a second region of the membrane.

2. The system of claim 1, wherein the phononic crystal oscillator has a mechanical resonance frequency in a range from about 5 GHz to about 8 GHz.

3. The system of claim 1, wherein the capacitor further comprises a set of outer electrodes located on either side of the moving electrode.

4. The system of claim 3, wherein each of the set of outer electrodes and the moving electrode are separated by a vacuum gap of less than 100 nm.

5. The system of claim 1, wherein the first region is mechanically coupled to the second region.

6. The system of claim 1, wherein the membrane comprises crystalline silicon.

7. The system of claim 6, wherein the membrane has a thickness of about 220 nm.

8. The system of claim 1, wherein the voltage source comprises a Direct Current (DC) voltage source.

9. The system of claim 8, wherein the DC voltage is in a range from about 1 V to about 25 V.

10. The system of claim 1, wherein the superconducting circuit comprises a ladder-shape topology.

11. The system of claim 10, wherein the superconducting circuit comprises Titanium Nitride (TiN) nanowires.

12. The system of claim 11, wherein the TiN nanowires have a thickness of about 15 nm.

13. The system of claim 1, wherein the superconducting circuit is characterized by an impedance of about 2.5 k$\Omega$.

14. The system of claim 1, further comprising:

a first plurality of phonon shields disposed in a third region of the membrane; and a second plurality of phonon shields disposed in a fourth region of the membrane.

15. The system of claim 14, wherein:

the third region is disposed on a first side of the first region; and the fourth region is disposed on a second side of the first region opposing the third region.

16. The system of claim 14, wherein the first plurality of phonon shields and the second plurality of phonon shields are characterized by a mechanical bandgap between 4.3 GHz and 6 GHz.

17. The system of claim 1, further comprising an optical resonator connected to the phononic crystal oscillator via a phonon waveguide.

* * * * *